United States Patent [19]

Esaki et al.

[11] Patent Number: 5,450,406
[45] Date of Patent: Sep. 12, 1995

[54] ATM COMMUNICATION SYSTEM WITH HIGH SPEED CONNECTION-LESS SERVICE FUNCTION

[75] Inventors: Hiroshi Esaki, Kanagawa; Takeshi Saito; Shigeo Matsuzawa, both of Tokyo, all of Japan

[73] Assignee: Kabushiki Kaisha Toshiba, Kawasaki, Japan

[21] Appl. No.: 230,539

[22] Filed: Apr. 20, 1994

[30] Foreign Application Priority Data

Apr. 20, 1993 [JP] Japan .................................. 5-117928
Jun. 30, 1993 [JP] Japan .................................. 5-162102

[51] Int. Cl.$^6$ ............................................. H04L 12/46
[52] U.S. Cl. ................................. 370/60.1; 370/85.13
[58] Field of Search ................. 370/85.13, 85.14, 60.1, 370/60, 94.1, 94.2, 94.3

[56] References Cited

U.S. PATENT DOCUMENTS

| | | | |
|---|---|---|---|
| 4,975,906 | 12/1990 | Takiyasu et al. | 370/85.13 |
| 5,265,091 | 11/1993 | van Landegem | 370/94.3 |
| 5,287,535 | 2/1994 | Sakagawa et al. | 370/60.1 |
| 5,357,508 | 10/1994 | Le Boudec et al. | 370/60.1 |
| 5,363,369 | 11/1994 | Hemmady et al. | 370/85.14 |

OTHER PUBLICATIONS

ITO-TS Draft Recommendation I.364, Jun. 1992, pp. 93-105, "Support of Broadband Connectionless Data Service on B-ISDN".
The ATM Forum, May 15, 1992, pp. 1-122, "ATM User-Network Interface Specification (Draft)".

Primary Examiner—Douglas W. Olms
Assistant Examiner—Min Jung
Attorney, Agent, or Firm—Oblon, Spivak, McClelland, Maier, & Neustadt

[57] ABSTRACT

ATM communication system capable of realizing a high speed and efficient datagram delivery for the connection-less communication among the terminals in the ATM network. In the system formed by a plurality of ATM networks inter-networking with each other, each network containing a plurality of terminals, the ATM networks with connection-less service function units for managing a connection-less datagram transmission are provided in the ATM networks, and the connection-less datagram transmission from each terminal to a destination terminal is performed by resolving a connection identifier for identifying an ATM connection connected to a destination side connection-less service function unit associated with a destination side ATM network containing the destination terminal, and transmitting datagram from said each terminal to the destination side connection-less service function unit through the ATM connection identified by the resolved connection identifier.

12 Claims, 51 Drawing Sheets

| USER TERMINAL | INPUT VCI/VPI | DESTINATION NET | DESTINATION CLSF | OUTPUT VCI/VPI |
|---|---|---|---|---|
| A | $I_{A1}$ | NET471 | CLSF491 | $O_1$ |
| B | $I_{B1}$ | NET471 | CLSF491 | $O_2$ |
| A | $I_{A2}$ | NET473 | CLSF493 | $O_3$ |
| A | $I_{A3}$ | NET473 | CLSF493 | $O_4$ |
| A | $I_{A4}$ | NET475 | IWU 479 | $O_5$ |

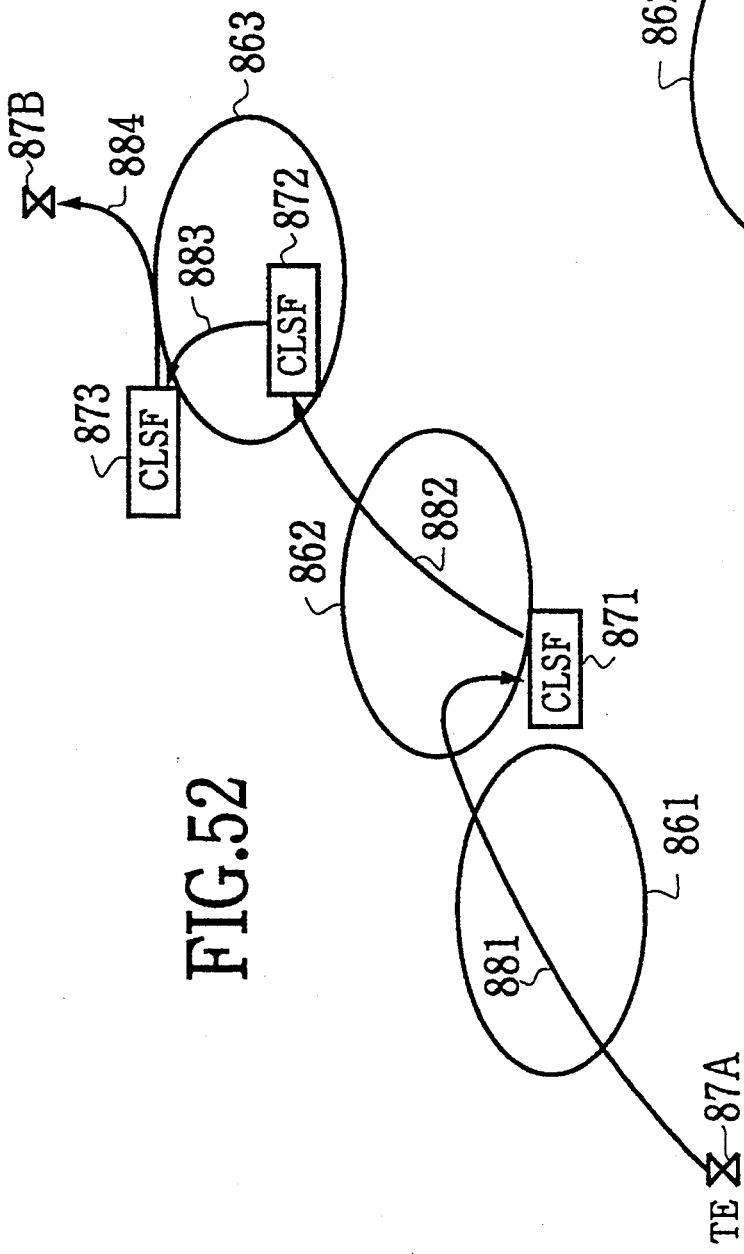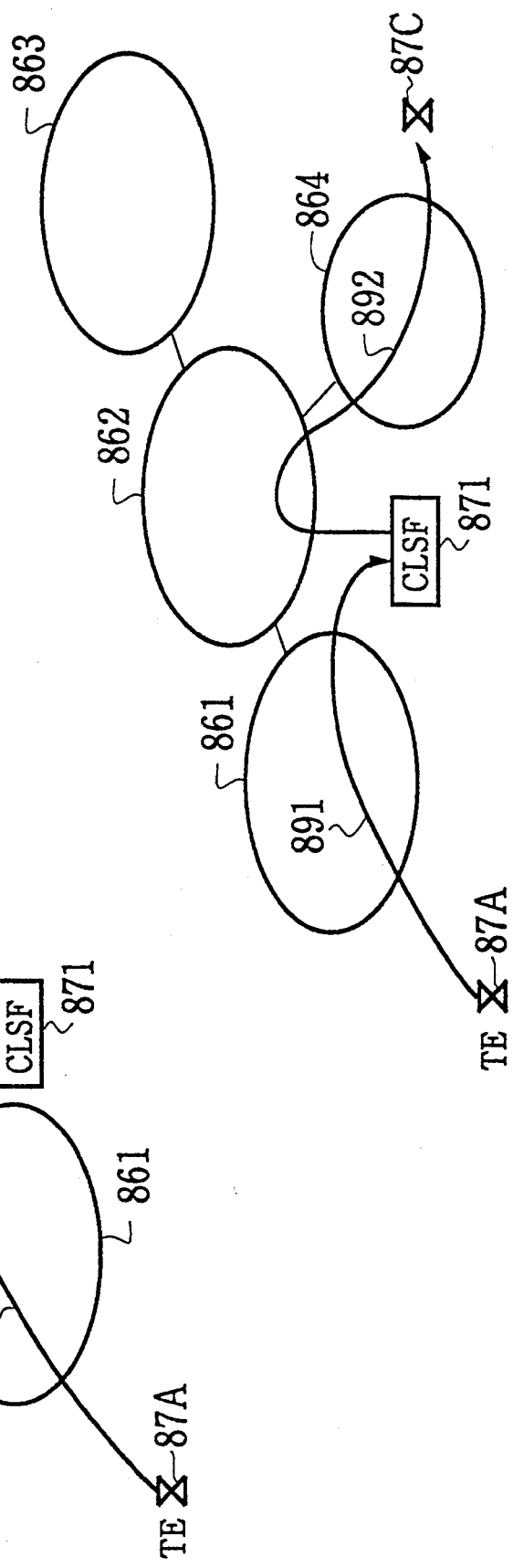

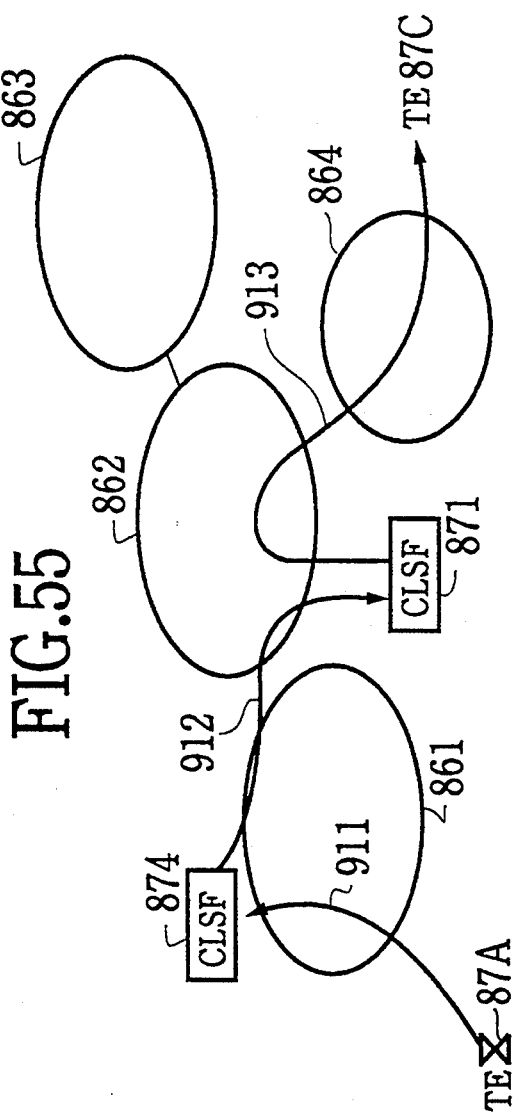
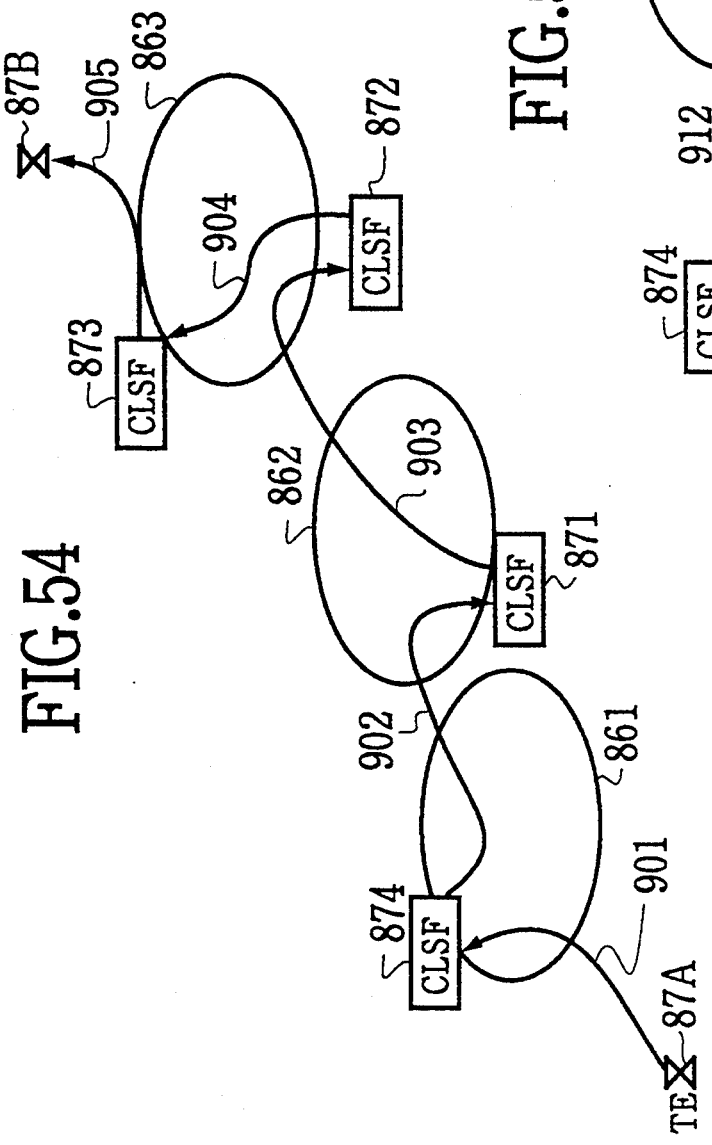

ATM COMMUNICATION SYSTEM WITH HIGH SPEED CONNECTION-LESS SERVICE FUNCTION

BACKGROUND OF THE INVENTION

1. Field of the Invention

The present invention relates to an ATM (Asynchronous Transfer Mode) communication system with a CLSF (Connection-Less Service Function).

2. Description of the Background Art

In order to provide the highly efficient and flexible communication services with respect to the increasing demands for the variety of communications such as the image communication and the high speed data communication, there is an eager expectation for the realization of the B-ISDN (Broadband-Integrated Service Digital Network), and the ATM exchange scheme is considered as a prospective scheme for actually realizing the B-ISDN.

The ATM exchange scheme is a scheme for realizing the communication service by loading data into a fixed length packet called cell regardless of the attributes of the data, and using this cell as a unit of exchange. The ITU (formerly CCITT) has formally determined this ATM exchange scheme as the next generation exchange scheme, and decided to use this ATM exchange scheme for realizing the B-ISDN. For this reason, it is highly likely that the demands for the next generation multimedia communication and broadband communication are going to be handled by constructing the public network or the local network based on the ATM exchange scheme.

In recent years, there is a movement for applying this ATM exchange scheme to the LAN (Local Area Network) such as the Ethernet. In this case, the LAN operated under the ATM exchange scheme will be referred as the ATM-LAN. Such an ATM-LAN is expected to have the advantages that the throughput of the LAN can be improved considerably, that it is suitable for the multi-media, and that it is adaptive to the public network.

Now, one of the features of the ATM communication scheme is that its high speed operation realized by the hardware switching of the ATM cells. That is, the ATM network is the connection-oriented (CO) network in which the virtual connection (VC) or the virtual path (VP) As set up end-to-end, and the packet called cell is delivered end-to-end by label multiplexing or label exchanging the VCs or VPs in terms of their identifiers (VCI or VPI).

The data to be delivered end-to-end is loaded in the payload section of the ATM cell, and the ATM cell is exchanged and transmitted up to the destination terminal by the hardware switching operation alone without the intervention of the software operation, where the hardware switching operation as carried out by the ATM switch according to the VPI/VCI (or the value of the other field such as PT in the ATM cell header) contained An the ATM cell header.

In contrast to this ATM communication scheme which is the connection-oriented communication scheme, the communication scheme used in the conventional data communication is the connection-less (CL) communication scheme in which the end-to-end connections are not necessarily set up, and the packet is transmitted to the destination terminal as the packet is sent out to the network by attaching the destination data as its part while some node in the network analyzes the destination data and carries out the routing processing. Namely, in the connection-less communication scheme, the data transmission is realized Without the procedure for setting up the connections at the terminals. In such a case, the packet to be transmitted to the destination terminal in connection-less manner is called datagram and this data transmission is called the datagram transmission. Thus, in the connection-less communication scheme, the communication is realized in a form of the datagram transmission without the procedure for setting up the connections.

Almost all of the existing data terminals such as the workstation (WS) and the personal computer (PC) adopts this datagram transmission scheme because the datagram transmission scheme is supported by the LAN, and the software provided within the data terminals such as protocols TCP/IP and UDP/IP has been suitable for the datagram transmission.

In such existing terminals or terminals provided with the existing protocols. i.e., the terminal which generates the datagram and outputs it to the destination terminal/-network through the ATM network, the datagram transmission scheme is used for the terminal to terminal communication. To this end, it is necessary for the terminal and the network to be modified to realize the function for adapting the terminal to the interface with respect to the ATM-LAN by replacing the usual LAN board with the ATM board such as the Ethernet board or by using the terminal adaptor (TA), the function for loading the datagram into the ATM cell somehow at the terminal, and the function to deliver the datagram to the destination terminal indicated by the destination address at the network. Here, the terminal include the gate-way between the existing LAN and the ATM network.

To realize these functions, the datagram delivery scheme using the CLSF has been used conventionally. In this datagram delivery scheme, the CLSF processing unit is provided within the ATM network, and all the datagrams are collected there once. In other words, the CLSF processing unit is connected with all the datagram terminals by PVC (Semi-Permanent VC)(or VC, VP, PVC, or PVP), and the terminal wishing to transmit the datagrams assembles the ATM cells for all the datagrams to be transmitted, and transmits the ATM cells to the VC directed toward the CLSF processing unit. The CLSF processing unit then reproduces the received datagrams, and selects the VC connected to the destination address by analyzing the destination address of the datagrams, and then re-assembles the ATM cells for the datagrams and transmits the ATM cells to the selected VC. In a case the VC connected to the destination address cannot be found while there are other CLSF processing units within the network, the CLSF processing unit transmits the re-assembled ATM cells to the next stage CLSF processing unit which is expected to contain the terminal with the destination address or which is determined by the routing rule in advance.

Here, it is not absolutely necessary for the CLSF processing unit to analyze the destination address after reproducing the datagrams, and transmits the ATM cells after re-assembling the ATM cells. For instance, in a case the destination address is contained in the to cell among the ATM cells for the datagrams, the destination address of the first cell alone can be analyzed and then transmitted to the destination terminal, and then the subsequent cells of the ATM cells for the datagrams can be sequentially transmitted to that destination terminal.

However, in this datagram delivery scheme using CLSF, all the datagrams originating within the network are always going to be transmitted via the CLSF processing unit, so that the CLSF processing unit is required to have a higher throughput as the amount of datagrams to be transmitted increases and as the number of terminals within the network increases. Consequently, the CLSF processing unit is required to have a very high throughput and the flexibly expandability.

Another scheme for transmitting the datagrams to the destination terminal is to set up the ATM connection such as VC to the destination address, and the ATM cells for the datagrams are delivered through this VC. However, in this scheme, there is a serious problem concerning the selection of the destination terminal with respect to which the VC is to be set up. Namely, there are enormously many terminals to which the datagrams can possibly be transmitted in practice, and in addition the generation of the datagrams is more bursty compared with the speech data, etc., so that to set up the enormously many connections is going to be a considerable waste of the network resource.

Furthermore, in a case of realizing the connection-less communication in the conventional ATM network, the ATM connection is always terminated at the CLSF processing unit, and the protocol processing for the upper layers above the AAL layer such as the protocol for the connection-less service called CLNAP (Connection-Less Network Access Protocol) is carried out. In other words, even in a case of the datagram transmission between the quite nearby terminals, the ATM connection is going to be terminated once at the CLSF processing unit. Also, in a case of the datagram transmission between far distanced terminals, it becomes necessary to pass through a plurality of CLSF processing units at each one of which the protocol processing above the AAL layer must be carried out.

In general, the protocol processing above the AAL layer such as the CLNAP is realized by the software processing so that the processing speed is slow compared with the processing below the AAL layer which is usually carried out by the hardware processing. Also, it is necessary for the CLSF processing unit to carry out the analysis of the address data such as the network layer address data in the datagrams for not Just the transmissions to the terminals of the network supported by that CLSF processing unit itself but also for the transmissions to the terminals of the network supported by the other CLSF processing unit as well, so that the datagram transmission processing load is going to be concentrated on the CLSF processing unit. For these reasons, it has been difficult to realize the high speed communication in the connection-less communication (datagram delivery) among the terminals of the conventional ATM communication system.

On the other hand, in making the inter-LAN connection, i.e., the inter-networking among the LANs, in the conventional LAN environment, the router has been required to be provided between each adjacent LANs. The main function of this router is the routing processing for the datagram transmission over the LANs, by processing up to the layer 3 (network layer) in the OSI (Open Systems Interconnection) protocol layer stack. Namely, for the datagram to be transmitted over two LANs, the datagram must be brought up to the layer 3 by the router to analyze the destination network layer address there, and the delivered to the destination LAN according to the result of this analysis. The function of this router also realized by the so called "gate-way" in the context of the computer communication, but the "gate-way" is formally defined as that which carries out the processing up to the layer 7, so that the element for realizing this function will be called router in the following.

There is also an element called "bridge" which has the similar function as the router in realizing the inter-LAN connection. In this bridge, in contrast to the router which determines the destination LAN by analyzing the destination network layer address, the destination LAN is determined by analyzing the data link layer address (MAC address). Namely, the bridge realizes the inter-LAN connection by analyzing the destination MAC address of the datagram and passing the datagram through to another LAN when the obtained MAC address is not destines within its own LAN.

Furthermore, there is also a similar element called "brouter" which functions as the router for the predetermined network layer protocol and as the bridge for all the other protocols.

These router, bridge, and brouter has been usually realized by the workstation (WS). Namely, the CPU provided within the WS carries out the address analysis and realized the functions of the router, bridge, and brouter by transmitting the datagram to the allocated physical port.

However, in a case of the ATM-LAN, these router, bridge, and brouter are going to terminate the connection at the layer 3 or the layer 2 forcefully and the processing for the layer 3 and layer 2 after the termination is most likely handled by the software processing. For this reason, for the transmission over the LANs. The speed and the capacity of the communication can be considerably lowered compared with the communication within the LAN. Also, in a case of providing the router, bridge, brouter, etc., the VP/VC cannot be set up over the LANs because the layer processing above the ATM layer between the end points is carried out at the routers.

Thus, in the conventional ATM-LAN, the layer 3 (network layer) processing must be carried out at the physical boundary of the networks, because the physical network boundary is the boundary of the OSI layer 2 (data link layer), and therefore the router must be provided at the physical network boundary for this reason.

Moreover, the conventional routing protocol to be executed by the router cannot be executed correctly unless the router is located within the physical network to which it belongs.

As a consequence, the location of the router has been dictated by the physical configuration of the network conventionally, i.e., the topology of the network layer cannot be defined independently from the topology of the physical network. In addition, it has been impossible to locate the router belonging to a certain network outside of that certain network.

SUMMARY OF THE INVENTION

It is therefore an object of the present invention to provide an ATM communication system capable of realizing a high speed and efficient datagram delivery for the connection-less communication among the terminals in the ATM network.

It is another object of the present invention to provide an ATM communication system capable of setting the topology of the network layer independently from the topology of the physical network.

According to one aspect of the present invention there is provided an ATM communication system, comprising: a plurality of ATM networks inter-networking with each other, each network containing a plurality of terminals; and connection-less service function means for managing a connection-less datagram transmission in the ATM networks; wherein the connection-less datagram transmission from each terminal to a destination terminal is performed by resolving a connection identifier for identifying an ATM connection connected to a destination side connection-less service function means associated with a destination side ATM network containing the destination terminal, and transmitting datagram from said each terminal to the destination side connection-less service function means through the ATM connection identified by the resolved connection identifier.

According to another aspect of the present invention there is provided an ATM communication system, comprising: a plurality of ATM networks inter-networking with each other, each network containing a plurality of terminals and the ATM networks including a first ATM network having connection-less service function means for managing a confection-less datagram transmission in the ATM networks, and a second ATM network having no connection-less service function means; inter-networking means for inter-networking the first and second ATM networks; and connection set up means for setting up a first ATM connection between the connection-less service function means of the first ATM network and the inter-networking means, and a second ATM connection between the inter-networking means and a terminal belonging to the second ATM network; wherein the inter-networking means directly connects the first and second ATM connections set up by the connection set up means at an ATM layer, and the connection-less service function means of the first ATM network is assigned with an address data indicating that said connection-less service function means logically belongs to the second ATM network at a network layer, such that the connection-less datagram transmission from said terminal belonging to the second ATM network is performed by using said address data through the first and second ATM connections connected at the ATM layer.

According to another aspect of the present invention there is provided an ATM communication system, comprising: a plurality of ATM networks inter-networking with each other, each network containing a plurality of terminals and the ATM networks including a first ATM network having connection-less service function means for managing a connection-less datagram transmission in the ATM networks, and second and third ATM networks having no connection-less service function means; first inter-networking means for inter-networking the first and second ATM networks; second inter-networking means for inter-networking the second and third ATM networks; and connection set up means for setting up a first ATM connection between the connection-less service function means of the first ATM network and the inter-networking means, a second ATM connection between the inter-networking means and the second inter-networking means, and a third ATM connection between the second inter-networking means and a terminal belonging to the third ATM network; wherein the inter-networking means directly connects the first, second, and third ATM connections set up by the connection set up means at an ATM layer, and the connection-less service function means of the first ATM network is assigned with an address data indicating that said connection-less service function means logically belongs to the third ATM network at a network layer, such that the connection-less datagram transmission from said terminal belonging to the third ATM network is performed by using said address data through the first, second, and third ATM connections connected at the ATM layer.

According to another aspect of the present invention there is provided a method for ATM communication in an ATM communication system formed by a plurality of ATM networks inter-networking with each other, each network containing a plurality of terminals, the method comprising the steps of: providing the ATM networks with connection-less service function means for managing a connection-less datagram transmission in the ATM networks; and performing the connection-less datagram transmission from each terminal to a destination terminal by resolving a connection identifier for identifying an ATM connection connected to a destination side connection-less service function means associated with a destination side ATM network containing the destination terminal, and transmitting datagram from said each terminal to the destination side connection-less service function means through the ATM connection identified by the resolved connection identifier.

According to another aspect of the present invention there is provided a method of ATM communication in an ATM communication system formed by a plurality of ATM networks inter-networking with each other, each network containing a plurality of terminals and the ATM networks including a first ATM network having connection-less service function means for managing a connection-less datagram transmission in the ATM networks, and a second ATM network having no connection-less service function means, the method comprising the steps of: inter-networking the first and second ATM networks by first inter-networking means; setting up a first ATM connection between the connection-less service function means of the first ATM network and the inter-networking means, and a second ATM connection is between the inter-networking means and a terminal belonging to the second ATM network; directly connecting the first and second ATM connections at an ATM layer by the inter-networking means: assigning the connection-less service function means of the first ATM network with an address data indicating that said connection-less service function means logically belongs to the second ATM network at a network layer, such that the connection-less datagram transmission from said terminal belonging to the second ATM network is performed by using said address data through the first and second ATM connections connected at the ATM layer.

According to another aspect of the present invention there is provided a method of ATM communication in an ATM communication system formed by a plurality of ATM networks inter-networking with each other, each network containing a plurality of terminals and the ATM networks including a first ATM network having connection-less service function means for managing a connection-less datagram transmission in the ATM networks, and second and third ATM networks having no connection-less service function means, the method comprising the steps of: inter-networking the first and second ATM networks by first inter-networking means, and the second and third ATM networks by second inter-networking means; setting up a first ATM connection between the connection-less service function means of the first ATM network and the inter-networking means, a second ATM connection between the inter-networking means and the second inter-networking means, and a third ATM connection between the second inter-networking means and a terminal belonging to the third ATM network; directly connecting the first, second, and third ATM connections at an ATM layer by the first and second inter-networking means; and assigning the connection-less service function means of the first ATM network with an address data indicating that said connection-less service function means logically belongs the third ATM network at a network layer, such that the connection-less datagram transmission from said terminal belonging to the third ATM network is performed by using said address data through the first, second, and third connections connected at the ATM layer.

Other features and advantages of the present invention will become apparent from the following description taken in conjunction with the accompanying drawings.

BRIEF DESCRIPTION OF THE DRAWINGS

FIG. 52 is a diagram of ATM connections for an exemplary data transmission in a first case of the datagram delivery to external network shown in the network of FIG. 50.

FIG. 53 is a diagram of ATM connections for another exemplary data transmission in a first case of the datagram delivery to external network shown in the network of FIG. 50.

FIG. 54 is a diagram of ATM connections for an exemplary data transmission in a second case of the datagram delivery to external network shown in the network of FIG. 50.

FIG. 55 is a diagram of ATM connections for another exemplary data transmission in a second case of the datagram delivery to external network shown in the network of FIG. 50.

FIG. 58 is a flow chart for an operation in the network of FIG. 56.

DETAILED DESCRIPTION OF THE PREFERRED EMBODIMENTS

ATM NETWORK BLOCK CONFIGURATION

The ATM communication system according to the present invention can be constructed from one or more of the following ATM network blocks.

1. The First Type ATM Network Block

Figure 1:
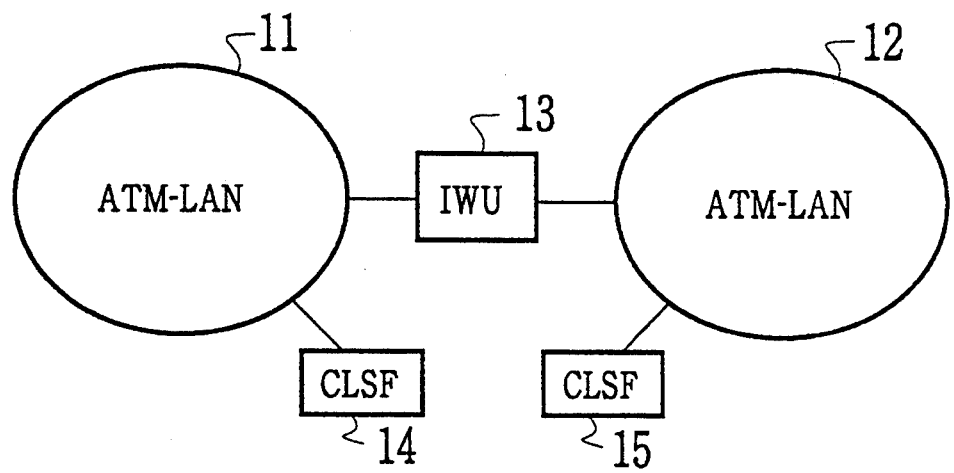
FIG. 1 is a schematic diagram of a first type ATM network block in the ATM communication system according to the present invention.

FIG. 1 shows a first type ATM network block in the ATM communication system according to the present invention, which comprises a first ATM-LAN 11 and a second ATM-LAN 12 which are connected through an IWU (inter-networking unit) 13, where each of the first ATM-LAN 11 and the second ATM-LAN 12 is a local area network formed by a plurality of terminals and nodes operated by the ATM scheme and equipped with a connection-less service function processing unit (CLSF) 14 or 15, respectively.

In this ATM network block of FIG. 1, each ATM-LAN has an independent address assignment policy within itself. Namely, the right to determine VPI/VCI used within each ATM-LAN are assigned to a VPI/VCI determination function provided within each ATM-LAN, and this right is assigned independently for each ATM-LAN.

In a case of a presence of a data to be transmitted, regardless of whether the destination of the data is within the same ATM-LAN or not, a terminal and nodes within each ATM-LAN transmits that data within the ATM-LAN by loading that data in an ATM cell and attaching an appropriate ATM cell header.

Figure 2:
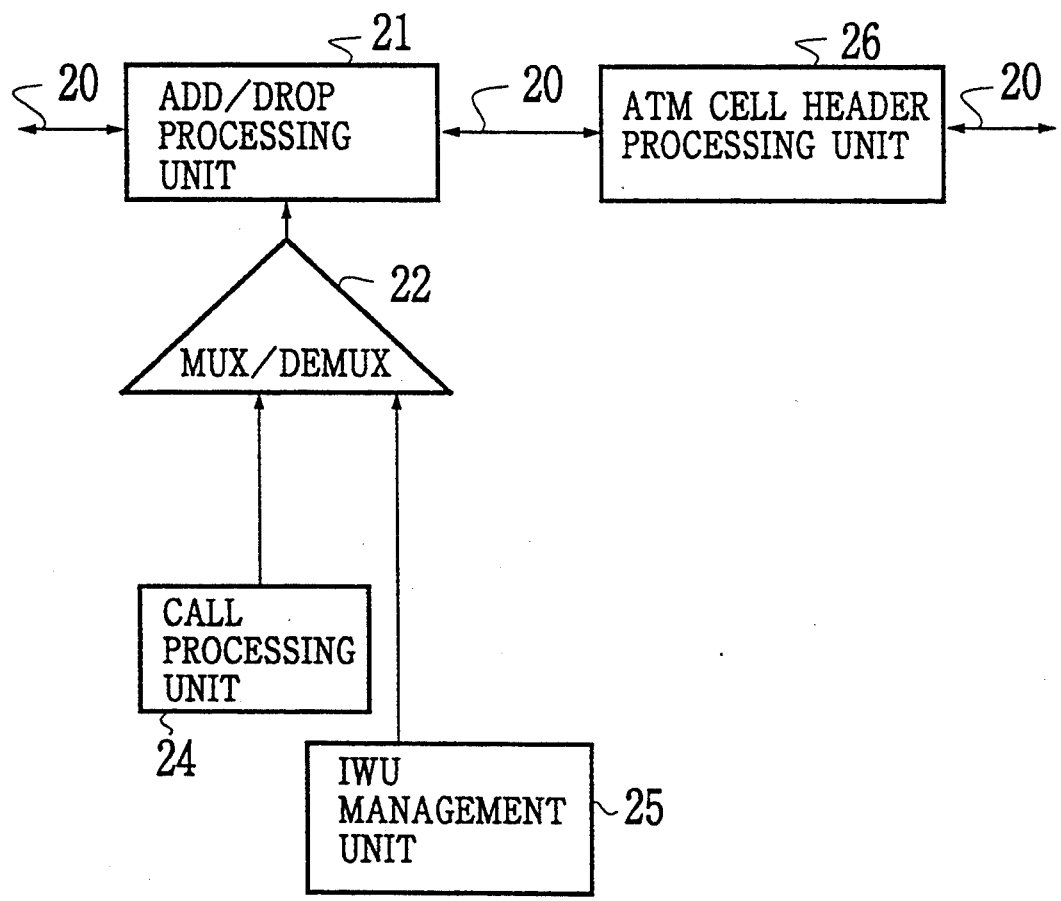
FIG. 2 is a schematic block diagram of an inter-networking unit in the first type ATM network block of FIG. 1.

In this ATM network block of FIG. 1, the IWU 13 has a detailed internal configuration as shown in FIG. 2 which comprises: an add/drop processing unit 21 provided on a cell transmission path 20, a multiplexer/demultiplexer (MUX/DEMUX) 22 having its output connected with the add/drop processing unit 22, a call processing unit 24 and an IWU management unit 25 which are connected with inputs of the MUX/DEMUX 22, and an ATM cell header conversion unit 26 also provided on the cell transmission path 20. Here, this IWU 13 is located between the two ATM-LANs 11 and 12 and functions to control the inter-networking (inter-LAN connection) between these two ATM-LANs 11 and 12.

The add/drop processing unit 21 looks up the header portion of the ATM cell entering to it, and in a case that cell has the appropriate header value, i.e., in a case that cell is a cell to be terminated within the IWU 13, it executes the processing for dropping that cell to the DEMUX 22 side, and the processing for adding the cell from the MUX 22 side onto the cell transmission path 20. Here, the add/drop processing unit 21 in this ATM network block of FIG. 1 is capable of adding or dropping the cell to either one of the right and left directions of the cell transmission path 20.

In this add/drop processing unit 21, which one of the right and left directions of the cell transmission path 20 should the cell be added is specified by the call processing unit 24 and the IWU management unit 25 as described below. Namely, along with the cell to be added (add cell), the add/drop processing unit 21 receives a value "0" in a case of adding that cell to the left direction of the cell transmission path 20, or a value "1" in a case of adding that cell to the right direction of the cell transmission path 20, such that the direction for adding that cell can be determined at the add/drop processing unit 21 according to the received value. As for the position for adding the cell, it may be possible to add the cell in replacement of an empty cell passing over the cell slot on the cell transmission path 20.

On the other hand, in a case of dropping the cell to the MUX/DEMUX 22 side, the add/drop processing unit 21 looks up a prescribed drop table provided for each of the right and left directions of the path transmission path 20 which registers the cell header value in correspondence to the dropping target, such that the add/drop processing unit 21 can determined the dropping target for the cell as one of the call processing unit 24 and the IWU management unit 25 according to the cell header value of the cell and this drop table. This drop table is initialized and managed by the IWU management unit 25 as described below. Here, for example, the drop target value "1" could be assigned to the call processing unit 24 while the drop target value "2" could be assigned to the IWU management unit 25 and a cell (drop cell) dropped at the add/drop processing unit 21 is transmitted to the MUX/DEMUX 22 side along with the drop target value and a value for indicating which one of the right and left directions of the cell transmission path 20 has that cell been dropped from ("0" for the left direction for "1" for the right direction for example).

The MUX/DEMUX 22 has a DEMUX function to transmit the drop cell transmitted from the add/drop processing unit 21 to an appropriate one of the connected modules (the call processing unit 24 and the IWU management unit according to the data accompanying the drop cell, and a MUX function to transmit the add cell transmitted from the connected modules to the add/drop processing unit 21 side along with the data indicating which one of the right and left directions of the cell transmission path 20 should the add cell be added.

The call processing unit 24 has basic functions for setting up, cutting off, changing, and managing the ATM connection over the IWU 13. In addition, this call processing unit 24 may also has additional functions for managing the bandwidth of the ATM connection or the cell transmission path 20 within the IWU 13.

The IWU management unit 25 has functions for managing and controlling the IWU 13.

The ATM cell header conversion unit 26 looks up the header value of the cell entering to it, and in a case the header value is an appropriate value, it rewrites this header value (input cell header value) to another value (output cell header value). For this purpose, the ATM cell header conversion unit 26 has a correspondence table registering the input cell header values and the output cell header values in correspondence. This correspondence table is also initialized and managed by the IWU management unit 25. As this correspondence table contains the input cell header value which is also registered in the drop table mentioned above, the correspondence table and the drop table can be unified together into a single table easily.

In this IWU 13, the modules are connected with each other through a bus line (not shown), and the control from the IWU management unit 25 such as the changing of the setting value at each module is achieved through this bus line. Alternatively, the data exchange among the modules may be achieved by loading the data to be exchanged into the ATM cell and exchanging the ATM cell among the modules, instead of using the bus line, if desired.

It is also possible to separate each module into two parts corresponding to the right and left directions of the cell transmission path 20, instead of handling the processing for both directions in the single module as in the above.

It is also possible to combine a part of a whole of the various processings to be executed by the modules into an integrated processing to be executed by a single CPU/MPU.

Also, the ATM cell header conversion unit 26 may be provided on both of the right and left sides of the add/-drop processing unit 21 in order to handle the ATM cell header conversion for the ATM cell flow in the right and left directions of the cell transmission path 20 separately. Alternatively, the add/drop processing unit 21 may be provided on both of the right and left sides of the ATM cell header conversion unit 26 in order to handle the add/drop processing for the ATM cell flow in the right and left directions of the cell transmission path 20 separately. In these cases, the functions of the IWU 13 can be made to appear symmetrical for the right and left directions of the cell transmission path 20.

In this ATM network block of FIG. 1, the CLSF 14 (15) realizes the connection-less service function in which the datagram delivered over the IWU 13 is terminated once, and after the network layer address is looked up, the datagram is transmitted to the appropriate ATM connection. Thus, the ATM connection for the datagram delivery is terminated once at the CLSF 14 (15), but there is no need to re-assemble the datagram. That is, at the CLSF 14 (15). It is not necessary to make the network layer termination, and it suffices to make the connection-less (CL) layer termination as considered by the CCITT. In this case, the appropriate ATM connection to which the datagram is transmitted from the CLSF 14 (15) is the VP/VC connected with the terminal/node having the looked up network layer address, or the VP/VC connected with the other CLSF which is expected to have the function of the datagram delivery to the looked up network layer address.

2. The Second Type ATM Network Block

Figure 3:
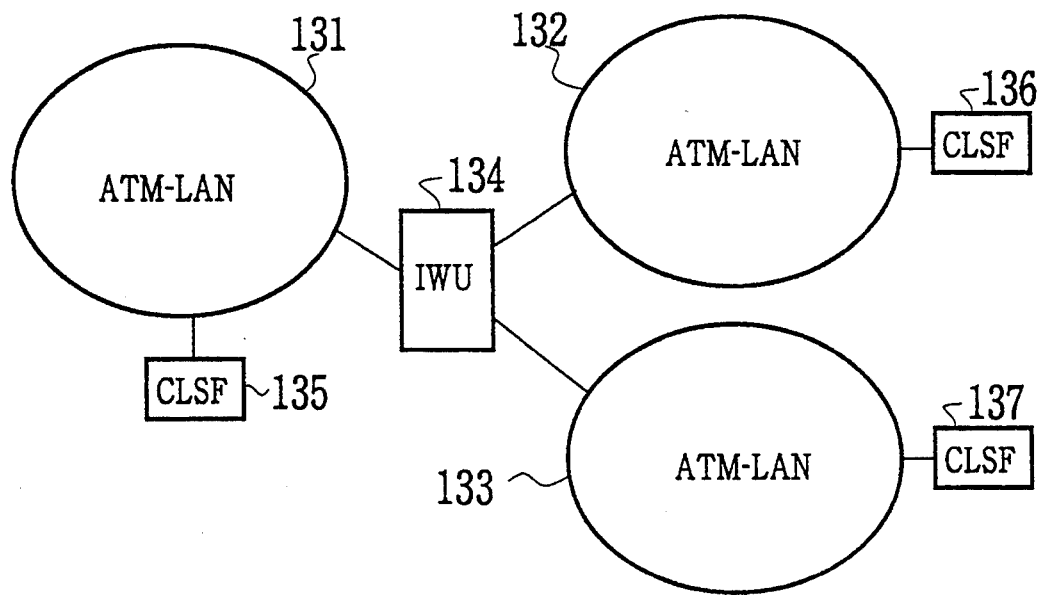
FIG. 3 is a schematic diagram of a second type ATM network block in the ATM communication system according to the present invention.

FIG. 3 shows a second type ATM network block in the ATM communication system according to the present invention, which comprises a first ATM-LAN 131, a second ATM-LAN 132, and a third ATM-LAN 133 which are connected through an IWU (inter-networking unit) 134, where each of the first ATM-LAN 131, the second ATM-LAN 132, and the third ATM-LAN 133 is a local area network formed by a plurality of terminals and nodes operated by the ATM scheme and equipped with a connection-less service function processing unit (CLSF) 135, 136, or 137, respectively.

In this ATM network block of FIG. 3, similarly to the first type ATM network block of FIG. 1 described above, each ATM-LAN has an independent address system within itself, and in a case of a presence of a data to be transmitted, regardless of whether the destination of the data is within the same ATM-LAN or not, a terminal and nodes within each ATM-LAN transmits that data within the ATM-LAN by loading that data in an ATM cell and attaching an appropriate ATM cell header.

Figure 4:
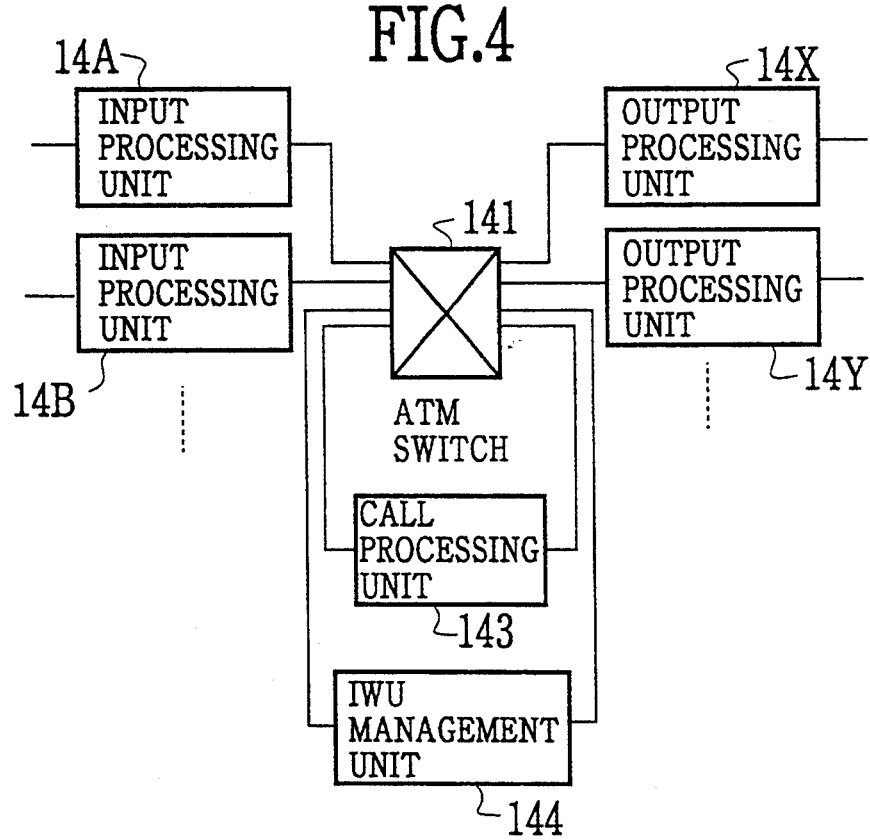
FIG. 4 is a schematic block diagram of an inter-networking unit in the second type ATM network block of FIG. 3.

In this ATM network block of FIG. 3, the IWU 134 has a detailed internal configuration as shown in FIG. 4 which comprises: an ATM switch 141 of N inputs and M outputs (N=M=2 in FIG. 4), a call processing unit 143, an IWU management unit 144, input processing units 14A and 14B for entering inputs from two other ATM-LANs, and output processing units 14X and 14Y for outputting outputs to two other ATM-LANs, where the ATM switch 141 switches the outputs of the input processing units 14A and 14B, the call processing unit 143, and the IWU management unit 144 into the inputs of the output processing units 14X and 14Y, the call processing unit 143, and the IWU management unit 144. In a general case of having more than three ATM-LANs, this IWU 134 can be expanded by incorporating more than two input processing units and the output processing units, and functions to control the inter-networking (inter-LAN connection) among these ATM-LANs.

Each of the input processing units 14A and 14B has functions to analyze the header value such as VPI/VCI value of the ATM cell entering to it, carry out the conversion of the header value if necessary, and attaching a routing tag for enabling an appropriate routing of the cell at the ATM switch 141.

The ATM switch 141 then carries out the routing of the cell entered from the input processing unit 14A or 14B according to the routing tag attached to the cell. In addition, the ATM switch 141 may also have the functions such as the broadcast function or the multicast function if desired.

Each of the output processing units 14X and 14Y has functions to remove the routing tag from the cell outputted from the ATM switch 141, and carries out the conversion of the header value if necessary. This latter ATM cell header conversion function is a function required to be provided either at the input processing unit or the output processing unit such that a set of the input processing unit and the output processing unit can control the connection with respect to the switching nodes and terminals within the neighboring ATM-LAN, or even to the IWU 134 if necessary.

The call processing unit 143 has basic functions for setting up, cutting off, changing, and managing the ATM connection over the IWU 134, similarly to the call processing unit 24 in the configuration of FIG. 1 described above.

The IWU management unit 144 has functions for managing and controlling the IWU 134, similarly to the IWU management unit 28 in the configuration of FIG. 1 described above.

In this IWU 134, the modules are connected with each other through a bus line (not shown), and the control from the IWU management unit 144 such as the changing of the setting value at each module is achieved through this bus line. Alternatively, the data exchange among the modules may be achieved by loading the data to be exchanged into the ATM cell and exchanging the ATM cell among the modules, instead of using the bus line, if desired.

It is also possible to combine a part of a whole of the various processings to be executed by the modules into an integrated processing to be executed by a single CPU/MPU.

Figure 8:
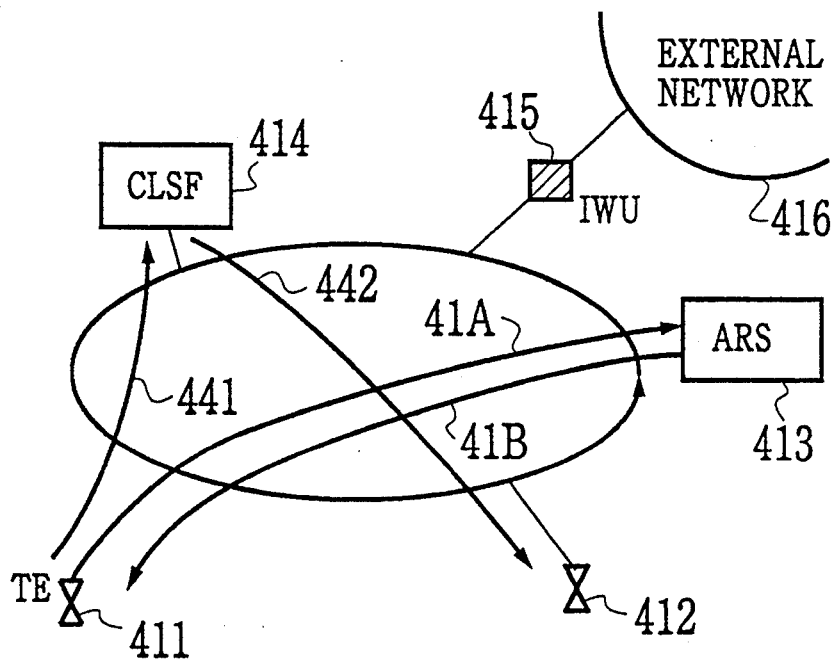
FIG. 8 is a partial network diagram of the ATM communication system according to the present invention, showing an laternative procedure for the first ease of the datagram delivery within sub-network.

In this ATM network block of FIG. 8, the CLSF 135 (138, 137) realizes the connection-less service function similar to that realized by the CLSF 14 (15) in the configuration of FIG. 1 described above.

DATAGRAM DELIVERY WITHIN SUB-NETWORK

When the ATM communication system according to the present invention is constructed by connecting a plurality of the ATM network blocks as described above, each ATM-LAN can be regarded as a sub-network. Here, a scheme for the datagram delivery between terminals within such a sub-network will be described.

1. General ATM Network

In an exemplary sub-network 410 shown in FIG. 5 which is equipped with the address resolution server (ARS) 413 and the CLSF 414 and which is connected with the external network 416 through the IWU 415, one procedure for the datagram delivery from a terminal (TE) 411 to another terminal 412 can be carried out as follows.

Namely, when a datagram transmission request occurs at the terminal 411, the terminal 411 makes an address resolution (AR) request for obtaining a suitable ATM address for the datagram transmission to a destination terminal 412 with respect to the ARS 413 through an ATM connection 41A.

In response, the ARS 413 notifies an address resolution (AR) response indicating VCI/VPI data or ATM address (as defined by the ATM Forum) to be attached to the datagram at the terminal 411 which are identifiers of an appropriate ATM connection for the datagram transmission to the destination terminal 412, through an ATM connection 41B to the terminal 411.

When this AR response is received at the terminal 411, the notified VCI/VPI are attached to the datagram and the datagram is outputted to the network. The outputted datagram is then directly delivered to the destination terminal 412 through an ATM connection 41C specified by the attached VCI/VPI of the datagram.

In this case, there is a need to provide full meshed ATM connections among all the terminals within each sub-network. If ATM address is replied by ARS, the terminal will establish ATM connection for the destination terminal using the informed ATM address.

In this procedure, the AR request can be made either whenever the datagram transmission request has occurred, or only when an appropriate address data for the destination terminal cannot be found in an address resolution (AR) table provided in the terminal 411 which is a cache memory for the destination targets. In the latter case, when the address of the destination terminal can be found in the AR table, the procedure for making the AR request and receiving an address resolution (AR) response from the ARS 413 can be omitted.

Figure 6:
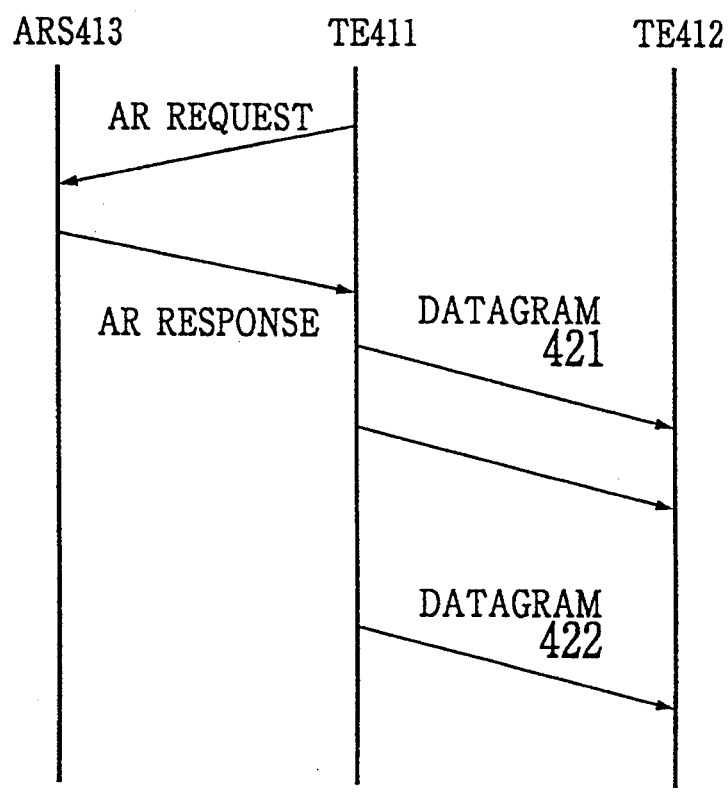
FIG. 6 is a data exchange diagram for the first case of the datagram delivery within sub-network shown in FIG. 5.

Thus, in this case, the datagram delivery is achieved by the data exchange among the ARS 413 and the terminals 411 and 412 as represented in FIG. 6, where the datagram 421 is a case in which the address data for the destination terminal 412 cannot be found in the AR table at the terminal 411 so that the datagram transmission is preceded by the exchange of the AR request and the AR response between the ARS 413 and the terminal 411, whereas the datagram 422 is a case in which the address data for the destination terminal 412 can be found in the AR table at the terminal 411 so that the datagram transmission can take place immediately without the exchange of the AR request and the AR response.

Figure 7:
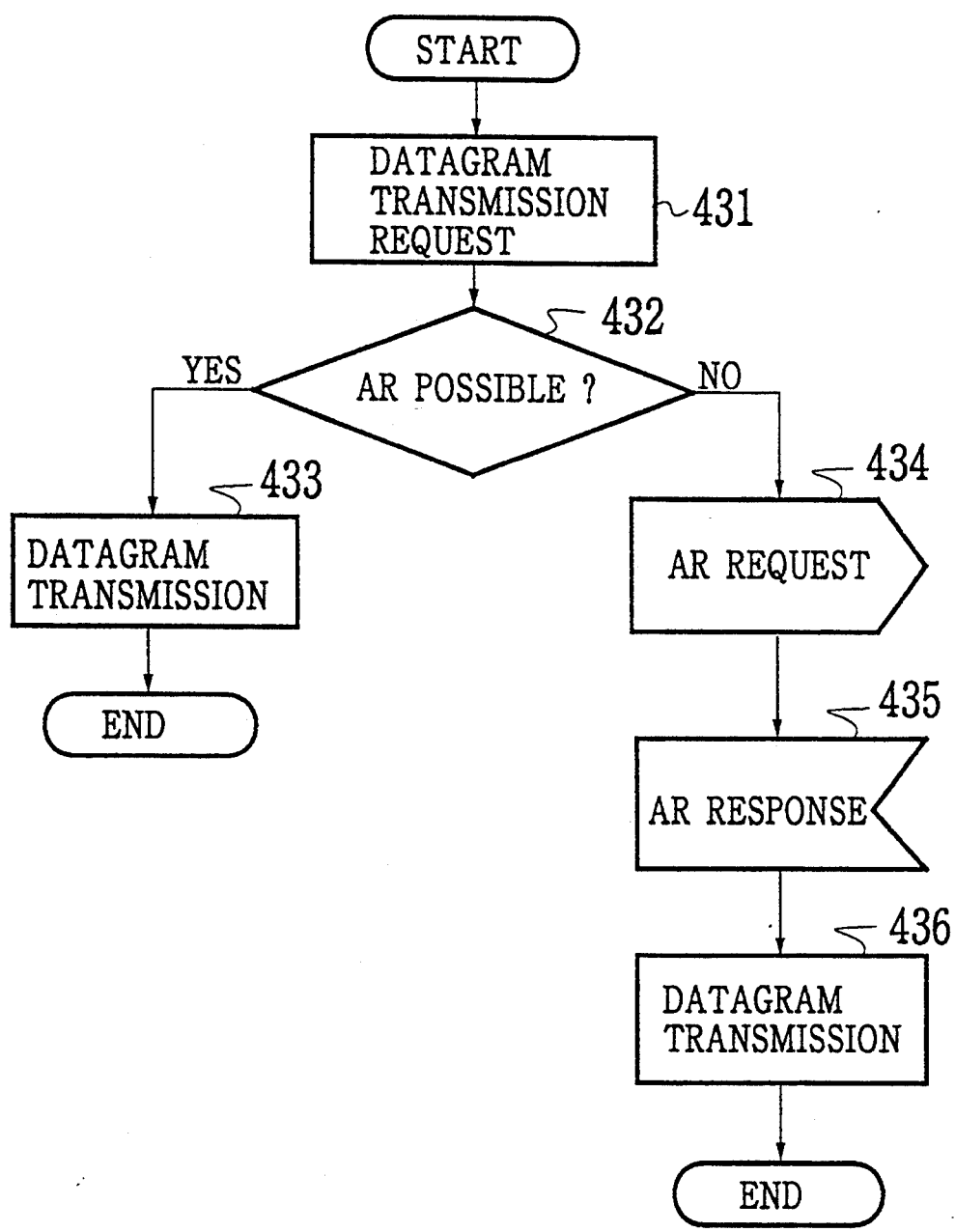
FIG. 7 is a flow chart for an operation in the first case of the datagram delivery within sub-network shown in FIG. 5.

Also, in this case, the terminal 411 carries out the protocol according to the flow chart of FIG. 7, in which after the datagram transmission request occurs at the step 431, whether the address resolution is possible by using the AR table of this terminal 411 or not is checked at the step 432. If so, the datagram transmission takes place immediately at the step 433, whereas otherwise the AR request is made to the ARS 413 at the step 434, the AR response is received from the ARS 413 at the step 435, and then the datagram transmission takes place at the step 436.

Figure 5:
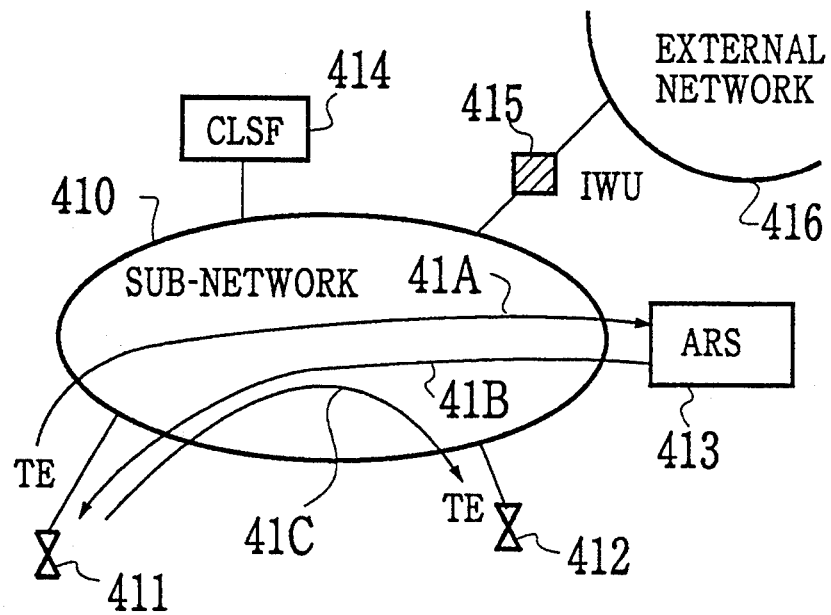
FIG. 5 is a partial network diagram of the ATM communication system according to the present invention, showing a first case of the datagram delivery within sub-network.

It is to be noted here that the exchange of the AR request and the AR response can be realized by using the point-to-point ATM connections as shown in FIG. 5, or by using a broadcast channel.

FIG. 8 shows a case of another procedure for the datagram delivery from the terminal 411 to the terminal 412 which can be carried out as follows.

Namely, this is a case in which the actual datagram transmission is carried out by the CLSF 414. In this case, when a datagram transmission request occurs at the terminal 411, the terminal 411 carries out the address resolution to obtain the ATM connection data for the datagram transmission to the destination terminal 412 according to the AR table provided in this terminal 411. In a case the address data for the destination terminal 412 cannot be found in the AR table at the terminal 411, the terminal 411 makes the AR request for obtaining a suitable ATM address for the datagram transmission to a destination terminal 412 with respect to the ARS 413 through an ATM connection 41A.

In response, in a case the destination terminal is a terminal in this sub-network 410, the ARS 413 notifies the AR response indicating ATM layer address data through an ATM connection 41B to the terminal 411. A case in which the destination terminal is not a terminal in this sub-network 410 will be described below.

When the address resolution is completed, the terminal 411 attaches the appropriate VCI/VPI either obtained from the AR table or the AR response to the cell for transmitting the datagram and the cell is outputted to the network. Here, the attached VCI/VPI are the identifiers of an ATM connection 441 from the terminal 411 to the CLSF 414, so that the outputted cell reaches to the CLSF 414 through this ATM connection 441. At the CLSF 414, the address data of the received datagram is analyzed, and the VCI/VPI of an ATM connection 442 for transmitting the datagram to the destination terminal 412 are attached to the cell, and the cell is outputted to the network. The outputted cell then reaches to the destination terminal 412 through the ATM connection 442.

In this alternative procedure, there is a need to provide star-shaped ATM connections from the CLSF 414 to all the terminals. Also, the exchange of the AR request and the AR response can be realized by using the point-to-point ATM connections as shown in FIG. 8, or by using a broadcast channel.

Here, the address resolution procedure at the ARS 413 can be realized by the search on the address space data (address mask) of the network. Namely, as will be described below, it suffices for the ARS 413 to analyze the network address space in which the destination terminal is present, even for the destination terminal in the external network 416, and there is no need to resolve the VCI/VPI data for making a direct access through the ATM connection to the destination terminal.

Figure 9:
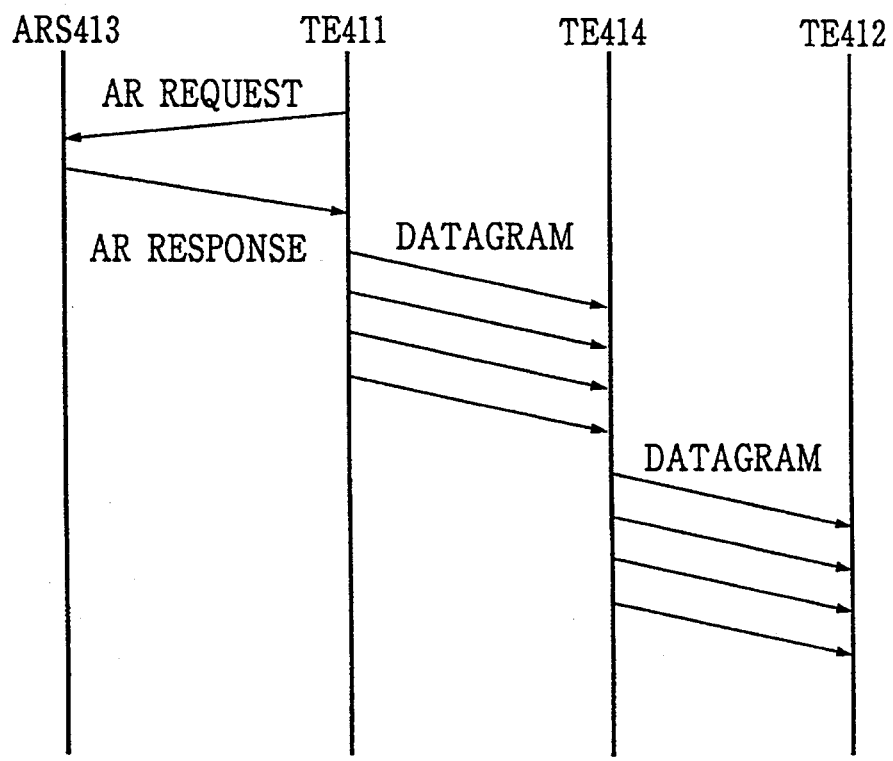
FIG. 9 is a data exchange diagram for the alternative procedure for the first case of the datagram delivery within sub-network shown in FIG. 8.

Thus, in this case, the datagram delivery is achieved by the data exchange among the ARS 413, the CLSF 414, and the terminals 411 and 412 as represented in FIG. 9, which shows a case in which a number of datagrams are taken at the CLSF 414 and then transmitted to the terminal 412 collectively. Here, however, it is also possible to use the pipeline type datagram transmission if desired.

2. Case Using VPI Routing

Figure 10:
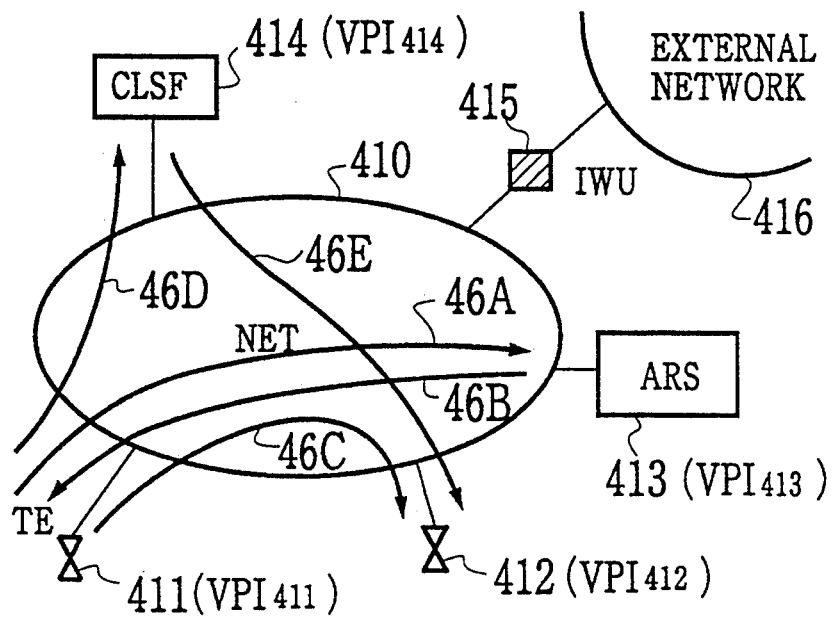
FIG. 10 is a partial network diagram of the ATM communication system according to the present invention, showing a second case of the datagram delivery within sub-network.

In this case, each network element of the sub-network 410 is assigned with VPI as indicated in FIG. 10. Here, each terminal/server is equivalent to have a multipoint-to-point ATM connection from all UNI (User Network Interface) points within the sub-network 410. In other words, when the cell attached with the VPI of the destination terminal is outputted to the network from one terminal, the cell is transmitted to the destination UNI point. For example, in order to transmit the cell to the ARS 413, the VPI to be attached to the cell is $VPI_{413}$ assigned to the ARS 413.

In this case, the procedure similar to that shown in FIG. 5 described above can be realized by using the connections 46A, 46B, and 46C. Namely, the terminal 411 transmits the AR request cell with the VPI data of the $VPI_{413}$ to the ARS 413. Here, the ARS 413 can recognize that the received cell is transmitted from the terminal 411 according to the VCI data or the upper layer identifier. For example, when the VPI data of the $VPI_{411}$ assigned to the terminal 411 is written in the VCI field, the ARS 413 can recognize that the cell from the terminal 411 by the ATM header. Alternatively, the VCI data can be the identification number for positively identifying the cell as the AR request cell for the datagram transmission.

Then, the ARS 418 carried out the address resolution for the destination terminal 411, and writes $VPI=VPI_{411}$ in the AR response cell and outputs the AR response cell to the network. Just as in the ARS 418, the terminal 411 then recognizes that the received cell is the AR response cell according to the VCI data or the upper layer header data. Here, the AR response cell at least contains $VPI_{412}$ which is the access address data for the terminal 412.

Then, the terminal 411 transmits the cell for the datagram transmission to the terminal 412. Here, the terminal 412 can recognizes that the received cell is the cell for the datagram transmission from the terminal 411 according to an identification data which is either the VCI data or the upper layer header data, and this identification data may be notified from the ARS 411 to the terminal 411 as the data content of the AR response.

As a simplest method for identifying the transmission source and the cell type at the receiving side in the above procedure, the VCI field can be given by the first 8 bits indicating the VPI data of the transmission source and the remaining 8 bits indicating the cell type.

For the cell transmitted from the terminal 411 to the terminal 412, the coding of the VCI field (16 bits) can be any one of the following.

(1) The first 8 bits for the access address of the own terminal (the same number as the VPI number), and the remaining 8 bits for the identification number indicating the connection-less communication.

(2) The first 8 bits for the access address of the own terminal, and the remaining 8 bits for the identification number of the own network. Here, there is a need for each terminal to obtain the VPI for the connection-less (CL) communication separately from the VPI for the connection-oriented (CO) communication. i.e., to use different VPIs for CL and CO.

(3) All 16 bits set at a time of the boot of the terminal. It is also possible for the receiving side terminal to assign them appropriately.

On the other hand, the procedure similar to that shown in FIG. 8 described above can be realized by using the connections 46A, 48B, 48D, and 48E. Namely, the terminal 411 transmits the AR request cell with the VPI data of the $VPI_{413}$ to the ARS 413. Then, the ARS 413 carried out the address resolution for the destination terminal 412, and writes $VPI=VPI_{414}$ in the AR response cell and outputs the AR response cell to the network. Here, the AR response cell at least contains $VPI_{414}$ which is the access address data for the CLSF 414. Also, the CLSF 414 can recognizes that the received cell is the cell for the datagram transmission from the terminal 411 according to an identification data which is either the VCI data or the upper layer header data, and this identification data may be notified from the ARS 411 to the terminal 411 as the data content of the AR response.

The CLSF 414 then analyzes the address data of the received cell, and attaches the $VPI=VPI_{412}$ for transmitting the datagram cell to the terminal 412 and outputs the cell to the network. Then, the cell is transmitted to the terminal 412 through the ATM connection 46E.

In this case, any of the following five schemes can be adopted.

(1) The resolution of the access address for the destination terminal is carried out by the CLSF 414. Here, the CLSF 414 analyzes the address of the destination terminal according to the network layer address (or address of the other layer if desired) written in the received datagram. At this point, the datagram is re-assembled at the CLSF 414 once.

(2) The resolution of the access address for the destination terminal is carried out by the CLSF 414. Here, the CLSF 414 analyzes the address of the destination terminal according to the network layer address (or address of the other layer if desired) written in the received datagram. At this point, the datagram is not re-assembled at the CLSF 414 once, and the cell is relayed by the pipeline processing. In other words, the access address of the destination terminal is analyzed by analyzing the address data written in the first cell of the datagram, and the subsequent cells are relayed to the destination terminal by rewriting the VPI/VCI according to the VCI data of the first cell. Here, it is necessary for the CLSF 414 to assign different VCI for each datagram.

(3) The resolution of the access address for the destination terminal is carried out by the transmission terminal, and written into the payload section of the first cell. The CLSF 414 receiving the first cell then reads the payload section of the first cell, and transmits the cell to the destination terminal accordingly. At this point, the datagram is re-assembled at the CLSF 414 once.

(4) The resolution of the access address for the destination terminal is carried out by the transmission terminal, and written into the payload section of the first cell. The CLSF 414 receiving the first cell then reads the payload section of the first cell, and transmits the cell to the destination terminal accordingly. At this point, the datagram is not re-assembled at the CLSF 414 once, and the cell is relayed by the pipeline processing. In other words, the access address of the destination terminal is analyzed by analyzing the address data written in the first cell of the datagram, and the subsequent cells are relayed to the destination terminal by rewriting the VPI/VCI according to the VCI data of the first cell.

Here, it is necessary for the CLSF 414 to assign different VCI for each datagram.

(5) The resolution of the access address for the destination terminal is carried out by the transmission terminal, and transmitted to the CLSF 414 by utilizing the VCI field. In other words, the VCI is given by the first 8 bits for the access address of the destination terminal and the remaining 8 bits for the access address of the transmission source terminal. The CLSF 414 relays the cell to the destination terminal by copying the destination terminal address in the VCI field. Here, the relaying can be done by either re-assembling the datagram once, or by the pipeline type cell relaying.

DATAGRAM DELIVERY TO EXTERNAL NETWORK IN HIERARCHICAL NETWORK

Next, various schemes for the datagram delivery to the destination terminal in the external network will be described.

1. General ATM Network: Scheme I

Figure 11:
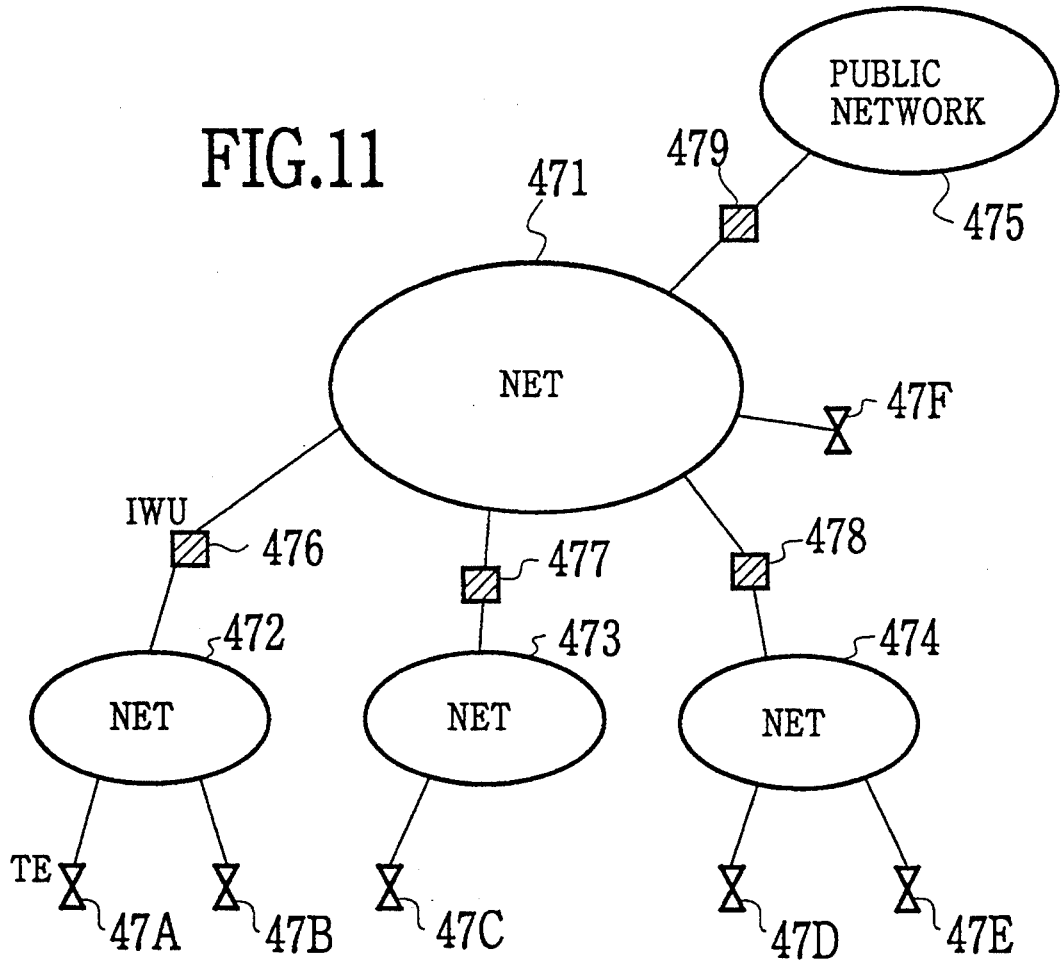
FIG. 11 is a schematic overall network diagram of the ATM communication system according to the present invention in a case of the hierarchical network topology.

In this case, an exemplary hierarchical network architecture is as shown in FIG. 11 which comprises networks 471 to 475 with the inter-networking provided by the IWUs 476 to 479, including a public network 475 connected with the network 471 through an IWU 479. Here, each of the IWUs 476 to 479 can realize the relaying of the ATM cells without terminating the ATM connection, by having a function to convert the VCI/VPI of the received cell into VCI/VPI assigned to the corresponding ATM connection in the neighboring network.

Figure 12:
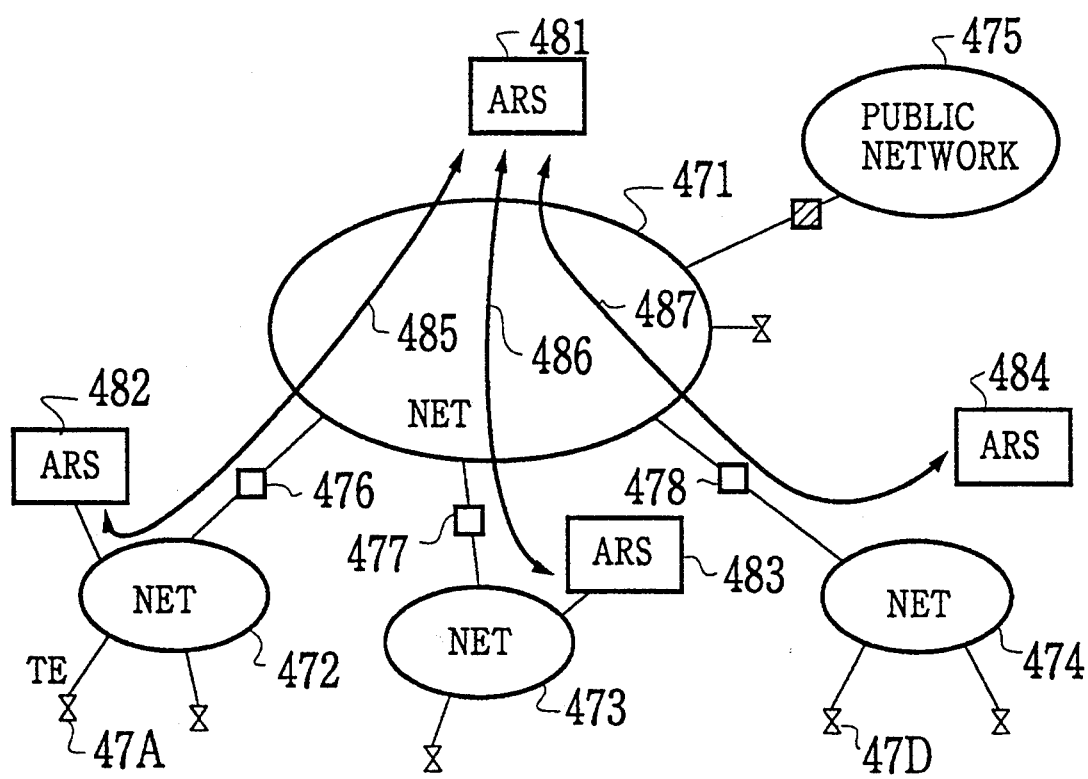
FIG. 12 is a schematic network diagram of the network of FIG. 11 for an address resolution in a first case of the datagram delivery to external network.

FIG. 12 shows the setting of the ATM connections related to the address resolution in which the networks 471 to 474 are also equipped with the ARSs 481 to 484, respectively, each for managing the address data of the terminals or the network itself for at least one of the networks 471 to 474 to which each of which belongs, where the ARS 481 is connected with the ARSs 482 to 484 through the ATM connections 485 to 487.

Figure 13:
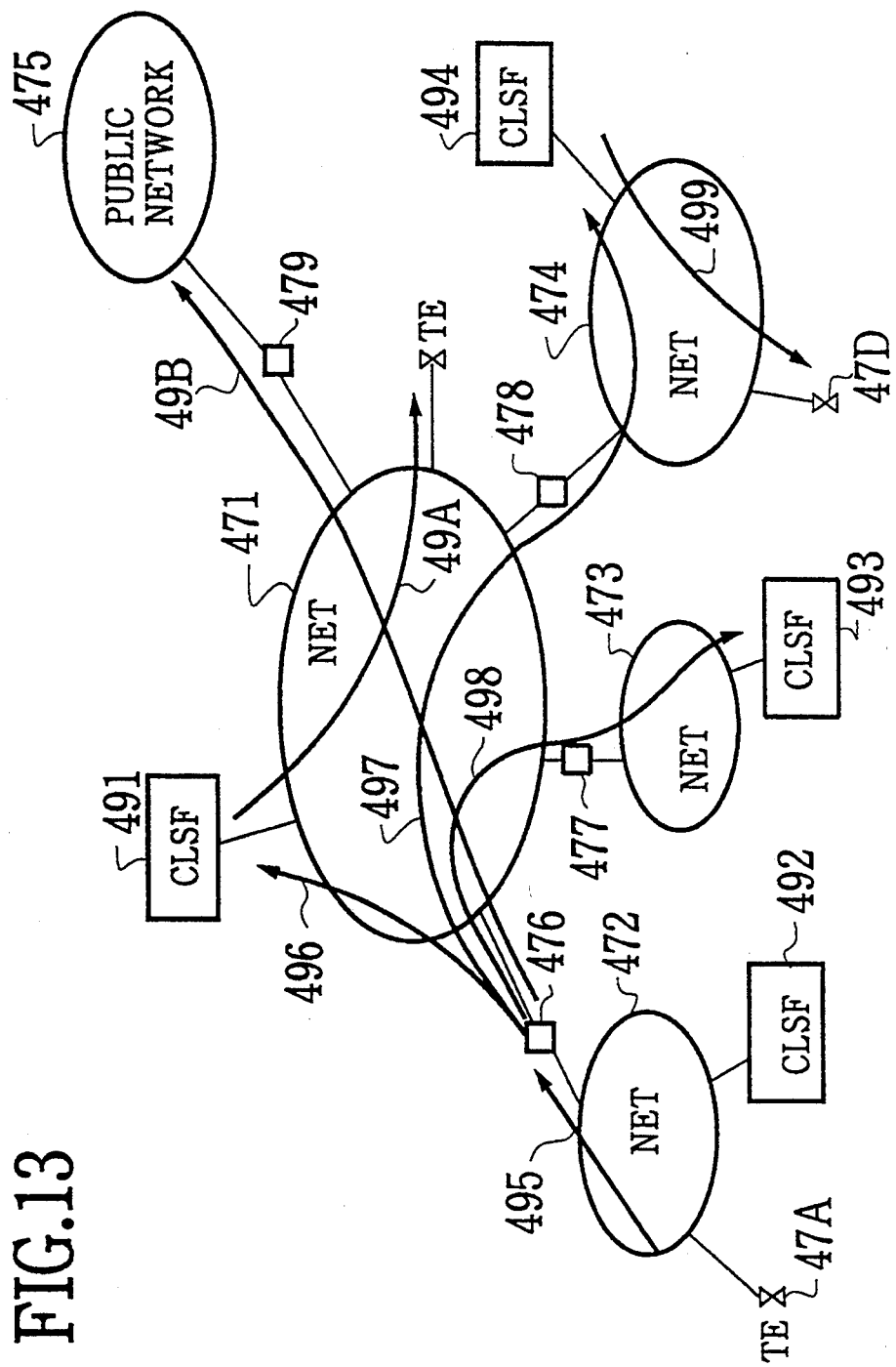
FIG. 13 is a schematic network diagram of the network of FIG. 11 for a datagram transmission in a first case of the datagram delivery to external network.

FIG. 13 shows the setting of the ATM connections 496, 497, 498, and 49B required for transmitting the datagrams from the network 472 to the other networks 471, 472, 474, and 475, respectively, where the ATM connections 486, 487, and 498 are single direction ATM connections from the IWU 476 of the network 472 to the CLSFs 491,493, and 494. respectively, while the ATM connection 49B is an ATM connection to a CLSF (not shown) of the public network 475 which is usually set to be bidirectional. Although not shown in FIG. 13, the similar bidirectional ATM connection from each of the other networks 471,473, and 474 to the public network 475 are also provided. Here, any of the CLSFs and the ARSs can be located at positions of the corresponding IWUs if desired. Also, each corresponding CLSF and ARS can be located at the identical position.

For the connection-less communication cell to be transmitted from the public network 475 to any of the networks 471 to 474, there is provided a server (not shown) for terminating the connection-less communication (ATM connection) to the public network 475 once within the network 471, such that from the public network 475 side, this server is defied as the access point for the connection-less communication. This server terminates the ATM connection and then transmits the datagram to the destination terminal. Here, the datagram transmission from this server is the same as the datagram transmission from each terminal to the other terminal.

In this case, the terminal protocol, i.e., the procedure for transmitting the datagram of the connection-less communication from one terminal to the destination terminal is as follows.

(1) The terminal makes the AR request. This can be done either always or only in a case the address resolution cannot be succeeded by the terminal itself such as a case in which a suitable entry is present in the AR table.

(2) The terminal obtains the VCI/VPI data, which is the identifier of the ATM connection, provided from the ARS in order to make access to the destination terminal.

(3) The terminal attaches the obtained VCI/VPI to the cell and outputs the cell to the network, so as to perform the datagram transmission.

Here, at a time of the datagram transmission, there is no need for the terminal to carry out the procedure for setting up a particular connection defined in the ATM network.

As for the protocol for the ARS in this case, the following two types are available.

(i) A backbone ARS

In this case, the star-shaped ATM connections (bidirectional communication channels) have been established from the ARS 481 in the network 471 to the ARSs 482 to 484 in the networks 472 to 474, respectively. For example, in order to obtain the VCI/VPI for transmitting the datagram from the terminal 47A to the terminal 47D, the terminal 47A transmits the AR request cell having the address data of the terminal 47D to the ARS 482 of its own network 472. The ARS 482 which received this AR request cell then recognizes that the address of the destination terminal written in the received cell does not belongs to its own network 472, and carries out the relaying of the AR request cell through the already set up ATM connection 485 to the ARS 481 in the network 471. Alternatively, it is also possible for the ARS 482 to cache the network address data of the external network previously obtained and the VCI/VPI data for transmitting the cell to the corresponding CLSF through the ATM connection 485 in advance.

The ARS 481 analyzes the VCI/VPI data for transmitting the datagram to the CLSF in the network 474 to which the datagram is to be transmitted according to the address data of the destination terminal 47D written in the received cell, and transmits the obtained VCI/VPI data to the ARS 482. The ARS 482 then returns the AR response indicating the VCI/VPI data to be used at the terminal 47A as the VCI/VPI data received from the ARS 481.

Here, the address resolution at the ARS 481 is carried out as follows. Namely, the ARS 481 has the address data (address space data such as net/ID) of the terminals contained in its own network 471 and the address space data for the sub-networks 472 to 474. Then, the ARS 481 analyzes the transmission target network by comparing the address written in the received AR request cell with the address space data for each sub-network. Here, at a time of this comparison, it is not necessary for the ARS 481 to analyze the host address of the destination address, and it suffices to analyze only up to the network address.

As for the method for identifying the datagram directed to the public network 475, the following two methods are available.

(a) The address data written in the AR request cell indicates whether it is the datagram explicitly directed to the public network 475, or it is the datagram not directed to the public network 475. In other words, this is a case in which the terminal knows whether it is the datagram directed to the public network or not at the time of the request. In this case, the terminal 472 transmits the request cell in a form by which the ARS 481 can explicitly recognize whether it is the datagram directed to the public network 475 or not. In a case it is the address data not coinciding with the addresses directed to the public network 475, and when that address is not present in the address entries in the ARS 481, the data indicating the absence of the requested address is transmitted to the ARS 482.

(b) When the address written in the received AR request cell cannot be found in the address entries in the ARS 481, this address is judged as that which belongs to the public network 475.

In this manner, the ARS 481 possesses the addresses and the address space data of the terminals belonging to the network 471 and the sub-networks 472, 473, and 474, so as to carry out the address resolution.

Figure 14:
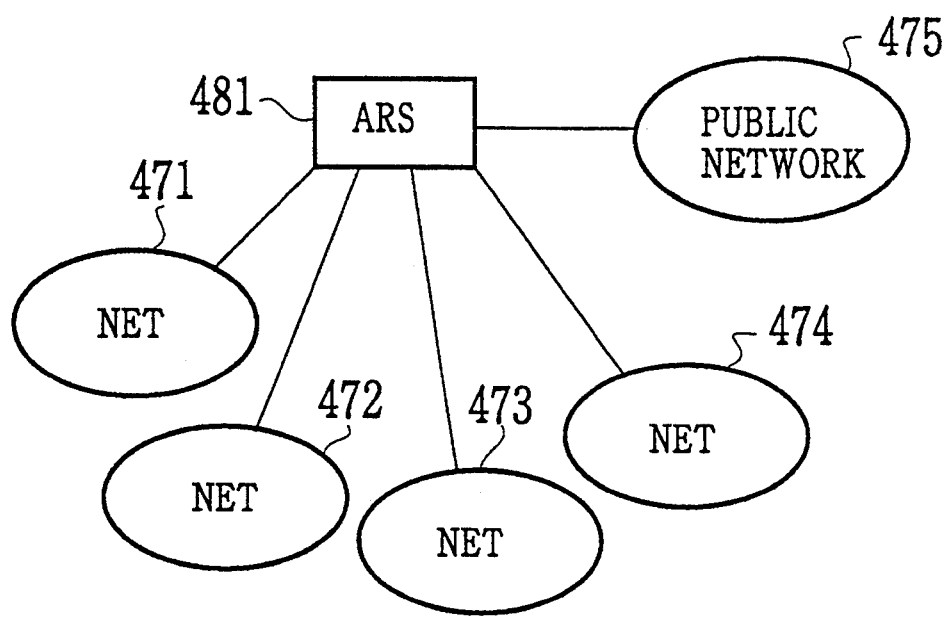
FIG. 14 is a schematic diagram of an address space view from one address resolution server in the case of the datagram delivery to external network shown in FIG. 12.
Figure 15:
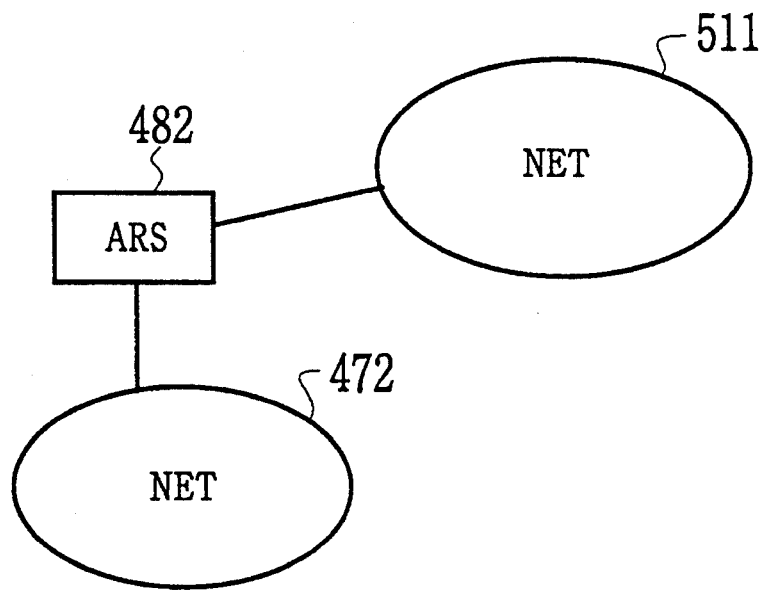
FIG. 15 is a schematic diagram of an address space view from another address resolution server in the case of the datagram delivery to external network shown in FIG. 12.

The address space views of the neighboring sub-networks from the perspectives of ARSs 481 and 482 in this case are shown in FIG. 14 and FIG. 15, respectively. As shown, from the ARS 482, the other networks are collectively appearing as the network 511 connected at the IWU 476 and not as a plurality of sub-networks. The address space of each sub-network can be resolved only after the data exchange with the ARS 481 has taken place.

The address data (ATM layer address data) received by the ARS 482 from the ARS 481 is the data indicating the identifier (normally VCI/VPI, but may contain the identification data for the upper layer) or the ATM connection to the CLSF in the target sub-network from the IWU 476. For example, at a time of the datagram transmission from the terminal 47A to the terminal 47D, the identifiers of the ATM connections 495 and 497 for accessing the CLSF 494 are notified as the AR response, whereas at a time of the datagram transmission from the terminal 47A to the terminal 47F, the identifiers or the ATM connections 495 and 496 for accessing the CLSF 491 are notified as the AR response. Here, the ARS 482 notifies the VCI/VPI data for correctly relaying the ATM connection at the IWU 476 to the terminal 47A, according to the VCI/VPI data received from the ARS 481. The VCI/VPI data notified to the terminal 47A is then rewritten into the other VCI/VPI at the IWU 478.

(ii) A Front End ARS

Figure 16:
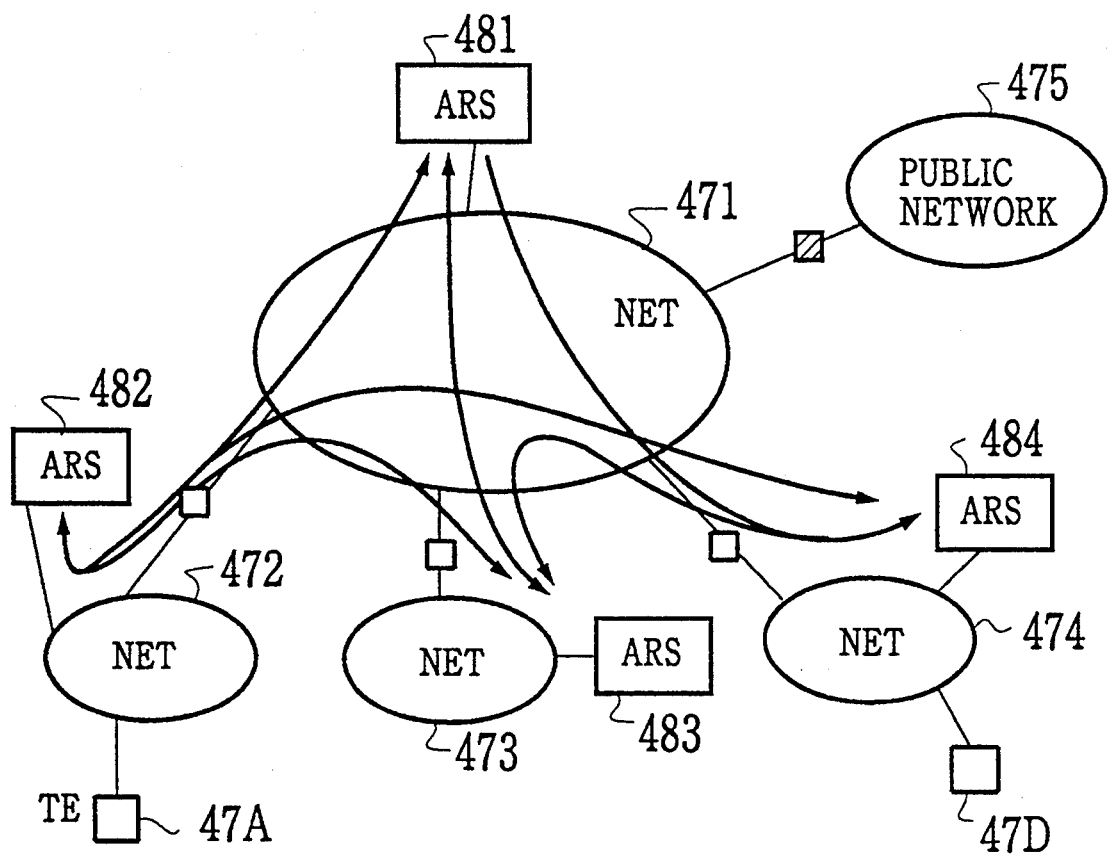
FIG. 16 is a schematic network diagram of the network of FIG. 11 for an alternative procedure for an address resolution in a first case of the datagram delivery to external network.

In this case, the star-shaped ATM connections as shown in FIG. 12 described above is formed from the ARS 481 in the network 471 to the ARSs 482 to 484 in the networks 472 to 474, respectively, or the meshed ATM connections as shown in FIG. 16 is formed by the ARSs 481 to 484. Each ARS obtains the address space data and the ATM connection data (VCI/VPI) for the external sub-networks viewed from its own sub-network using the ATM connections defined as shown in FIG. 12 or FIG. 16. Here, FIG. 12 is in a form in which the ARS 481 functions as a master ARS, while FIG. 16 is in a distributed form in which each ARS operates independently. In a case the number of hierarchical levels in the network is at most three, a case of FIG. 12 to make the backbone network as the master is more appropriate.

On the other hand, in a case there is no limit to the number of hierarchical levels in the network, which one of FIG. 12 and FIG. 16 is to be selected depending on the form of the network, management state, and a number of sub-networks provided in the network. For example, in order to obtain the VCI/VPI for transmitting the datagram from the terminal 47A to the terminal 47D, the terminal 47A transmits the AR request cell having the address data of the terminal 47D to the ARS 482 of its own network 472. The ARS 482 which received this AR request cell then recognizes that the address of the destination terminal written in the received cell belongs to the network 474, and transmits the VCI/VPI data for transmitting the datagram to the CLSF in the network 474 to which the datagram is to be transmitted according to the address data of the destination terminal 474 to the terminal 47A as the AR response.

Here, the address resolution at the ARS 482 is carried out as follows. Namely, the ARS 482 has the address data (address space data) of the terminals contained in its own network 472 and the address space data for the sub-networks 471,473, and 474. Then, the ARS 482 analyzes the transmission target network by comparing the address written in the received AR request cell with the address space data for each sub-network. Here, at a time of this comparison, it is not necessary for the ARS 482 to analyze the host address of the destination address, and it suffices to analyze only up to the network address.

As for the method for identifying the datagram directed to the public network 475, the following two methods are available.

(a) The address data written in the AR request cell indicates whether it is the datagram explicitly directed to the public network 475, or it is the datagram not directed to the public network 475. In other words, this is a case in which the terminal knows whether it is the datagram directed to the public network or not at the time of the AR request. In this case, the terminal 472 transmits the AR request cell in a form by which the ARS 481 can explicitly recognize whether it is the datagram directed to the public network 475 or not. In a case it is the address data not coinciding with the addresses directed to the public network 475, and when that address is not present in the address entries in the ARS 482, it is judged that the requested address is absent.

(b) When the address written in the received AR request cell cannot be found in the address entries in the ARS 482, this address is judged as that which belongs to the public network 475.

In this manner, the ARS 482 possesses the addresses and the address space data of the terminals belonging to the network 472 and the sub-networks 471,473, and 474, so as to carry out the address resolution.

Figure 17:
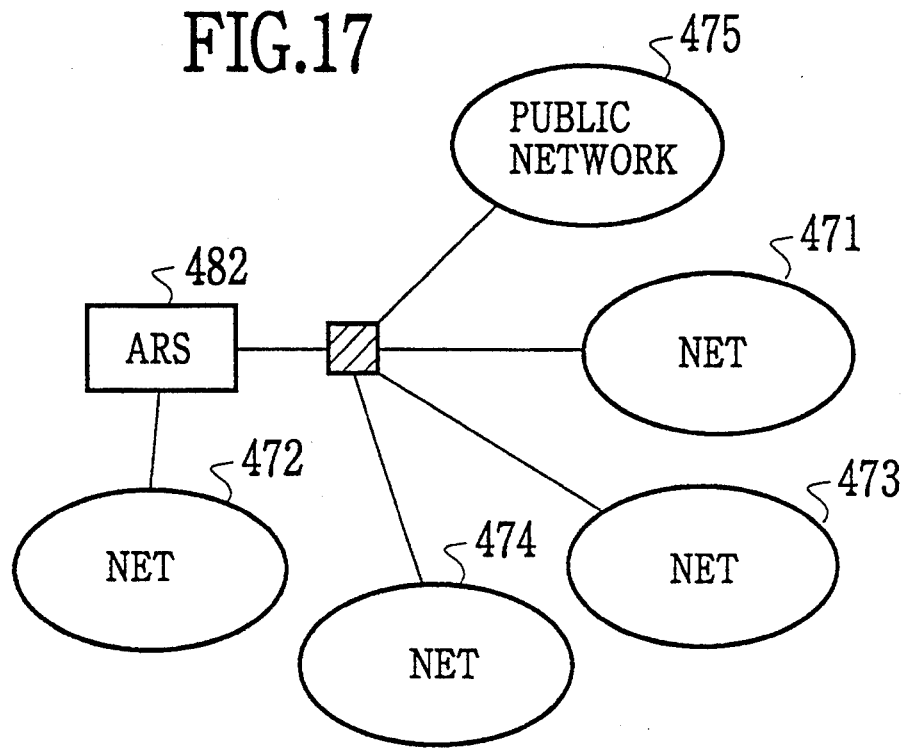
FIG. 17 is a schematic diagram of an address space view from one address resolution server in the case of the datagram delivery to external network shown in FIG. 16.
Figure 18:
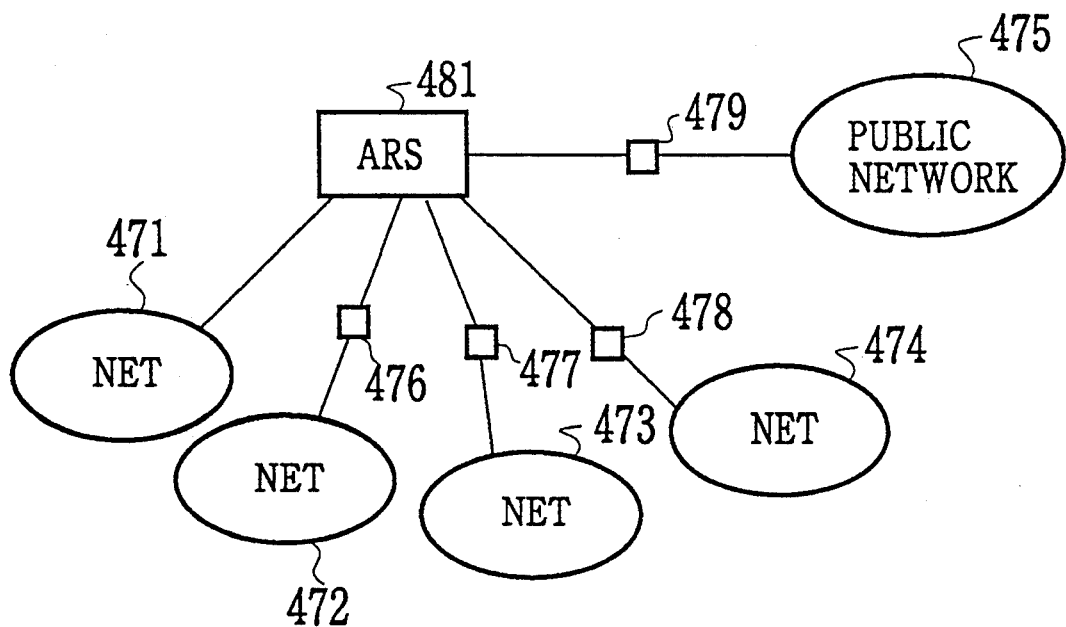
FIG. 18 is a schematic diagram of an address space view from another address resolution server in the case of the datagram delivery to external network shown in FIG. 16.

The address space views of the neighboring sub-networks from the perspectives of ARSs 482 and 481 in this case are shown in FIG. 17 and FIG. 18, respectively. As shown, from either one of the ARS 481 and the ARS 482, the entire address space of each sub-network can be resolved.

The address data (ATM layer) received by the ARS 482 from the other ARS is the data indicating the identifier (normally VCI/VPI, but may contain the identification data for the upper layer) of the ATM connection to the CLSF in the target sub-network from the IWU 478. For example, at a time of the datagram transmission from the terminal 47A to the terminal 47D, the identifiers of the ATM connections 495 and 497 for making an access to the CLSF 494 are notified as the AR response, whereas at a time of the datagram transmission from the terminal 47A to the terminal 47F, the identifiers of the ATM connections 495 and 496 for making an access to the CLSF 491 are notified as the AR response. Here, the ARS 482 notifies the VCI/VPI data for correctly relaying the ATM connection at the IWU 476 to the terminal 47A, according to the VCI/VPI data received from the other ARS. The VCI/VPI data notified to the terminal 47A is then rewritten into the other VCI/VPI at the IWU 476.

Among ARSs, not only the address space data exchange protocol for each sub-network, but also the routing protocol concerning the datagram transmission (connection-less communication) among the sub-networks is also operated. More specifically, this routing protocol carries out the management of the ATM connection setting between the IWU and the CLSF as shown in FIG. 13 described above. Here, the individual ATM connection is separated at the (i.e., closed within the sub-network), and the ATM connection routing control and the ATM connection management (such as VCI/VPI management) are made by the other ATM connection server process and the routing server process, and the ARS exchanges the control messages with these servers as well as the IWU to carry out the management of the ATM connections necessary for the connection-less communication.

Figures 19, 20:
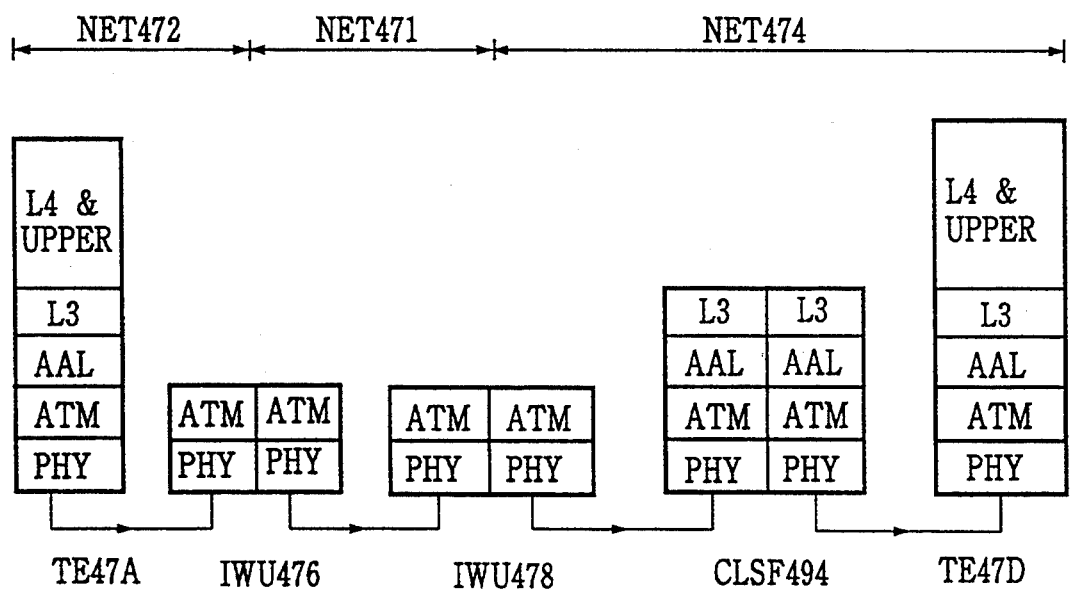
FIG. 19 is a diagrammatic illustration of a VCI/VPI reqriting table used in the case of the datagram delivery to external network shown in FIG. 13.
FIG. 20 is a diagram of data layer sequence for a protocol processing in the case of the datagram delivery to external network shown in FIG. 13.

An example of a VCI/VPI rewriting table to be possessed by the IWU 476 is shown in FIG. 19. Here, there is no need to use the different output VCI/VPI to be attached in transmitting the cell to the same CLSF. It is also possible to combine the VCI/VPI data with the identification data in the upper layer unit such that it becomes possible for the destination CLSF to recognize the datagram to which the received cell belongs. Similarly, there is no need to use the different input VCI/VPI attached to the cells transmitted from the same terminal.

There is also a case requiring the use of the ATM connection having different route from the normally used ATM connection due to the congestion or the obstruction in the sub-network. In such a case, the routing control process for carrying out the management control of the VCI/VPI to be set up in the table of each switch as well as the routing table data (where the control process for carrying out the address management can be the other process) carries out the management control such that the VCI/VPI the same VCI/VPI to be shows to the UNI can be maintained even when the route within the sub-network is changed.

Next, when the access point of the various server such as CLSF is moved, it suffices to reboot it such that the connection identifiers (VCI/VPI) visible from each access point becomes the same. Also, at a time of the reboot, with respect to the related access point, the request message for discarding the data for the old access from the AR table is transmitted along with the new access data if necessary. In the latter case, there is a need for the IWU to update the entry data in the table of FIG. 19, either according to the data within the transmitted message or by executing the protocol for obtaining the new data.

Next, the routing to the destination terminal in this case will be described. The final delivery of the datagram to each terminal is carried out by each CLSF only for its own network. For example, the CLSF 491 carries out the datagram delivery to the terminals belonging to the network 471 but not for the networks 472, 473, 474, and 475. Similarly, the CLSF 494 carries out the datagram delivery to the terminals within the network 494 alone. When the network address possessed by the datagram received at each CLSF is not present in the address entries possessed by that CLSF, or when the address of the received datagram is not elements of the network address space of the network, it is judged that that datagram has been transmitted Incorrectly. The treatment of the erroneously delivered datagram will not be discussed here.

Thus, it suffices for each CLSF to possess only the address data of the terminals of the network to which that CLSF itself belongs. When the address of the received datagram is present in its own network, the appropriate ATM connection is selected and the relaying of the datagram is carried out.

An exemplary protocol processing in a case of transmitting the datagram from the terminal 47A to the terminal 47D is shown in FIG. 20. Namely, the ATM connection is terminated at the CLSF 494 once, i.e., the protocol of the OSI layer 3 is terminated at the CLSF 494. The OSI layer 3 protocol processing is carried out at the CLSF 494, and the data unit is transmitted to the terminal 47D using the ATM connection. In this manner, at a time of the datagram transmission to the terminal other than those of its own sub-network, the end-to-end datagram delivery can be realized with only one ATM connection termination.

Figure 21:
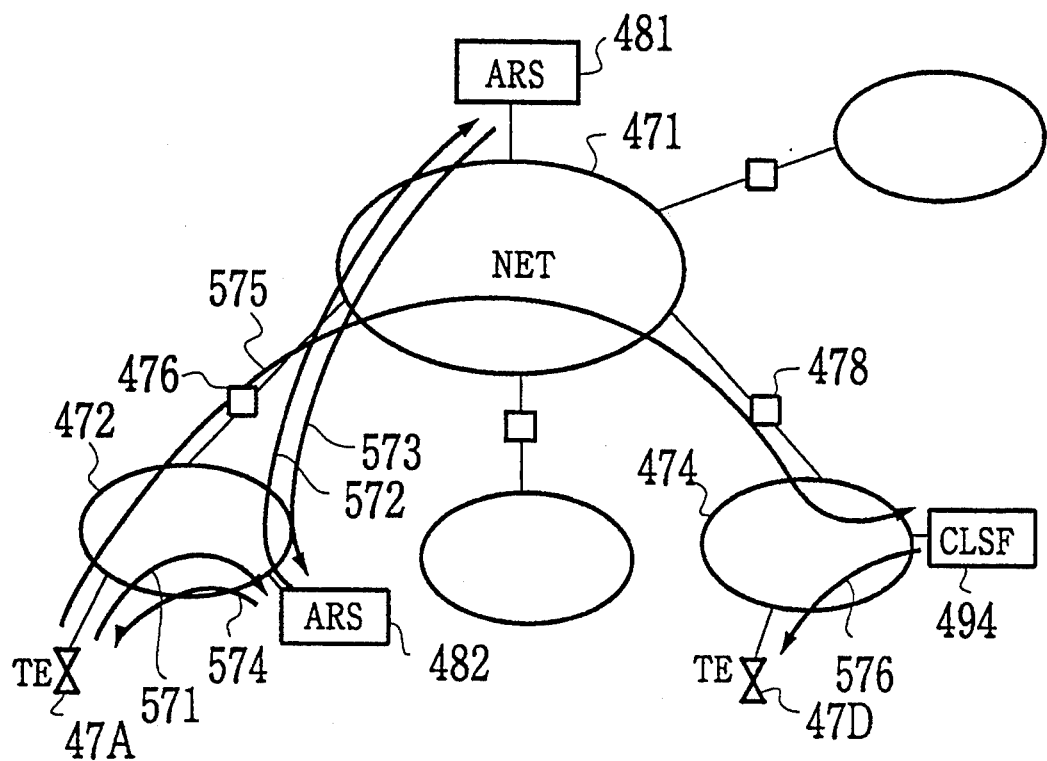
FIG. 21 is a schematic network diagram of the network of FIG. 11 for one exemplary case of the datagram delivery to external network.

Now, more concrete example of this case will be described in detail. Namely, the exemplary case of transmitting the datagram from the terminal 47A to the terminal 47D will be illustrated for two situations shown in FIG. 21 corresponding to the management views of FIGS. 14 and 15, and FIG. 22 corresponding to the management views of FIGS. 17 and 18.

In this case, the address resolution is carried out as follows.

In transmitting the datagram from the terminal 47A to the terminal 47D, when the terminal 47A does not possess the ATM layer address data for transmitting the datagram to the terminal 47D, the terminal 47A transmits the AR request cell having the address data of the terminal 47D to the ARS 482 through the ATM connection 571 (581). Here, the ATM connection 571 (581) can be realized by either the point-to-point connection or the broadcast connection. The ARS 482 which received the AR request cell recognizes that the address requested by the All request cell does not belongs to its own network 472, so that in the situation of FIG. 21, the ARS 482 transmits the AR request cell to the ARS 481 through the ATM connection 572. Here, the procedure for the ARS 482 to receive the AR request cell and then transmit the AR request cell to the ARS 481 can be any of the following.

(1) In a case the ARS is responsible for responding to all the All request cells generated within its network, the ARS carries out the screening of the AR request cells first. Namely, whether the address in the received cell is the element of the address space of its own network or not is checked by using the network mask, etc.. If the address belongs to its own network, the address table is looked up and the ATM layer address data for the appropriate terminal is returned. On the other hand, when the address does not belongs to its own network, the AR request cell is transmitted to the prescribed superior ARS which is the ARS 481 in the example of (2) In a case the ARS makes the response only to the request for transmitting the datagram to the terminal belonging to the sub-network other than its own network, and the response to the AR request for the terminal within its own network is returned by the terminal to which the datagram is to be transmitted itself, the result differs for a case of using the broadcast channel and a case of using the point-to-point connection at a time of the address resolution. In a case of using the broadcast channel, after the screening of the address is carried out, the AR request cell is taken and transmitted to the superlot ARS. On the other hand, in a case of using the point-to-point connection, the AR request cell transmitted to the superior ARS unconditionally in principle.

Figure 22:
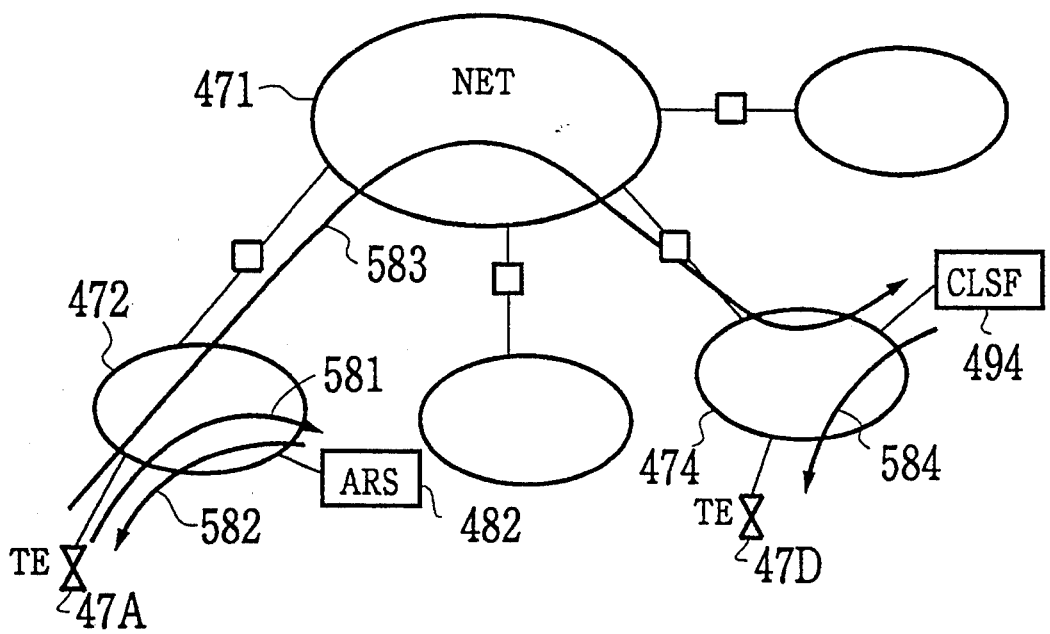
FIG. 22 is a schematic network diagram of the network of FIG. 11 for another exemplary case of the datagram delivery to external network.

In the example of FIG. 22, the ARS 481 which received the AR request cell checks if the address in the AR request cell is contained in the addresses and the address space contained in its own network. In a case the corresponding address is not present in the address entries, it is Judged as the address directed to the public network. In this example, the destination terminal is the terminal 47D, so that the ARS 471 recognizes that the address in the request cell is present in the address space of its own network 474 and therefore the address space data possessed by the network 474 can be used. The ARS 481 which analyzed the address of the terminal 47D returns the response indicating the VCI/VPI data of the ATM connection from the IWU 476 to the CLSF 494 (VCI/VPI data viewed from the IWU 476) to the ARS 482.

The ARS 482 then returns the VCI/VPI data which is the identification data of the ATM connection to be relayed to the ATM connection connected to the CLSF 494 at the IWU 476 to the terminal 47A. By using this VCI/VPI, the terminal 47A can deliver the datagram directly to the CLSF 494.

In the example of FIG. 22 in which the ARS 482 can make the address resolution by itself, with respect to the AR request given through the ATM connection 581, the AR response can be directly transmitted to the terminal 47A through the ATM connection 582.

Now, in this case, the datagram delivery is carried out as follows.

The terminal 47A transmits the cell having the datagram information to the CLSF 494 through the ATM connection 575 (583). The IWUs 476 and 478 carries out the relaying of the ATM connection by rewriting the VCI/VPI data of the received cell. This processing is carried out as the ATM layer processing without raising it to the upper layer, so that the ATM connection 575 (583) passing through the IWUs 476 and 478 can be regarded as one ATM connection without the ATM terminal point.

At the CLSF 494 which is the terminal point of the ATM connection 575 (583), the network layer processing is carried out. The CLSF 494 carries out the analysis of the network address, and the datagram is relayed to the ATM connection 576 (584) and transmitted to the terminal 47D.

In this manner, there are only two ATM connections from the terminal 47A to the CLSF 494, and from the CLSF 494 to the terminal 47D, so that they are terminated only once.

2. Case using VPI Routing: Scheme I

In this case, the ATM layer address assignment method will be described first.

In a case of carrying out the VPI routing, the VPI field (VPI-F) indicates the destination UNI. There is a need to define the coding scheme of the VCI field as follows. Here, the coding of the VCI field is related to the cell transmission concerning the connection-less communication, and it is not necessary to use this coding for the other applications such as the connection-oriented connection. In other words, in general, the coding scheme of the VCI field can be carried out by the negotiation between the transmitting terminal and the receiving terminal. Here, 16 bits of the VCI field are defined to form two 8 bits sub-fields referred hereafter as VCI-F1 and VCI-F2.

Figure 23:
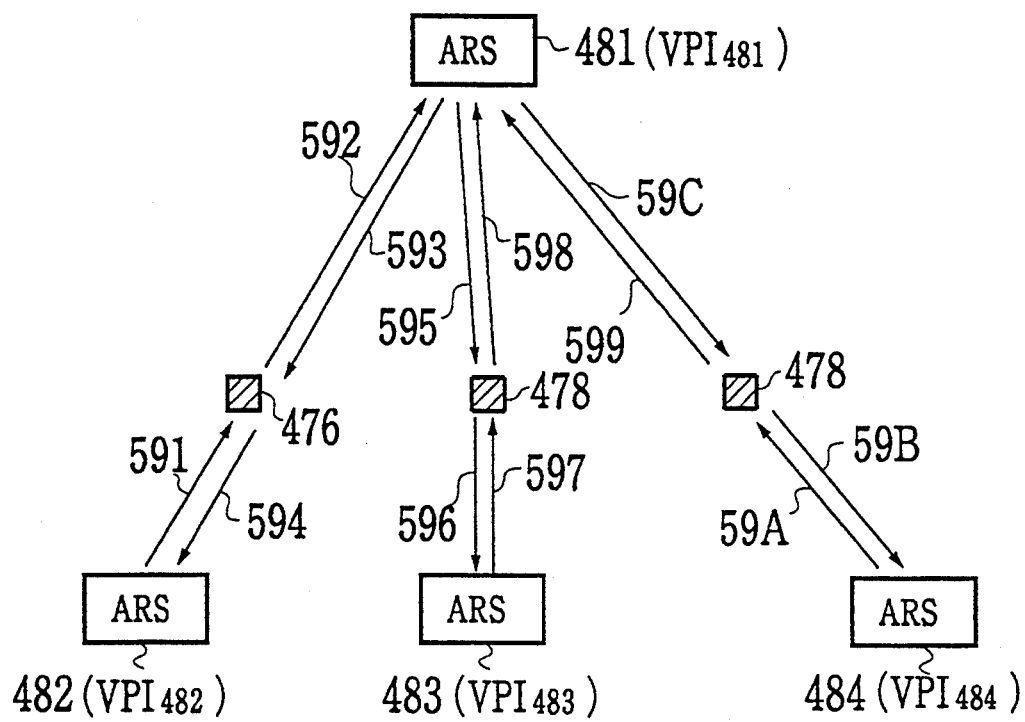
FIG. 23 is a diagram for one procedure of an address data management in a second case of the datagram delivery to external network.
Figure 24:
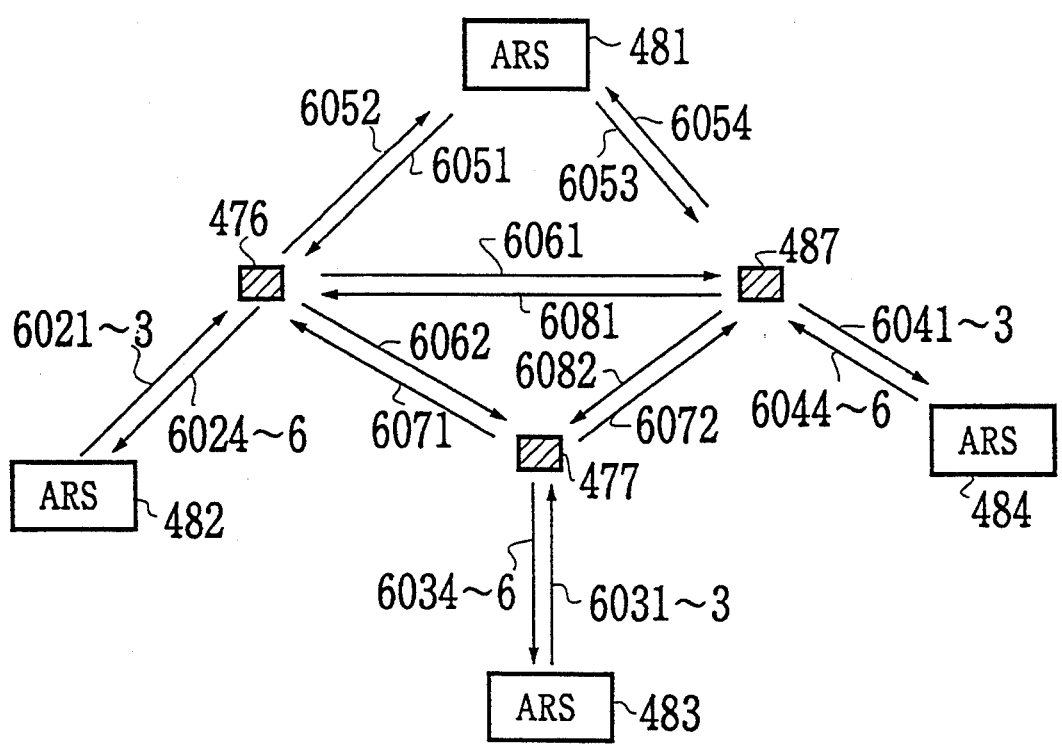
FIG. 24 is a diagram for another procedure of an address data management in a second case of the datagram delivery to external network.
Figure 25:
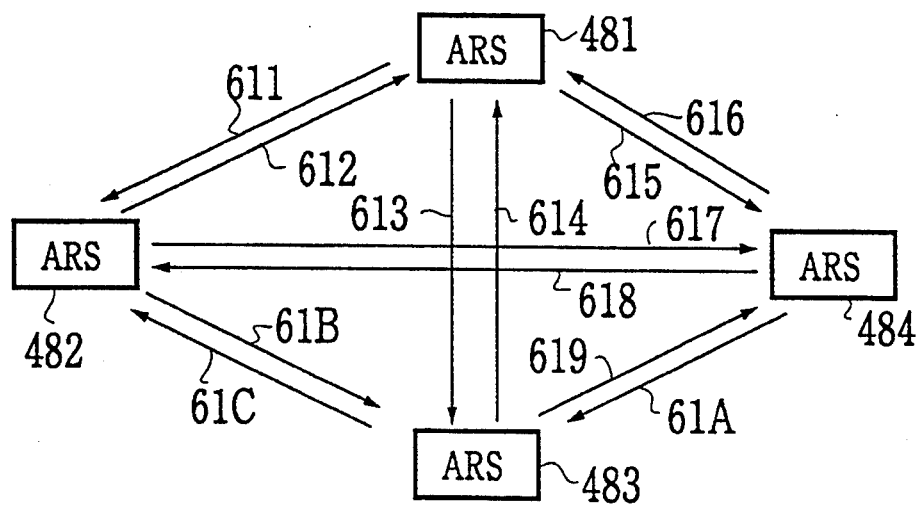
FIG. 25 is a diagram for still another procedure of an address data management in a second case of the datagram delivery to external network.

In this case, the ATM connections are set up such that the setting of the ATM connections related to the address resolution are as shown in FIGS. 23 to 25. Here, each of the ARS 481 to 484 is managing the address data for the terminals or the network contained in at least one of the networks 471 to 474 to which it belongs.

FIG. 23 is a case of managing the address data of each sub-network with the ARS 481 playing the leading role (of a root ARS). The VCI/VPI data are rewritten by the IWU and the relaying of the ATM connections is carried out. For example, the ATM connection from the ARS 482 to the ARS 481 is formed by the connections 591 and 592, The connection 591 has the VPI-F having $VPI_{476-2}$ which is the access address (VPI) of the IWU 476 for the network 472, and the VCI-F1 having $VPI_{476-1}$ which is the access address of the ARS 482. As for the VCI-F2, it can take an arbitrary value in principle, but it is coded such that the IWU 476 can identify the received cell as that which is to be relayed to the connection 592 from the data content of the VCI-F2. On the other hand, the connection 592 has the VPI-F having $VPI_{481}$ which is the access address of the ARS 481, and the VCI-F1 having $VPI_{476-1}$ which is the access address of the IWU 476 for the network 471. Here, in both of these connections 591 and 592, the VCI-F2 can take an arbitrary value in principle.

The IWU 476 analyzes the VCI/VPI data to be written into the cell of the connection 592 from a set of data VCI-F1 and VCI-F2 of the received cell. Therefore, the IWU 476 has the 16 bits VCI field as the table entry, and as a result, has the function to analyze the VCI/VPI data. The VPI-F of the cell of the connection 592 is analyzed by the combination of VCI-F1 and VCI-F2. To the VCI-F1. $VPI_{476-1}$ is written, while the VCI-F2 is coded as the identifier of the ATM connection between the ARS 482 to the ARS 481. The value of the VCI-F2 is determined at a time of setting the ATM connections (connections 591 and 592). The assignment of the VCI-F2 can be made by the process for managing the VCI-F2 within the sub-networks (networks 471 and 472), or by the process for managing the value of the VCI-F2 at the terminals (ARS 481 and IWU 478).

Next, FIGS. 24 and 25 show a case of managing the address data of each sub-network by each ARS independently as in a case of FIG. 16 described above.

For example, the ATM connection 617 from the ARS 482 to the ARS 484 is formed by the connections 6021, 6041, and 6061. The connection 6021 has the VPI-F having $VPI_{476-2}$ which is the access address of the IWU 476 for the network 472, and the VCI-F1 having $VPI_{482}$ which is the access address of the ARS 482. The VCI-F2 is an identification number allocated to this connection 6021 such that this connection 6021 can be identified by the combination of the VCI-F1 and the VCI-F2. The connection 6061 has the VPI-F having $VPI_{476-1}$ which is the access address of the IWU 478 for the network 471, and the VCI-F1 having $VPI_{476-1}$ which is the access address of the IWU 476 for the network 471. The VCI-F2 is a value set at a time of setting this connection 6061. The connection 6041 has the VPI-F having $VPI_{484}$ which is the access address of the ARS 484, and the VCI-F1 having $VPI_{476-1}$ which is the access address of the IWU 478 for the network 471. The VCI-F2 is a value set at a time of setting this connection 6041.

For example, the IWU 478 analyzes the VCI/VPI data to be written into the cell of the connection 6041 from a set of data VCI-F1 and VCI-F2 of the received cell. Therefore, the IWU 478 has the 16 bits VCI field as the table entry, and as a result, has the function to analyze the VCI/VPI data. The VPI-F of the cell of the connection 6041 is analyzed by the combination of VCI-F1 and VCI-F2. To the VCI-F1, $VPI_{476-1}$ is written, while the VCI-F2 is coded as the identifier of the ATM connection between the ARS 482 to the ARS 481 by the analysis of the VCI field data. The value of the VCI-F2 is determined at a time of setting the ATM connections (connections 6021, 6041, and 6061). The assignment of the VCI-F2 can be made by the process for managing the VCI-F2 within the sub-networks (networks 471 472, and 474), or by the process for managing the value of the VCI-F2 at the terminals (ARS 481, IWU 476, and ARS 484).

By the setting scheme of the VCI/VPI field as in the above, even when the ARS has transmitted the data over a plurality of cells to the other ARS, the re-assembling of the data at the receiving side can be done without any problem. Here, for the data identification such as which terminal has the data transmitted from or whether the data is related to the address resolution protocol, there is a need to use the upper layer identification field.

Figure 26:
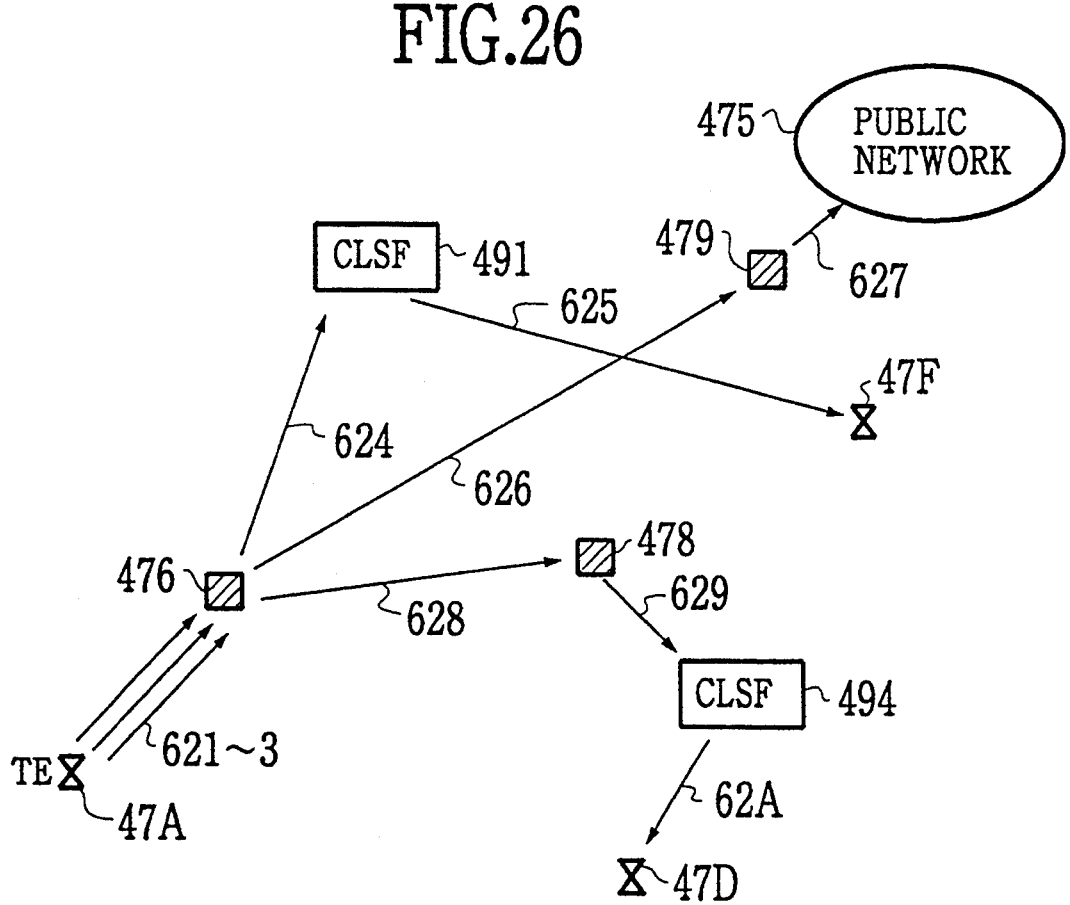
FIG. 26 is a diagram of ATM connections in a second case of the datagram delivery to external network.

FIG. 26 shows the setting of the ATM connections required for transmitting the datagram from the terminal 47A to the terminal 47F, the public network 475, and the terminal 47D. Here, the datagram transmission can be carried out in either one of the following two schemes.

(1) Scheme 1

First, the datagram transmission from the terminal 47A to the terminal 47F will be described.

In this case, two ATM connections are required. One is formed by the connections 821 and 624 between the terminal 47A and the CLSF 491, while the other is formed by the connection 825 between the CLSF 491 and the terminal 47F. The terminal 47A transmits to the IWU 476 the cell with the VPI-F having $VPI_{476-2}$ which is the access address of the IWU 476 for the network 472, the VCI-F1 having the $VPI_{476}$ which is the access address of the terminal 47A, and the VCI-F2 having a value set at a time of setting the connection 621. The IWU 476 analyzes the VCI of the received cell, as well as the corresponding VPI-F and the VCI-F2. Then, to the VCI-F1, $VPI_{476-1}$ which is the access address of the IWU 476 for the network 471 is written. Here, the VCI-F2 is a value which is determined at a time of setting the connection 624, which can be written by copying the value of the VCI-F1 of the cell received by the IWU 476, i.e., the $VPI_{476}$ which is the access address of the terminal 47A.

The datagram arrived at the CLSF 491 is cell reassembled once, and the ATM connection is terminated. The CLSF 491 analyzes the upper layer address data and recognizes that the destination of the datagram as the terminal 47F. Then, the CLSF 491 generates the cell with the VPI-F having $VPI_{47F}$ which is the access address of the terminal 47F, the VCI-F1 having the $VPI_{491}$ which is the access address of the CLSF 491, and the VCI-F2 having an identification number assigned to the connection 625, and transmits the datagram to the terminal 47F. Here, the terminal 47F can uniquely identify the datagram to which the cell belongs from the VCI-F1 and the VCI-F2. Namely, the datagram can be re-assembled at the terminal 47F.

Next, the datagram transmission from the terminal 47A to the public network 475 will be described.

In this case, only one ATM connection formed by the connections 622, 626, and 627 between the terminal 47A and the public network 475 is required. The terminal 47A transmits to the IWU 476 the cell with the VPI-F having $VPI_{476-2}$ which is the access address of the IWU 476 for the network 472, the VCI-F1 having the $VPI_{476}$ which is the access address of the terminal 47A, and the VCI-F2 having a value set at a time of setting the connection 822. The IWU 478 analyzes the VCI of the received cell, as well as the corresponding VPI-F and the VCI-F2. Then, to the VCI-F1, $VPI_{476-1}$ which is the access address of the IWU 476 for the network 471 is written. Here, the VCI-F2 is a value which is determined at a time of setting the connection 628, which can be written by copying the value of the VCI-F1 of the cell received by the IWU 476. i.e., the $VPI_{476}$ which is the access address of the terminal 47A. The IWU 479 writes the VCI/VPI assigned to the ATM connection 627 defined by the public network 475 according to the VCI data of the received cell, and transmits the cell to the public network 475.

Finally, the datagram transmission from the terminal 47A to the terminal 47D will be described.

In this case, two ATM connections are required. One is formed by the connections 623, 628, and 629 between the terminal 47A and the CLSF 494, while the other is formed by the connection 62A between the CLSF 494 and the terminal 47D. The terminal 47A transmits to the IWU 476 the cell with the VPI-F having $VPI_{476-2}$ which is the access address of the IWU 476 for the network 472, the VCI-F1 having the $VPI_{476}$ which is the access address of the terminal 47A, and the VCI-F2 having a value set at a time of setting the connection 623. The IWU 476 analyzes the VCI of the received cell, as well as the corresponding VPI-F and the VCI-F2. Then, to the VCI-F1, $VPI_{476-1}$ which is the access address of the IWU 476 for the network 471 is written. Here, the VCI-F2 is a value which is determined at a time of setting the connection 628, which can be written by copying the value of the VCI-F1 of the cell received by the IWU 476, i.e., the $VPI_{476}$ which is the access address of the terminal 47A.

Next, the IWU 476 analyzes the VCI of the received cell, as well as the corresponding VPI-F and the VCI-F2. Here, there is a need to assign the VCI/VPI such that the CLSF 494 can identify the cell even when the cells arrive from all the terminals (capable of transmitting datagram to the CLSF 494) within the network simultaneously.

The datagram arrived at the CLSF 494 is cell reassembled once, and the ATM connection is terminated. The CLSF 494 analyzes the upper layer address data and recognizes that the destination of the datagram as the terminal 47D. Then, the CLSF 494 generates the cell with the VPI-F having $VPI_{47D}$ which is the access address of the terminal 47D, the VCI-F1 having the VPI$_{494}$ which is the access address of the CLSF 494, and the VCI-F2 having an identification number assigned to the connection 62A, and transmits the datagram to the terminal 47D. Here, the terminal 47D can uniquely identify the datagram to which the cell belongs from the VCI-F1 and the VCI-F2. Namely, the datagram can be re-assembled at the terminal 47D.

(2) Scheme 2

In this scheme, each CLSF has obtained the VPI address, and all the connections identified by the obtained VPIs are ATM connections to be used for the cell transmission related to the datagram transmission (connection-less communication). Namely, the CLSF server requires the ATM connection (not connection-less one) In order for itself to carry out the communication with the other terminal/server. In other words, there is a need for the CLSF to obtain at least two access addresses (VPIs) at a time of the boot.

Similarly, each IWU also obtains at least two access addresses (VPIs) at a time of the boot. One VPI is used as that related to the cell for the connection-less communication. Namely, in a case of transmitting the cell for the datagram related to the connection-less communication to the external network, each terminal outputs the cell to the network by attaching the VPI (for IWU) which is defined for the connection-less communication.

At this point, the following coding scheme for the VCI field of the cell related to the connection-less communication is used. Here, 16 bits of the VCI field are defined to form two 8 bits sub-fields VCI-F1 and VCI-F2, but the positions of these sub-fields is not specified.

First, the cell to be transmitted within the external sub-network is coded as follows. Namely, this coding scheme is the coding of the VCI field for a case in which the cell is transmitted from the sub-network of the transmitting terminal to the external sub-network via the IWU. The VPI-F1 has the identification number of the sub-network of the transmitting terminal, while the VCI-F2 has the identification number of the transmitting terminal within the sub-network. For example, as the identification number of the sub-network, it is possible to set the access address (VPI) of each IWU in the network 471 as the identification address of the sub-network, in which case the network 471 itself is coded appropriately. Also, as the identification number of the terminal, it is possible to set the access address (VPI) of the terminal in each sub-network. For example, the VCI field of the cell for the connection-less communication which is outputted from the terminal 479 and transmitted within the external sub-network, VPI-F1 can be VPI$_{476-1}$ and VCI-F2 can be VPI$_{47D}$.

Next, the cell to be transmitted within its own sub-network is coded as follows. Namely, this coding scheme is the coding of the VCI field for a case in which the cell is transmitted to the IWU of the sub-network of the transmitting terminal. The VPI-F1 has the identification number of the sub-network of the destination terminal, while the VCI-F2 has the identification number of the transmitting terminal within the sub-network. For example, the VCI-F2 field of the cell for the connection-less communication which is outputted from the terminal 47D and transmitted within its own sub-network can be VPI$_{47D}$.

By the scheme as in the above, in the procedure for the address resolution which precedes the datagram transmission, the terminal can transmits the datagram (one or more cells) as long as the identification number of the sub-network to which the destination terminal belongs. This datagram transmission will now be described in detail.

First, the datagram transmission from the terminal 47A to the terminal 47F will be described.

In this case, the terminal 47A transmits to the IWU 476 the cell with the VPI-F having VPI$_{476-2}$ which is the access address of the IWU 476 for the network 472, the VCI-F1 having the identification number of the network 471 (which can be the VPI$_{494}$ which is the access address of the CLSF 494), and the VCI-F2 having VPI$_{476}$ which is the access address of the terminal 47A.

The IWU 476 analyzes the VCI of the received cell, as well as the corresponding VPI-F and the VCI-F2. For example, in a case the VCI-F1 has the VPI$_{491}$ which is the access address of the CLSF 491, the VPI-F of the cell to be outputted can be obtained by copying the VCI-F1 of the received cell. Then, to the VCI-F1, VPI$_{476-1}$ which is the access address of the IWU 476 for the network 471 is written. Here, the VCI-F2 can be set to be transparent. Namely, in a case the VCI-F1 of the cell to be transmitted from the terminal 47A has VPI$_{491}$, the relaying of the cell can be realized by the procedure of (1) copying the VCI-F1 of the received cell to the VPI-F of the transmission cell, (2) copying the VCI-F2 of the received cell to the VCI-F2 of the transmission cell, and (3) writing VPI$_{4766-1}$ to the VCI-F1 of the transmission cell.

The datagram arrived at the CLSF 491 is cell reassembled once, and the ATM connection is terminated. The CLSF 491 analyzes the upper layer address data and recognizes that the destination of the datagram as the terminal 47F. Then, the CLSF 491 generates the cell with the VPI-F having VPI$_{47F}$ which is the access address of the terminal 47F, and transmits the datagram to the terminal 47F. Here, the CLSF 491 can uniquely identify the datagram to which the cell belongs from the VCI-F1 and the VCI-F2. Namely, the datagram can be re-assembled at the CLSF 491. Therefore, it is also possible to carry out the pipeline type relaying of the datagram (cell).

Next, the datagram transmission from the terminal 47A to the public network 475 will be described.

In this case, the terminal 47A transmits to the IWU 476 the cell with the VPI-F having VPI$_{477-1}$ which is the access address of the IWU 476 for the network 472, the VCI-F1 having the identification number of the public network 475 (which can be the VPI$_{479}$ which is the access address of the IWU 479), and the VCI-F2 having VPI$_{476}$ which is the access address of the terminal 47A.

The IWU 476 analyzes the VCI of the received cell, as well as the corresponding VPI-F and the VCI-F2. For example, in a case the VCI-F1 has the VPI$_{479}$ which is the access address of the IWU 479, the VPI-F of the cell to be outputted can be obtained by copying the VCI-F1 of the received cell. Then, to the VCI-F1, VPI$_{476-1}$ which is the access address of the IWU 476 for the network 471 is written. Here, the VCI-F2 can be set to be transparent. Namely, in a case the VCI-F1 of the cell to be transmitted from the terminal 47A has VPI$_{479}$, the relaying of the cell can be realized by the procedure of (1) copying the VCI-F1 of the received cell to the VPI-F of the transmission cell, (2) copying the VCI-F2 of the received cell to the VCI-F2 of the transmission cell, and (3) writing VPI$_{476-1}$ to the VCI-F1 of the transmission cell. The IWU 479 writes the VCI/VPI assigned to the ATM connection 627 defined by the public network 475 according to the VCI data of the received cell, and transmits the cell to the public network 475.

Finally, the datagram transmission from the terminal 47A to the terminal 47D will be described.

In this case, the terminal 47A transmits to the 476 the cell with the VPI-F having $VPI_{476-2}$ which is the access address of the IWU 476 for the network 472, the VCI-F1 having the identification number of the network 474 (which can be the $VPI_{479-1}$ which is the access address of the IWU 476 for the network 471), and the VCI-F2 having $VPI_{476}$ which is the access address of the terminal 47A.

The IWU 476 analyzes the VCI of the received cell, as well as the corresponding VPI-F and the VCI-F2. For example, in a case the VCI-F1 has the $VPI_{476-1}$ which is the access address of the IWU 476 for the network 471, the VPI-F of the cell to be outputted can be obtained by copying the VCI-F1 of the received cell. Then, to the VCI-F1, $VPI_{476-1}$ which is the access address of the IWU 476 for the network 471 is written. Here, the VCI-F2 can be set to be transparent. Namely, in a case the VCI-F1 of the cell to be transmitted from the terminal 47A has $VPI_{476-1}$, the relaying of the cell can be realized by the procedure of (1) copying the VCI-F1 of the received cell to the VPI-F of the transmission cell, (2) copying the VCI-F2 of the received cell to the VCI-F2 of the transmission cell, and (3) writing $VPI_{476-1}$ to the VCI-F1 of the transmission cell.

The IWU 476 analyzes the VCI of the received cell, as well as the corresponding VPI-F, VCI-F1, and the VCI-F2. The VCI field of the cell to be transmitted from the IWU 476 to the CLSF 494 can set the VCI field data of the received cell to be transparent. Namely, it is possible to make the VCI-F1 having $VPI_{476-1}$ and the VCI-F2 having $VPI_{476}$. Here, the VPI-F is set to be $VPI_{494}$ which is the access address of the CLSF 494.

The datagram arrived at the CLSF 494 is cell reassembled once, and the ATM connection is terminated, The CLSF 494 analyzes the upper layer address data and recognizes that the destination of the datagram as the terminal 47D. Then, the CLSF 494 generates the cell with the VPI-F having $VPI_{47D}$ which is the access address of the terminal 47D, and transmits the datagram to the terminal 47D. Here, the terminal 47D can uniquely identify the datagram to which the cell belongs from the VCI-F1 and the VCI-F2. Namely, the datagram can be re-assembled at the terminal 47D. More specifically, for example, the sub-network to which the transmission source terminal belongs can be determined from the VCI-F1, and the IWU which contains that sub-network can be determined from the VCI-F2 as the identification number of that sub-network.

3. General ATM Network: Scheme II

Figure 27:
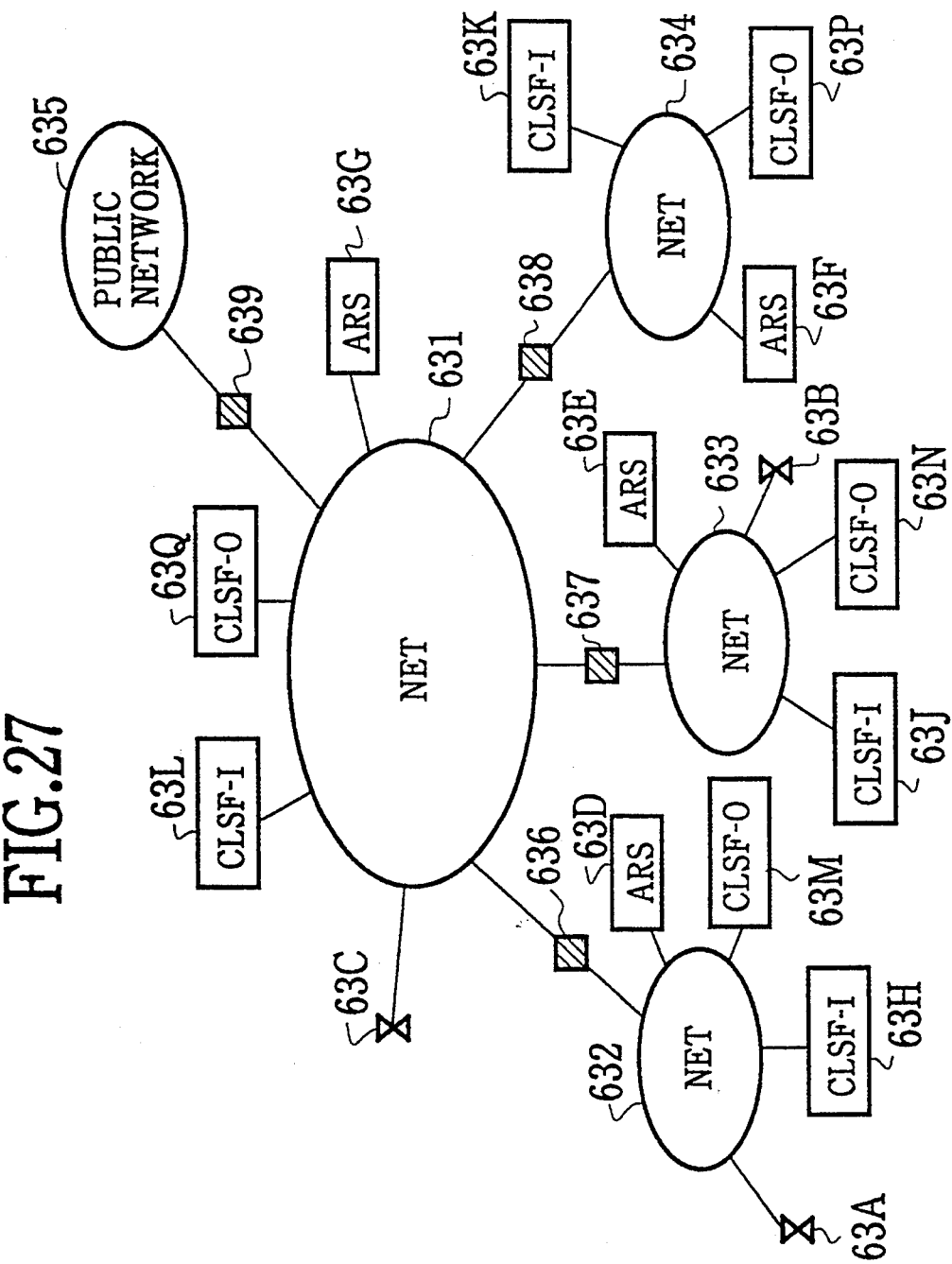
FIG. 27 is a schematic overall network diagram of the ATM communication system according to the present invention in a third case of the datagram delivery to external network.

In this case, an exemplary hierarchical network architecture is as shown in FIG. 27 which comprises networks 631 to 635 with the inter-networking provided by the IWUs 636 to 639, including a public network 635 connected with the network 631 through an IWU 639. Here, each of the IWUs 638 to 639 can realize the relaying of the ATM cells without terminating the ATM connection, by having a function to convert the VCI/VPI of the received cell into VCI/VPI assigned to the corresponding ATM connection in the neighboring network.

In this configuration of FIG. 27, the networks 631 to 634 are also equipped with the ARSs 63G, 63D, 63E, and 63F, respectively, each for managing the address data of the terminals or the network itself for at least one of the networks 631 to 634 to which each of which belongs. In addition, the network 631 to 634 are also equipped with the CLSF-O 63M, 63N, 83P, and 83Q, and CLSF-I 83H, 63J, 83K, and 63L, respectively. Here, CLSF-O, CLSF-I, and ARS may be implemented integrally. Moreover, these CLSF-O, CLSF-I, and ARS may be provided on the IWU if desired.

Figure 28:
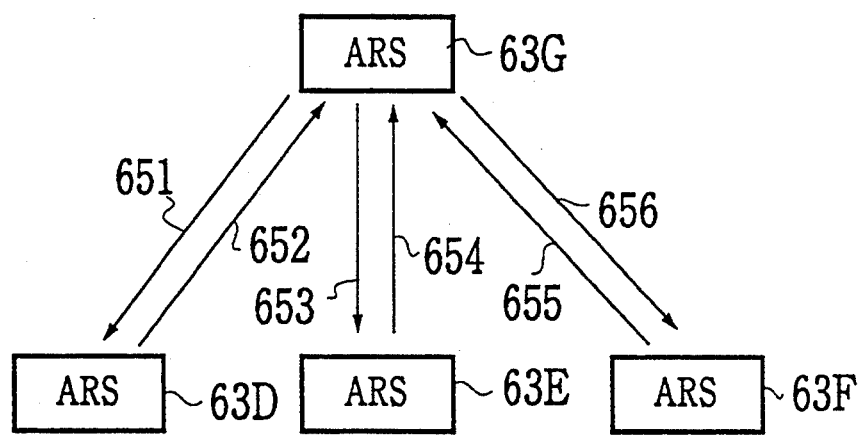
FIG. 28 is a diagram for one procedure of an address data management in the third case of the datagram delivery to external network shown in FIG. 27.
Figure 29:
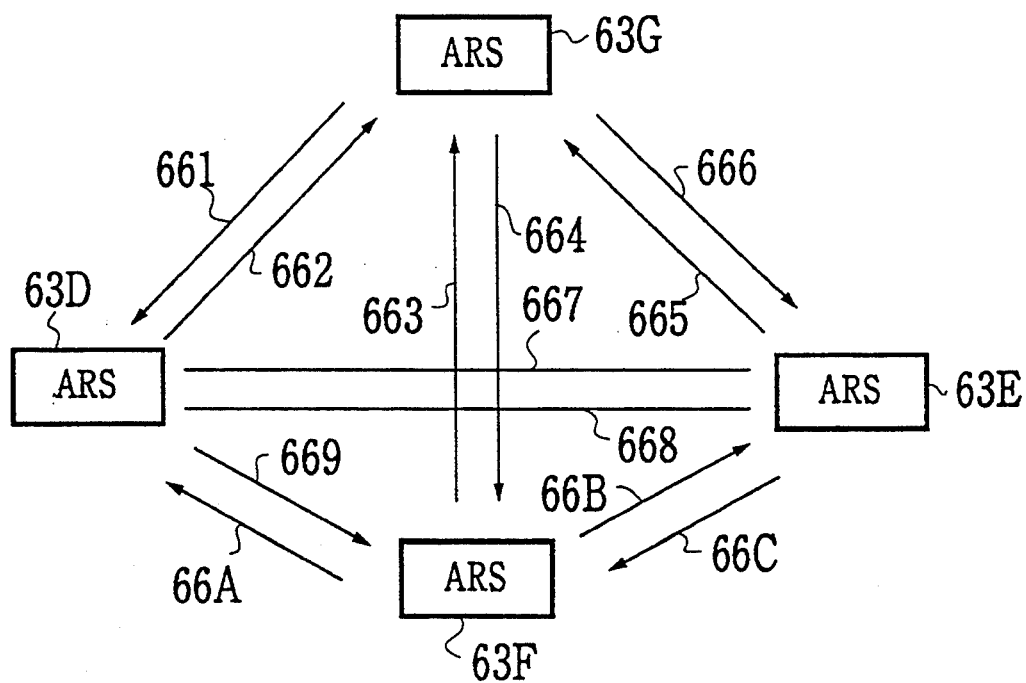
FIG. 29 is a diagram for another procedure of an address data management in the third case of the datagram delivery to external network shown in FIG. 27.

FIGS. 28 and 29 show the two settings of the ATM connections related to the address resolution, where the ARS 63G is connected with the ARSs 63D, 63E, and 63F through the ATM connections.

Figure 30:
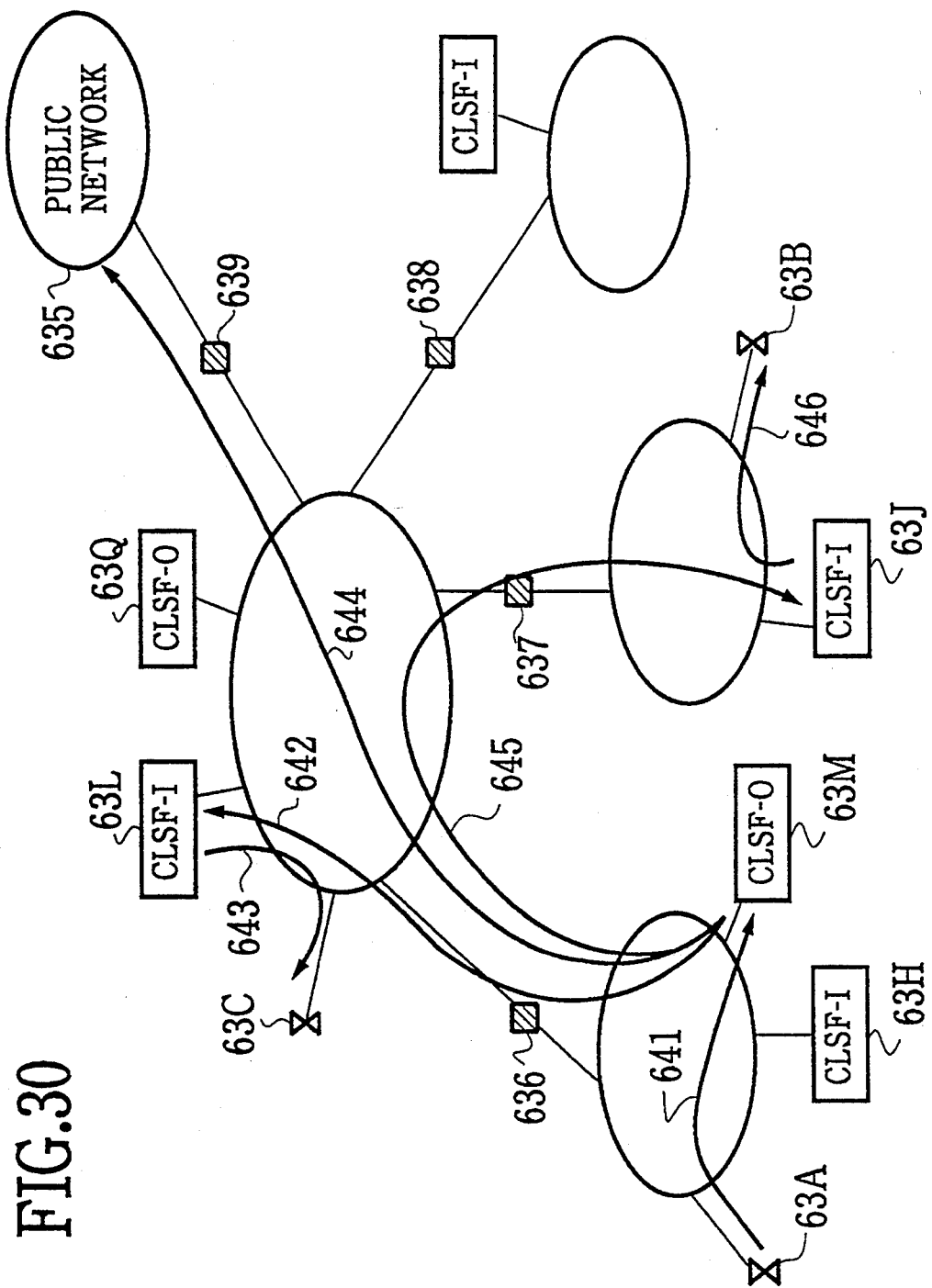
FIG. 30 is a schematic network diagram of the network of FIG. 27 for a datagram transmission in the third case of the datagram delivery to external network.
Figure 31:
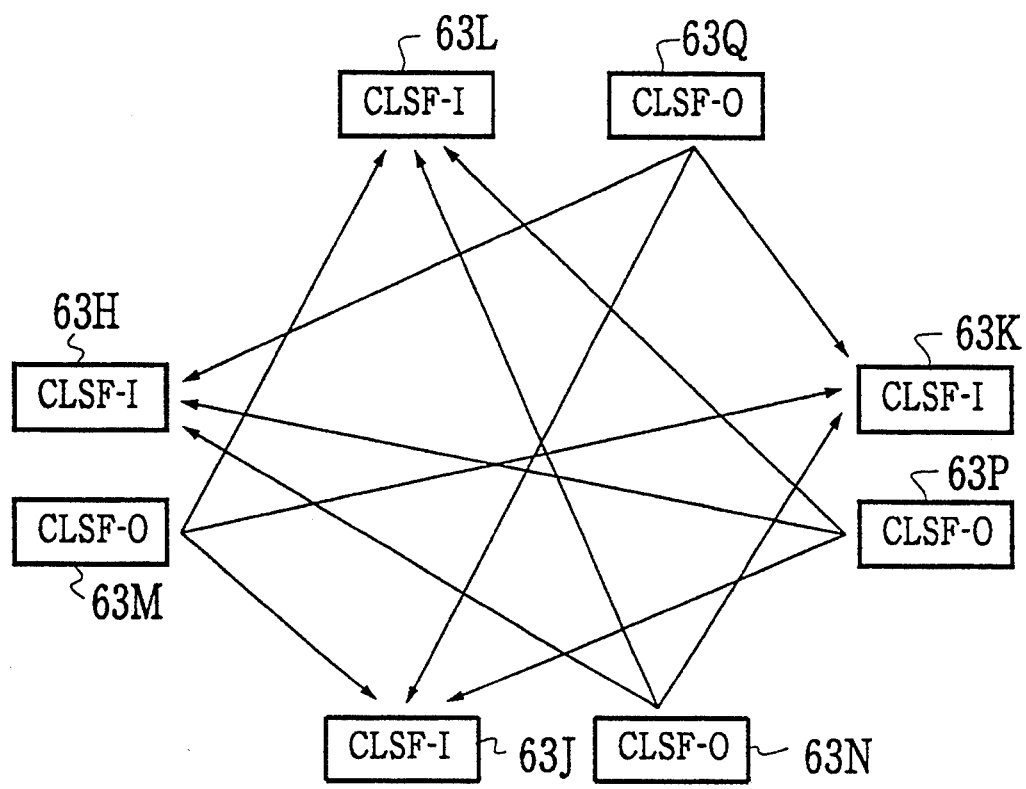
FIG. 31 is a schematic diagram of connection-less service function processing units in the network of FIG. 27.

FIG. 30 shows the setting of the ATM connections 641 to 646 required for transmitting the datagrams from the terminal 63A to the terminal 63C, the public network 685, and the terminal 636, where the ATM connections 642, 644, and 645 are single direction ATM connections from the CLSF-O 63M to the CLSF-I 63L, the public network 635, and the CLSF-I 63J, respectively. Although not shown in FIG. 30, the similar ATM connections from each of the other sub-networks are also provided. In addition, the ATM connections among the CLSF-I and the CLSF-O as shown in FIG. 31 are also provided.

Here, in a case of the connection-less communication from the public network 635 to the terminal belonging to the defined networks 631 to 634, the ATM connection related to the connection-less communication from the public network 635 is terminated at a server for terminating this ATM connection for the connection-less communication and relaying the datagram, which is provided in the network 631. The datagram is transmitted from this server to the destination terminal by the same procedure as described below for the datagram transmission from the terminal within the network to the terminal within the other network.

Now, in this case, the protocol at the terminal is as follows. Namely, when the terminal judges that the datagram is destined to the external sub-network, the terminal transmits the datagram to the CLSF-O. Here, the ATM connection is assumed to be already set up between the terminal and the CLSF-O. Each terminal has the address space data (such as address masks) for the sub-network to which it belongs, so that it is possible for each terminal to judge whether the destination terminal is the terminal within its own network or the terminal of the external sub-network.

In the network architecture shown in FIG. 27, the datagram delivery can be realized by any of the following three schemes.

(1) In this scheme, the CLSF-O and the CLSF-I are located at the same access point, and the star-shaped ATM connections are set up from between the CLSF and the terminals. The terminal transmits the cell to the CLSF whenever the datagram transmission is to be carried out. The datagram delivery is entirely carried out by the CLSF. Namely, even the communication between the terminals within the same sub-network is realized via the CLSF.

(2) The communication between the terminals within the same sub-network is realized without the CLSF, while the communication with the terminal of the external network is realized via the CLSF-O.

(3) The CLSF-O is used for the communication with the terminal of the external network, while the CLSF-I is used for the communication with the terminal within the same network.

As for the protocol for the ARS in this case, the following two types are available.

(i) A Backbone ARS

In this case, the star-shaped ATM connections (bidirectional communication channels) are formed from the ARS 63G in the network 631 to the ARSs 63D, 63E, and 63F in the networks 632 to 634, respectively, as shown in FIG. 28. For example, in order to utilize the ATM connection set up between the CLSF-O 63M and the CLSF-I 63J so as to transmit the datagram from the terminal 63A to the terminal 63B, there is a need for the CLSF-O 63M to obtain the VCI/VPI data of this ATM connection. In order to obtain this VCI/VPI, the CLSF-O 63M transmits the AR request cell having the address data of the terminal 47B to the ARS 63D of its own network 632 which is the address data written in the received datagram. The ARS 63D which received this AR request cell then analyzes the address of the destination terminal written in the received cell, and when it is impossible to carry out the address resolution from the data possessed by it, the ARS 63D relays the AR request cell to the ARS 636 in the network 631 through the already set up ATM connection 651.

The ARS 636 analyzes the VCI/VPI data for transmitting the datagram to the CLSF in the network 633 to which the datagram is to be transmitted according to the address data of the destination terminal 63B written in the received cell, and transmits the obtained VCI/VPI data to the ARS 63D. The ARS 63D then returns the AR response indicating the VCI/VPI data to be used at the CLSF-O 63M as the VCI/VPI data received from the ARS Here, the address resolution at the ARS 636 is carried out as follows. Namely, the ARS 63G has the address data (address space data) of the terminals contained in its own network 631 and the address space data for the sub-networks 632 to 634. Then, the ARS 636 analyzes the transmission target network by comparing the address written in the received Aft request cell with the address space data for each sub-network.

As for the method for identifying the datagram directed to the public network 635, the following two methods are available.

(a) The address data written in the All request cell indicates whether it is the datagram explicitly directed to the public network 635, or it is the datagram not directed to the public network 635. In other words, this is a case in which the terminal knows whether it is the datagram directed to the public network or not at the time of the AR request. In this case, the terminal 632 transmits the AR request cell in a form by which the ARS 63G can explicitly recognize whether it is the datagram directed to the public network 635 or not. In a case it is the address data not coinciding with the addresses directed to the public network 635, and when that address is not present in the address entries in the ARS 663G, the data indicating the absence of the requested address is transmitted to the ARS 63D.

(b) When the address written in the received AR request cell cannot be found in the address entries in the ARS 63G, this address is Judged as that which belongs to the public network 635.

In this manner, the ARS 63G possesses the addresses and the address space data of the terminals belonging to the network 631 and the sub-networks 632, 633, and 634, so as to carry out the address resolution. Here, it is not necessary for the ARS 63G to possess the address data up to the terminal level for the sub-network other than its own sub-network, and it suffices to possess the address data only up to the network address level.

The address data (ATM layer address data) received by the ARS 63D from the ARS 63G is the data indicating the identifier (normally VCI/VPI, but may con,sin the identification data for the upper layer) of the ATM connection to the CLSF-I in the target sub-network from the IWU 636. For example, at a time of the datagram transmission from the terminal 63A to the terminal 63B, the identifier of the ATM connection 645 for making an access to the CLSF-I 633 is notified as the AR response, whereas at a time of the datagram transmission from the terminal 63A to the terminal 63C, the identifier of the ATM connection 642 for making an access to the CLSF-I 63L is notified as the AR response.

Here, the ARS 63D notifies the VCI/VPI data for correctly relaying the ATM connection at the IWU 636 to the CLSF-O 63M, according to the VCI/VPI data received from the ARS 463G. The VCI/VPI data notified to the CLSF-O 63M is then rewritten into the other VCI/VPI at the IWU 636. (11) A front end ARS In this case, the star-shaped ATM connections as shown in FIG. 28 described above is formed from the ARS 63G in the network 631 to the ARSs 632 to 634 in the networks 632 to 634, respectively, or the meshed ATM connections as shown in FIG. 29 is formed by the ARSs 63D to 63G. Each ARS obtains the address space data and the ATM connection data (VCI/VPI) for the external sub-networks viewed from its own sub-network using the ATM connections defined as shown in FIG. 28 or FIG. 29. Here, FIG. 28 is in a form in which the ARS 63G functions as a master ARS, while FIG. 29 is in a distributed form in which each ARS operates independently. In a case the number of hierarchical levels in the network is at most three, a case of FIG. 28 to make the backbone network as the master is more appropriate.

On the other hand, in a case there is no limit to the number of hierarchical levels in the network, which one of FIG. 28 and FIG. 29 is to be selected depending on the form of the network, management state, and a number of sub-networks provided in the network. For example, in order to obtain the VCI/VPI for transmitting the datagram from the CLSF-O 63M to the terminal 63B, the CLSF-O 63M transmits the AR request call having the address data of the terminal 63B to the ARS 63D of its own network 632. The ARS 63D which received this AR request cell then recognizes that the address of the destination terminal written in the received cell belongs to the network 633, and transmits the VCI/VPI data for transmitting the datagram to the CLSF in the network 633 to which the datagram is to be transmitted according to the address data of the destination terminal 633 to the CLSF-O 63M as the AR response.

Here, the address resolution at the ARS 63D is carried out as follows. Namely, the ARS 63D has the address data (address space data) of the terminals contained in its own network 632 and the address space data for the sub-networks 631,633, and 634. Then, the ARS 63D analyzes the transmission target network by comparing the address written in the received AR request cell with the address space data for each sub-network.

As for the method for identifying the datagram directed to the public network 635, the following two methods are available.

(a) The address data written in the AR request cell indicates whether it is the datagram explicitly directed to the public network 635, or it is the datagram not directed to the public network 635. In other words, this is a case in which the terminal knows whether it is the datagram directed to the public network or not at the time of the AR request. In this case, the terminal 63D transmits the AR request cell in a form by which the ARS 63G can explicitly recognize whether it is the datagram directed to the public network 635 or not. In a case it is the address data not coinciding with the addresses directed to the public network 635, and when that address is not present in the address entries in the ARS 63D, it is judged that the requested address is absent.

(b) When the address written in the received AR request cell cannot be found in the address entries in the ARS 63D, this address is Judged as that which belongs to the public network 635.

In this manner, the ARS 63D possesses the addresses and the address space data of the terminals belonging to the network 632 and the sub-networks 631,633, and 634, so as to carry out the address resolution. Here, it is not necessary for the ARS 63D to possess the address data up to the terminal level for the sub-network other than its own sub-network, and it suffices to possess the address data only up to the network address level.

The address data (ATM layer) received by the ARS 63D from the other ARS is the data indicating the identifier (normally VCI/VPI, but may contain the identification data for the upper layer) of the ATM connection to the CLSF-I in the target sub-network from the IWU 636. For example, at a time of the datagram transmission from the terminal 63A to the terminal 633, the identifier of the ATM connection 645 for making an access to the CLSF-I 63J is notified as the AR response, whereas at a time of the datagram transmission from the terminal 63A to the terminal 63C, the identifier of the ATM connection 642 for making an access to the CLSF-I 63L is notified as the AR response. Here, the ARS 63D notifies the VCI/VPI data for correctly relaying the ATM connection at the IWU 636 to the CLSF-O 63M, according to the VCI/VPI data received from the other ARS. The VCI/VPI data notified to the CLSF-O 63M is then rewritten into the other VCI/VPI at the IWU 636.

Among ARSs, not only the address space data exchange protocol for each sub-network, but also the routing protocol concerning the datagram transmission (connection-less communication) among the sub-networks is also operated. More specifically, this routing protocol carries out the management of the ATM connection setting as shown in FIG. 30 described above. Here, the individual ATM connection is separated at the IWU (i.e., closed within the sub-network), and the ATM connection routing control and the ATM connection management (such as VCI/VPI management) are made by the other ATM connection server process and the routing server process, and the ARS exchanges the control messages with these servers as well as the IWU to carry out the management of the ATM connections necessary for the connection-less communication.

Next, the routing to the destination terminal in this case will be described. The final delivery of the datagram to each terminal is carried out by each CLSF-I only for its own network. For example, the CLSF-I 63L carries out the datagram delivery to the terminals belonging to the network 631 but not for the networks 632, 633, 634, and 635. Similarly, the CLSF-I 63J carries out the datagram delivery to the terminals within the network 633 alone. When the network address possessed by the datagram received at each CLSF is not present in the address entries possessed by that CLSF, or when the address of the received datagram is not elements of the network address space of the network. It is judged that that datagram has been transmitted incorrectly. The treatment of the erroneously delivered datagram will not be discussed here.

Thus, it suffices for each CLSF to possess only the address data of the terminals of the network to which that CLSF itself belongs. When the address of the of the received datagram is present in its own network, the appropriate ATM connection is selected and the relaying of the datagram is carried out.

Figure 32:
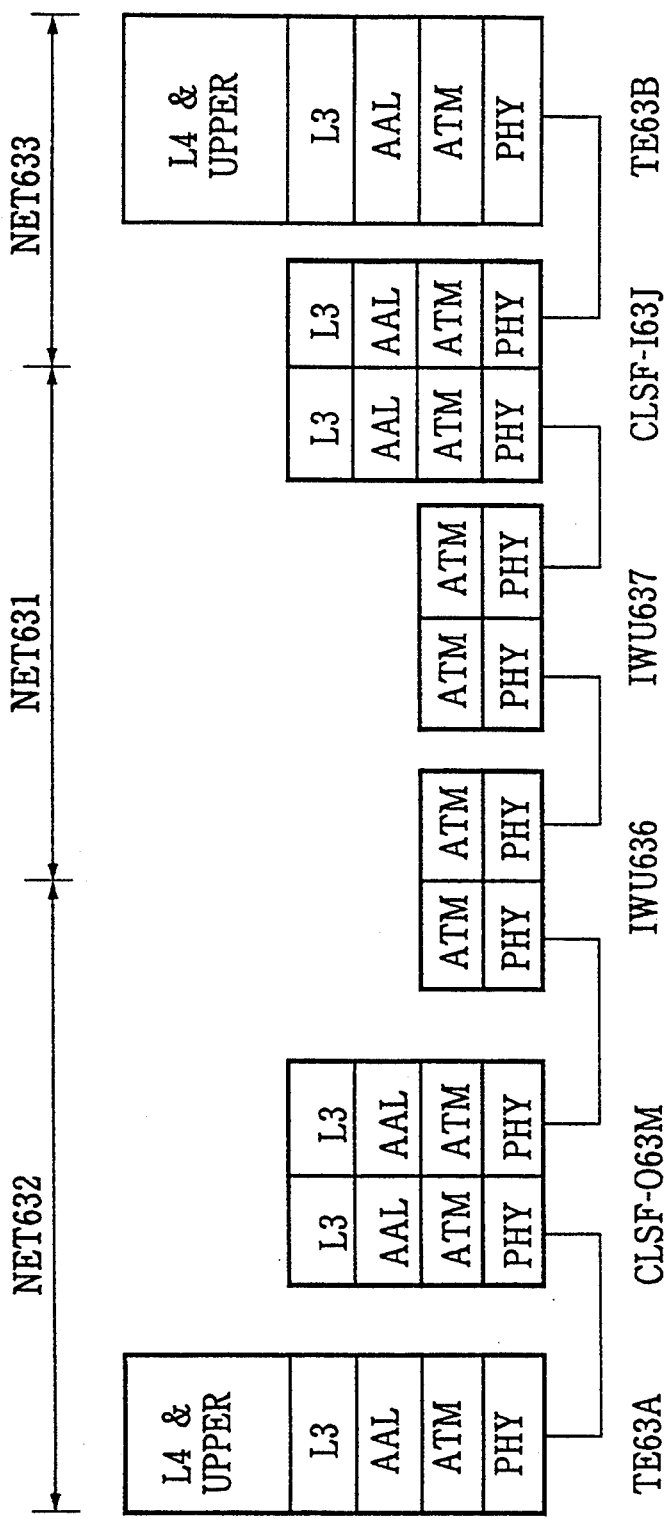
FIG. 32 is a diagram of data layer sequence for a protocol processing in the third case of the datagram delivery to external network shown in FIG. 27.

An exemplary protocol processing in a case of transmitting the datagram from the terminal 63A to the terminal 63B is shown in FIG. 32. Namely, the ATM connection is terminated at the CLSF-O 63M and the CLSF-I 633, i.e., the protocol of the OSI layer 3 is terminated at the CLSF-O 63M and the CLSF-I 63J. In this manner, at a time of the datagram transmission to the terminal other than those of its own sub-network, the end-to-end datagram delivery can be realized with only two ATM connection termination. 35 Now, more concrete example of this case will be described in detail. Namely, the exemplary case of transmitting the datagram from the terminal 63A to the terminal 63B will be illustrated for a situation shown in FIG. 30.

In this case, the address resolution is carried out as follows.

In transmitting the datagram from the terminal 63A to the terminal 63B, when the terminal 63A recognizes that the terminal 63B belongs to the external sub-network, the terminal 63A transmits the datagram to the CLSF-O 63M. The CLSF-O 63M then analyzes the address data of the received datagram, and transmits the AR request cell having the address data of the terminal 63B to the ARS 63D when the CLSF-O 63M does not have the ATM layer address data for transmitting the datagram to the terminal 63B (or to the CLSF-I 63J).

When the ARS 63D possesses the data enabling the address resolution, the AR request containing the VCI/VPI for transmitting the cell from the CLSF-O 63M to the CLSF-I 63J is directly transmitted. On the other hand, when the address resolution cannot be made at the ARS 63D, the appropriate ARS is accessed to carry out the address resolution. When the address resolution is completed, the resulting AR response is transmitted to the CLSF-O 63M.

Now, in this case, the datagram delivery is carried out as follows.

The terminal 63A transmits the cell having the datagram information to the CLSF-O 63M through the ATM connection 641. The CLSF-O 63M then analyzes the address data of the datagram, cell assembles the datagram, and transmits the cell to the CLSF-I 633 by using the ATM connection 645. The IWUs 636 and 637 carries out the relaying of the ATM connection by rewriting the VCI/VPI data of the received cell.

At the CLSF-I 633 which is the terminal point of the ATM connection 645, the network layer processing is carried out. The CLSF-I 63J carries out the analysis of the network address, and the datagram is relayed to the ATM connection 646 and transmitted to the terminal 63B.

In this manner, there are only three ATM connections from the terminal 63A to the CLSF-O 63M, from CLSF-O 63M to the CLSF-I 63J, and from the CLSF-I 63J to the terminal 63B, so that they are terminated only twice.

4. Case using VPI Routing: Scheme II

In this case, the manner of realizing the ATM connections set up among the ARSs is equivalent to that described above as 3. General ATM network: Scheme II, so that it will not be repeated here.

Figure 33:
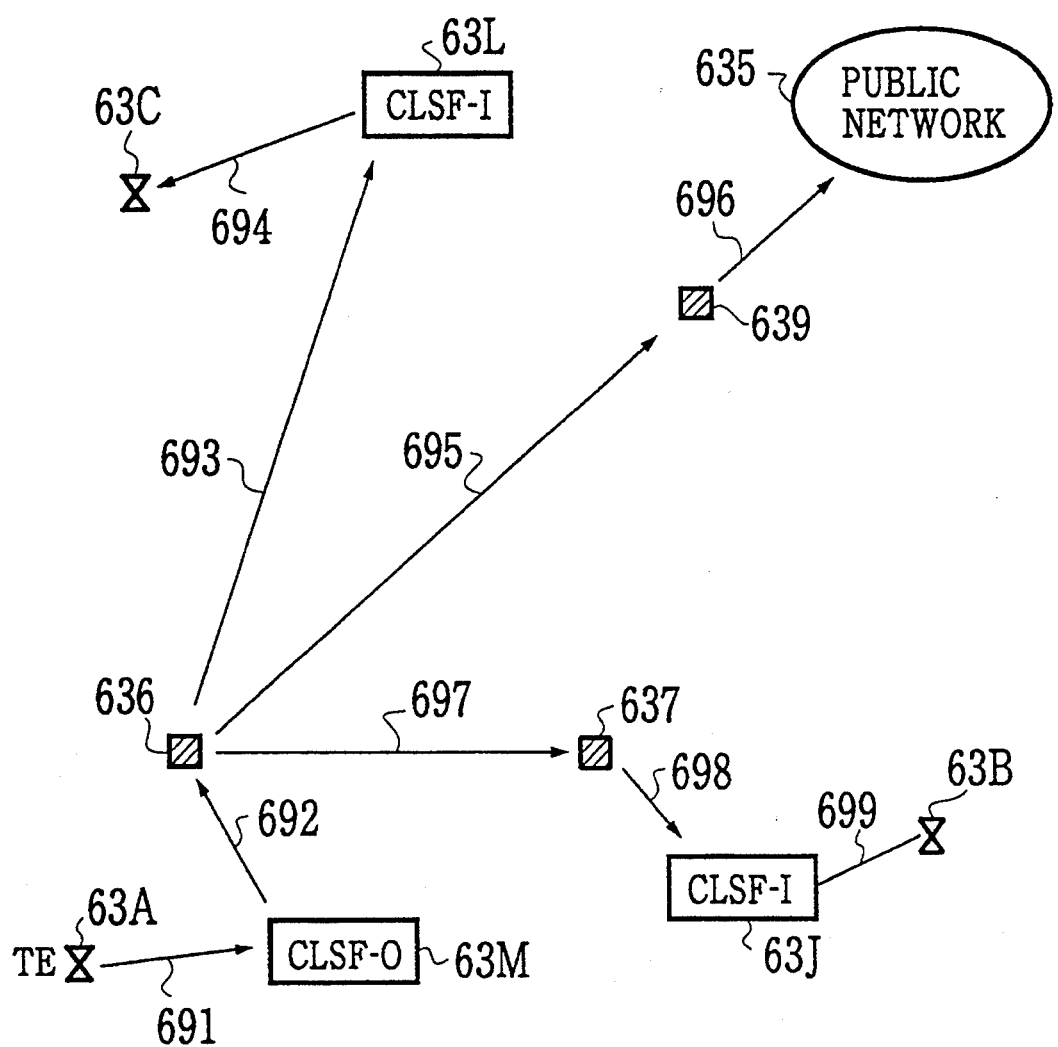
FIG. 33 is a diagram of ATM connections in the third case of the datagram delivery to external network.

With reference to FIG. 30 described above and FIG. 33, four available schemes for the setting of the ATM connections required for transmitting the datagram from the terminal 63A to the terminal 63C, the public network 635, and the terminal 63B will be described.

(1) Scheme 1

First, the datagram transmission from the terminal 63A to the terminal 63C will be described.

In this case, three ATM connections are required. One is formed by the connection 691 between the terminal 63A and the CLSF-O 63M, another is formed by the connections 692 and 693 between the CLSF-O 63M and the CLSF-I 63L, and still another is the connection 694 between the CLSF-I 63L and the terminal 63C. The terminal 63A transmits to the IWU 636 the cell with the VPI-F having $VPI_{63M}$ which is the access address of the CLSF-O 63M, and the VCI-F1 having $VPI_{63A}$ which is the access address of the terminal 63A. Then, the CLSF-O 63M transmits to the IWU 636 the cell with the VPI-F having $VPI_{636-2}$ which is the access address of the IWU 636 for the network 632, the VCI-F1 having the $VPI_{63M}$ which is the access address of the CLSF-O 63M, and the VCI-F2 having a value set at a time of setting the connection 692. The IWU 636 analyzes the VCI of the received cell, as well as the corresponding VPI-F and the VCI-F2. Then, to the VCI-F1, $VPI_{636-1}$ which is the access address of the IWU 636 for the network 631 is written. Here, the VCI-F2 is a value which is determined at a time of setting the connection 693, which can be written by copying the value of the VCI-F1 of the cell received by the IWU 636, i.e., the $VPI_{63M}$ which is the access address of the CLSF-O 63M.

The datagram arrived at the CLSF-I 63L is cell reassembled once, and the ATM connection is terminated. The CLSF-I 63L analyzes the upper layer address data and recognizes that the destination of the datagram as the terminal 63C. Then, the CLSF-I 63L generates the cell with the VPI-F having $VPI_{63C}$ which is the access address of the terminal 63C, the VCI-F1 having the $VPI_{63L}$ which is the access address of the CLSF-I 63L, and the VCI-F2 having an identification number assigned to the connection 694, and transmits the datagram to the terminal 63C. Here, the terminal 63C can uniquely identify the datagram to which the cell belongs from the VCI-F1 and the VCI-F2. Namely, the datagram can be re-assembled at the terminal 63C.

Next, the datagram transmission from the terminal 63A to the public network 635 will be described.

In this case, two ATM connections is required. One is formed by the connection 691 between the terminal 63A and the CLSF-O 63M, while the other is formed by the connections 692, 695, and 696 between the CLSF-O 63M and the public network 635. The terminal 63A transmits the cell with the VPI-F having $VPI_{63M}$ which is the access address of the CLSF-O 63M. Then, the CLSF-O 63M transmits to the IWU 636 the cell with the VPI-F having $VPI_{636-2}$ which is the access address of the IWU 636 for the network 632, the VCI-F1 having the $VPI_{63M}$ which is the access address of the CLSF-O 63M, and the VCI-F2 having a value set at a time of setting the connection 692. The IWU 636 analyzes the VCI of the received cell, as well as the corresponding VPI-F and the VCI-F2. Then, to the VCI-F1, $VPI_{636-1}$ which is the access address of the IWU 636 for the network 631 is written. Here, the VCI-F2 is a value which is determined at a time of setting the connection 695, which can be written by copying the value of the VCI-F1 of the cell received by the IWU 636, i.e., the $VPI_{63M}$ which is the access address of the CLSF-O 63M. The IWU 639 writes the VCI/VPI assigned to the ATM connection 696 defined by the public network 635 according to the VCI data of the received cell, and transmits the cell to the public network 635.

Finally, the datagram transmission from the terminal 63A to the terminal 63B will be described.

In this case, three ATM connections are required. One is formed by the connection 691 between the terminal 63A and the CLSF-O 63M, another is formed by the connections 692, 697, and 698 between the CLSF-O 63M and the CLSF-I 63J, and still another is formed by the connection 699 between the CLSF-I 63J and the terminal 63B. The terminal 63A transmits the cell with the VPI-F having $VPI_{63M}$ which is the access address of the CLSF-O 63M. Then, the CLSF-O 63M transmits to the IWU 636 the cell with the VPI-F having $VPI_{636-2}$ which is the access address of the IWU 636 for the network 632, the VCI-F1 having the $VPI_{63M}$ which is the access address of the CLSF-O 63M, and the VCI-F2 having a value set at a time of setting the connection 692. The IWU 636 analyzes the VCI of the received cell, as well as the corresponding VPI-F and the VCI-F2. Then, to the VCI-F1, $VPI_{636-1}$ which is the access address of the IWU 636 for the network 631 is written. Here, the VCI-F2 is a value which is determined at a time of setting the connection 697, which can be written by copying the value of the VCI-F1 of the cell received by the IWU 636, i.e., the $VPI_{63M}$ which is the access address of the CLSF-O 63M.

Next, the IWU 637 analyzes the VCI of the received cell, as well as the corresponding VPI-F and the VCI-F2. Here, there is a need to assign the VCI/VPI such that the CLSF-I 633 can identify the cell even when the cells arrive from all the terminals (capable of transmitting datagram to the CLSF-I 63J) within the network simultaneously.

The datagram arrived at the CLSF-I 633 is cell reassembled once, and the ATM connection is terminated. The CLSF-I 63J analyzes the upper layer address data and recognizes that the destination of the datagram as the terminal 63B. Then, the CLSF-I 63J generates the cell with the VPI-F having $VPI_{63B}$ which is the access address of the terminal$_{63B}$, the VCI-F1 having the $VPI_{63J}$ which is the access address of the CLSF-I 63J, and the VCI-F2 having an identification number assigned to the connection 699, and transmits the datagram to the terminal 63B. Here, the terminal 63B can uniquely identify the datagram to which the cell belongs from the VCI-F1 and the VCI-F2. Namely, the datagram can be re-assembled at the terminal 63A.

(2) Scheme 2

In this scheme, each CLSF-O carries out the reassembling of the datagram, but the address resolution is carried out by each terminal. The address data of the target network obtained by the address resolution is written in the VCI-F1 of the cell transmitted from the terminal to the CLSF-O. Here, the cell transmission (datagram transmission) from the CLSF-O cannot be carried out in the pipeline-like manner, but there is no need for the CLSF-O to carry out the address resolution of the network to which the destination terminal belongs according to the address data in the received datagram.

In this scheme, each IWU, CLSF-O and CLSF-I has obtained the VPI address, and all the connections identified by the obtained VPIs are ATM connections to be used for the cell transmission related to the datagram transmission (connection-less communication). Namely, each of the CLSF server and the IWU requires the ATM connection (not connection-less one) in order for itself to carry out the communication with the other terminal/server. In other words, there is a need for the CLSF to obtain at least two access addresses (VPIs) at a time of the boot.

At this point, the following coding scheme for the VCI field of the cell related to the connection-less communication is used. Here, 16 bits of the VCI field are defined to form two 8 bits sub-fields VCI-F1 and VCI-F2, but the positions of these sub-fields is not specified.

First, the cell to be transmitted within the external sub-network is coded as follows. Namely, this coding scheme is the coding of the VCI field for a case in which the cell is transmitted from the sub-network of the transmission source terminal to the external sub-network via the IWU. Thus, the identification number of the sub-network of the transmission source terminal is written in the VCI-F1, while the the identification number of the transmission source terminal within the sub-network is written in the VCI-F2. For example, as the identification number of the sub-network, it is possible to set the access address (VPI) of each IWU in the network 631 as the identification address of the sub-network, in which case the network 631 itself is coded appropriately. Also, as the identification number of the terminal, it is possible to set the access address (VPI) of the terminal in each sub-network. For example, the VCI field of the cell for the connection-less communication which is outputted from the terminal 63B. VCI-F1 can be $VPI_{637\text{-}1}$ and VCI-F2 can be $VPI_{63B}$.

As for the cell to be transmitted from the CLSF-O to the IWU, the identification number of the sub-network to which the transmission source terminal belongs is written in the VCI-F1, and the identification number of the CLSF-O within the sub-network is written in the VCI-F2. For example, for the cell for the connection-less communication which is outputted from the CLSF-O 63M, the VCI-F2 field can be $VPI_{63M}$.

As for the cell to be transmitted from the terminal to the CLSF-O, the identification number of the sub-network to which the destination terminal belongs is written in the VCI-F1, and the identification number of the transmission source terminal within the sub-network is written in the VCI-F2. For example, for the cell for the connection-less communication which is outputted from the CLSF-O 63M, the VCI-F2 field can be $VPI_{63B}$.

By the scheme as in the above, in the procedure for the address resolution which precedes the datagram transmission, the terminal can transmits the datagram (one or more cells) as long as the identification number of the sub-network to which the destination terminal belongs. This datagram transmission will now be described in detail.

First, the datagram transmission from the terminal 63A to the terminal 63C will be described.

In this case, the terminal 63A transmits to the CLSF-O 63M the cell with the VPI-F having $VPI_{63M}$ which is the access address of the CLSF-O 63M, the VCI-F1 having the identification number of the network 631 (which can be the $VPI_{63L}$ which is the access address of the CLSF-I 63L), and the VCI-F2 having $VPI_{63A}$ which is the access address of the terminal 63A.

Then, the CLSF-O 63M transmits to the IWU 636 the cell with the VPI-F having $VPI_{636\text{-}2}$ which is the access address of the IWU 636 for the network 632, the VCI-F1 having the identification number of the network 631 (which can be the $VPI_{63L}$ which is the access address of the CLSF-I 63L) that can be copied directly from the VCI-F1 of the received cell, and the VCI-F2 having $VPI_{63M}$ which is the access address of the CLSF-O 63M.

The IWU 636 analyzes the VCI of the received cell, as well as the corresponding VPI-F and the VCI-F2. For example, in a case the VCI-F1 has the $VPI_{63L}$ which is the access address of the CLSF-I 63L, the VPI-F of the cell to be outputted can be obtained by copying the VCI-F1 of the received cell which is $VPI_{63L}$. Then, to the VCI-F1, $VPI_{636\text{-}1}$ which is the access address of the IWU 636 for the network 631 is written. Here, the VCI-F2 can be set to be transparent. Namely, in a case the VCI-F1 of the cell to be transmitted from the CLSF-O 63M has $VPI_{63L}$, the relaying of the cell can be realized by the procedure of (1) copying the VCI-F1 of the received cell to the VPI-F of the transmission cell, (2) copying the VCI-F2 of the received cell to the VCI-F2 of the transmission cell, and (3) writing $VPI_{636\text{-}1}$ to the VCI-F1 of the transmission cell.

The datagram arrived at the CLSF-I 63L is cell reassembled once, and the ATM connection is terminated. The CLSF-I 63L analyzes the upper layer address data and recognizes that the destination of the datagram as the terminal 63C. Then, the CLSF-I 63L generates the cell with the VPI-F having $VPI_{63C}$ which is the access address of the terminal 63C, and transmits the datagram to the terminal 63C. Here, the terminal 63C can uniquely identify the datagram to which the cell belongs from the VCI-F1 and the VCI-F2. Namely, the datagram can be re-assembled at the terminal 63C.

Next, the datagram transmission from the terminal 63A to the public network 635 will be described.

In this case, the terminal 63A transmits to the CLSF-O 63M the cell with the VPI-F having $VPI_{63M}$ which is the access address of the CLSF-O 63M, the VCI-F1 having the identification number of the public network 635 (which can be the $VPI_{639}$ which is the access address of the IWU 639), and the VCI-F2 having $VPI_{636}$ which is the access address of the terminal 63A.

Then, the CLSF-O 63M transmits to the IWU 636 the cell with the VPI-F having $VPI_{636\text{-}2}$ which is the access address of the IWU 636 for the network 632, the VCI-F1 having the identification number of the public network 635 (which can be the $VPI_{639}$ which is the access address of the IWU 639) that can be copied directly from the VCI-F1 of the received cell, and the VCI-F2 having $VPI_{63M}$ which Is the access address of the CLSF-O 63M.

The IWU 636 analyzes the VCI of the received cell, as well as the corresponding VPI-F and the VCI-F2.

For example, in a case the VCI-F1 has the $VPI_{639}$ which is the access address of the IWU 639, the VPI-F of the cell to be outputted can be obtained by copying the VCI-F1 of the received cell. Then, to the VCI-F1, $VPI_{636-1}$ which is the access address of the IWU 636 for the network 631 is written. Here, the VCI-F1 can be set to be transparent. Namely, in a case the VCI-F1 of the cell to be transmitted from the CLSF-O 63M has $VPI_{639}$, the relaying of the cell can be realized by the procedure of (1) copying the VCI-F1 of the received cell to the VPI-F of the transmission cell, (2) copying the VCI-F2 of the received cell to the VCI-F2 of the transmission cell, and (3) writing $VPI_{636-1}$ to the VCI-F1 of the transmission cell.

The IWU 639 writes the VCI/VPI assigned to the ATM connection 696 defined by the public network 635 according to the VCI data of the received cell, and transmits the cell to the public network 635.

Finally, the datagram transmission from the terminal 63A to the terminal 63B will be described.

In this case, the terminal 63A transmits to the CLSF-O 63M the cell with the VPI-F having $VPI_{63M}$ which is the access address of the CLSF-O 63M, the VCI-F1 having the identification number of the network 638 (which can be the VPI which is the access address of the CLSF-I 63J or the $VPI_{637}$ which is the access address of the IWU 637, and the VCI-F2 having $VPI_{63A}$ which is the access address of the terminal 63A.

Then, the CLSF-O 63M transmits to the IWU 636 the cell with the VPI-F having $VPI_{636-2}$ which is the access address of the IWU 636 for the network 632. The VCI-F1 having the identification number of the network 633 (which can be the $VPI_{637-1}$ which is the access address of the IWU 637 for the network 631) that can be directly copied from the VCI-F1 of the received cell, and the VCI-F2 having $VPI_{63M}$ which is the access address of the CLSF-O 63M.

The IWU 636 analyzes the VCI of the received cell, as well as the corresponding VPI-F and the VCI-F2. For example, in a case the VCI-F1 has the $VPI_{637-1}$ which is the access address of the IWU 637 for the network 631, the VPI-F of the cell to be outputted can be obtained by copying the VCI-F1 of the received cell. Then, to the VCI-F1, $VPI_{636-1}$ which is the access address of the IWU 636 for the network 631 is written. Here, the VCI-F2 can be set to be transparent. Namely, in a case the VCI-F1 of the cell to be transmitted from the CLSF-O 63M has $VPI_{637-1}$, the relaying of the cell can be realized by the procedure of (1) copying the VCI-F1 of the received cell to the VPI-F of the transmission cell, (2) copying the VCI-F2 of the received cell to the VCI-F2 of the transmission cell, and (3) writing $VPI_{636-1}$ to the VCI-F1 of the transmission cell.

Then, the IWU 637 analyzes the VCI of the received cell, as well as the corresponding VPI-F, VCI-F1, and the VCI-F2. The VCI field of the cell to be transmitted from the IWU 637 to the CLSF-I 63J can set the VCI field data of the received cell to be transparent. Namely, it is possible to make the VCI-F1 having $VPI_{636-1}$ and the VCI-F2 having $VPI_{63J}$.

The datagram arrived at the CLSF-I 63J is call reassembled once, and the ATM connection is terminated. The CLSF-I 63J analyzes the upper layer address data and recognizes that the destination of the datagram as the terminal 63B. Then, the CLSF-I 63J generates the cell with the VPI-F having $VPI_{63B}$ which is the access address of the terminal 63D, and transmits the datagram to the terminal 63D. Here, the terminal 63B can uniquely identify the datagram to which the cell belongs from the VCI-F1 and the VCI-F2. Namely, the datagram can be re-assembled at the terminal 63B.

(3) Scheme 3

This scheme is a modification of the scheme 2 described above in which the pipeline type transmission of the cell belonging to the datagram is realized.

In this scheme, each CLSF-O carries out the reassembling of the datagram, but the address resolution is carried out by each terminal, so that there is no need for the CLSF-O to carry out the address resolution of the network to which the destination terminal belongs according to the address data within the received datagram. The address data of the target network obtained by the address resolution is written in the VCI-F1 of the cell transmitted from the terminal to the CLSF-O.

Here, the following coding scheme for the VCI field of the cell related to the connection-less communication is used.

First, the cell to be transmitted within the external sub-network is coded in the similar manner as in the Scheme 2 described above. Namely, the VPI-F1 has the identification number of the sub-network of the transmission source terminal, while the VCI-F2 has the identification number of the transmission source terminal within the sub-network.

As for the cell to be transmitted from the CLSF-O to the IWU, the identification number of the sub-network to which the destination terminal belongs is written in the VCI-F1, and the identification number of the transmission source terminal within the sub-network is written in the VCI-F2. For example, for the cell concerning the datagram outputted from the terminal 63A, the VCI-F2 field can be $VPI_{63A}$.

As for the cell to be transmitted from the terminal to the CLSF-O, it is coded in the similar manner as in the Scheme 2 described above. Namely, the identification number of the sub-network to which the destination terminal belongs is written in the VCI-F1, and the identification number of the transmission source terminal within the sub-network is written in the VCI-F2.

Using this coding scheme, the datagram transmission can be carried out as follows. First, the datagram transmission from the terminal 63A to the terminal 63C will be described.

In this case, the terminal 63A transmits to the CLSF-O 63M the cell with the VPI-F having $VPI_{63M}$ which is the access address of the CLSF-O 63M, the VCI-F1 having the identification number of the network 631 (which can be the $VPI_{63L}$ which is the access address of the CLSF-I 63L), and the VCI-F2 having $VPI_{63M}$ which is the access address of the CLSF-O 63M.

Then, the CLSF-O 63M transmits to the IWU 636 the cell with the VPI-F having $VPI_{636-2}$ which is the access address of the IWU 636 for the network 632, along with the VCI-F1 and the VCI-F2 copied directly from the data in the received cell. Namely, the VCI-F1 has the identification number of the network 631 (which can be the $VPI_{63L}$ which is the access address of the CLSF-I 63L), and the VCI-F2 has $VPI_{63A}$ which is the access address of the terminal 63A. Here, it is possible to carry out the pipeline type transmission of the cells to the IWU 636 sequentially, without carrying out the re-assembling of the datagram at the CLSF-O 63M.

The IWU 636 analyzes the VCI of the received cell, as well as the corresponding VPI-F and the VCI-F2. For example, in a case the VCI-F1 has the $VPI_{63L}$ which Is the access address of the CLSF-I 63L, the VPI-F of the cell to be outputted can be obtained by copying the VCI-F1 of the received cell which is $VPI_{63L}$. Then, to the VCI-F1, $VPI_{636-1}$ which is the access address of the IWU 636 for the network 631 is written. Here, the VCI-F2 can be set to be transparent. Namely, in a case the VCI-F1 of the cell to be transmitted from the CLSF-O 63M has $VPI_{63L}$ the relaying of the cell can be realized by the procedure of (1) copying the VCI-F1 of the received cell to the VPI-F of the transmission cell, (2) copying the VCI-F2 of the received cell to the VCI-F2 of the transmission cell, and (3) writing $VPI_{636-1}$ to the VCI-F1 of the transmission cell.

The datagram arrived at the CLSF-I 63L is cell reassembled once, and the ATM connection is terminated. The CLSF-I 63L analyzes the upper layer address data and recognizes that the destination of the datagram as the terminal 63C. Then, the CLSF-I 63L generates the cell with the VPI-F having $VPI_{63C}$ which is the access address of the terminal 63C, and transmits the datagram to the terminal 63C. Here, the terminal 63C can uniquely identify the datagram to which the cell belongs from the VCI-F1 and the VCI-F2. Namely, the datagram can be re-assembled at the terminal 63C.

Next, the datagram transmission from the terminal 63A to the public network 635 will be described.

In this case, the terminal 63A transmits to the CLSF-O 63M the cell with the VPI-F having $VPI_{63M}$ which is the access address of the CLSF-O 63M, the VCI-F1 having the identification number of the public network 635 (which can be the $VPI_{639}$ which is the access address of the IWU 639), and the VCI-F2 having $VPI_{63A}$ which is the access address of the terminal 63A.

Then, the CLSF-O 63M transmits to the IWU 636 the cell with the VPI-F having $VPI_{636-2}$ which is the access address of the IWU 636 for the network 632, along with the VCI-F1 and the VCI-F2 copied directly from the data in the received cell. Namely, the VCI-F1 has the identification number of the public network 635 (which can be the $VPI_{639}$ which is the access address of the IWU 639), and the VCI-F2 has $VPI_{63A}$ which is the access address of the terminal 63A. Here, it is possible to carry out the pipeline type transmission of the cells to the IWU 636 sequentially, without carrying out the re-assembling of the datagram at the CLSF-O 63M.

The IWU 636 analyzes the VCI of the received cell, as well as the corresponding VPI-F and the VCI-F2. For example, in a case the VCI-F1 has the $VPI_{639}$ which is the access address of the IWU 639, the VPI-F of the cell to be outputted can be obtained by copying the VCI-F1 of the received cell. Then, to the VCI-F1, $VPI_{636-1}$ which is the access address of the IWU 636 for the network 631 is written. Here, the VCI-F2 can be set to be transparent. Namely, in a case the VCI-F1 of the cell to be transmitted from the CLSF-O 63M has $VPI_{639}$, the relaying of the cell can be realized by the procedure of (1) copying the VCI-F1 of the received cell to the VPI-F of the transmission cell, (2) copying the VCI-F2 of the received cell to the VCI-F2 of the transmission cell, and (3) writing $VPI_{636-1}$ to the VCI-F1 of the transmission cell.

The IWU 639 writes the VCI/VPI assigned to the ATM connection 696 defined by the public network 635 according to the VCI data of the received cell, and transmits the cell to the public network 635.

Finally, the datagram transmission from the terminal 63A to the terminal 63B will be described.

In this case, the terminal 68A transmits to the CLSF-O 63M the cell With the VPI-F having $VPI_{63M}$ which is the access address of the CLSF-O 63M, the VCI-F1 having the identification number of the network 638 (which can be the $VPI_{63J}$ which is the access address of the CLSF-I 63J), and the VCI-F2 having $VPI_{63A}$ which is the access address of the terminal 63A.

Then, the CLSF-O 63M transmits to the IWU 636 the cell with the VPI-F having $VPI_{636-2}$ which is the access address of the IWU 636 for the network 632, along with the VCI-F1 and VCI-F2 copied directly from the data in the received cell. Thus, the VCI-F1 has the identification number of the network 633 (which can be the $VPI_{637-1}$ which is the access address of the IWU 637 for the network 631), and the VCI-F2 has $VPI_{63A}$ which is the access address of the terminal 63A. Here, it is possible to carry out the pipeline type transmission of the cells to the IWU 636 sequentially, without carrying out the re-assembling of the datagram at the CLSF-O 63M.

The IWU 636 analyzes the VCI of the received cell, as well as the corresponding VPI-F and the VCI-F2. For example, in a case the VCI-F1 has the $VPI_{637-1}$ which is the access address of the IWU 837 for the network 631, the VPI-F of the cell to be outputted can be obtained by copying the VCI-F1 of the received cell. Then, to the VCI-F1, $VPI_{636-1}$ which is the access address of the IWU 636 for the network 631 is written. Here, the VCI-F2 can be set to be transparent. Namely, in a case the VCI-F1 of the cell to be transmitted from the CLSF-O 63M has $VPI_{637-1}$, the relaying of the cell can be realized by the procedure of (1) copying the VCI-F1 of the received cell to the VPI-F of the transmission cell, (2) copying the VCI-F2 of the received cell to the VCI-F2 of the transmission cell, and (3) writing $VPI_{636-1}$ to the VCI-F1 of the transmission cell.

Then, the IWU 637 analyzes the VCI of the received cell, as well as the corresponding VPI-F, VCI-F1, and the VCI-F2. The VCI field of the cell to be transmitted from the IWU 637 to the CLSF-I 63J can set the VCI field data of the received cell to be transparent. Namely, it is possible to make the VCI-F1 having $VPI_{636-1}$ and the VCI-F2 having $VPI_{63J}$.

The datagram arrived at the CLSF-I 63J is cell reassembled once, and the ATM connection is terminated. The CLSF-I 63J analyzes the upper layer address data and recognizes that the destination of the datagram as the terminal 63B. Then, the CLSF-I 63J generates the cell with the VPI-F having $VPI_{63B}$ which is the access address of the terminal 63D, and transmits the datagram to the terminal 63D. Here, the terminal 63B can uniquely identify the datagram to which the cell belongs from the VCI-F1 and the VCI-F2. Namely, the datagram can be re-assembled at the terminal 63B.

(4) Scheme 4

This scheme is another modification of the scheme 2 described above in which the pipeline type transmission of the datagram to the different sub-network is realized. In this scheme, the datagram transmission from one terminal belonging to one sub-network to another terminal belonging to the same sub-network cannot be carried out in the pipeline-like manner, but the pipeline type transmission is possible for the destination terminal belonging to the different sub-network. In this case, it is necessary for the CLSF-O to have some buffer space.

In this scheme, each CLSF-O carries out the reassembling of the datagram, but the address resolution is carried out by each terminal, so that there is no need for the CLSF-O to carry out the address resolution of the network to which the destination terminal belongs according to the address data within the received datagram. The address data of the target network obtained by the address resolution is written in the VCI-F1 of the cell transmitted from the terminal to the CLSF-O.

Here, the datagram transmission at the CLSF-O is carried out by the following procedure.

Step 1: The cell (a first cell for the datagram) is received from the terminal.

Step 2: The address data of the target sub-network written in the VCI-F1 is analyzed.

Step 3: Whether there is currently carried out datagram transmission with respect to the analyzed target sub-network or not is checked.

Step 4: The end of the datagram transmission can be recognized by the CLSF-O according to the identification codes above the ATM layer such as those of the payload type coding in the AAL 5 for example. In a case there is no other datagram transmission with respect to the analyzed target sub-network, the received cell is relayed to the target sub-network. Here, the received cell is transmitted in the pipeline-like manner, i.e., without being reassembled once at the CLSF-O.

Step 5: In a case there is the other datagram transmission with respect to the analyzed target sub-network from the other terminal, the received cell is stored in the buffer until that other datagram transmission is completed. When the completion of that other datagram transmission is confirmed, the cells stored in the buffer are transmitted sequentially. At this point, there is no need for the cells (datagrams) stored in the buffer to be re-assembled, and the transmission of the first cell can be started before the last cell of the cells belonging to the datagrams stored in the buffer arrives. Also, by defining the appropriate protocol between the CLSF-O and the terminal, it is also possible to carry out the flow control so as not to cause the discarding of the stored cells due to the overflow.

Here, the following coding scheme for the VCI field of the cell related to the connection-less communication is used.

First, the cell to be transmitted within the external sub-network is coded in the similar manner as in the Scheme 2 described above. Namely, the VPI-F1 has the identification number of the sub-network of the transmission source terminal, while the VCI-F2 has the identification number of the transmission source terminal within the sub-network.

As for the cell to be transmitted from the CLSF-O to the IWU, the identification number of the sub-network to which the destination terminal belongs is written in the VCI-F1, and the identification number of the transmission source network is written in the VCI-F2. For example, for the cell concerning the datagram outputted from the terminal 63A, the VCI-F2 field can be $VPI_{636-1}$.

As for the cell to be transmitted from the terminal to the CLSF-O, it is coded in the similar manner as in the Scheme 2 described above. Namely, the identification number of the sub-network to which the destination terminal belongs is written in the VCI-F1, and the identification number of the transmission source terminal within the sub-network is written in the VCI-F2.

Using this coding scheme, the datagram transmission can be carried out as follows. First, the datagram transmission from the terminal 63A to the terminal 63C will be described.

In this case, the terminal 63A transmits to the CLSF-O 63M the cell with the VPI-F having $VPI_{63M}$ which is the access address of the CLSF-O 63M, the VCI-F1 having the identification number of the network 631 (which can be the $VPI_{63L}$ which is the access address of the CLSF-I 63L), and the VCI-F2 having $VPI_{63M}$ which is the access address of the CLSF-O 63M.

Then, when there is no other datagram transmission to the sub-network 631, the CLSF-O 63M transmits to the IWU 636 the cell with the VPI-F having $VPI_{636-2}$ which is the access address of the IWU 636 for the network 632, the VCI-F1 having the identification number of the network 631 (which can be the $VPI_{63L}$ which is the access address of the CLSF-I 63L) that can be directly copied from the data in the received cell, and the VCI-F2 having $VPI_{636-2}$ which is the access address of the IWU 636 for the terminal 631 which represents the identification number of the sub-network 632 for example. Here, the VCI-F2 can be any identifier for identifying its own sub-network in this case. Also, it is possible to carry out the pipeline type transmission of the cells to the IWU 636 sequentially, without carrying out the re-assembling of the datagram at the CLSF-O 63M.

The IWU 636 analyzes the VCI of the received cell, as well as the corresponding VPI-F and the VCI-F2. For example, in a case the VCI-F1 has the $VPI_{63L}$ which is the access address of the CLSF-I 63L, the VPI-F of the cell to be outputted can be obtained by copying the VCI-F1 of the received cell which is $VPI_{63L}$. Then, to the VCI-F1, $VPI_{636-1}$ which is the access address of the IWU 636 for the network 631 is written. Here, the VCI-F2 can be set to be transparent. Namely, in a case the VCI-F1 of the cell to be transmitted from the CLSF-O 63M has $VPI_{63L}$ the relaying of the cell can be realized by the procedure of (1) copying the VCI-F1 of the received cell to the VPI-F of the transmission cell, (2) copying the VCI-F2 of the received cell to the VCI-F2 of the transmission cell, and (3) writing $VPI_{636-1}$ to the VCI-F1 of the transmission cell.

The datagram arrived at the CLSF-I 63L is cell reassembled once, and the ATM connection is terminated. The CLSF-I 63L analyzes the upper layer address data and recognizes that the destination of the datagram as the terminal 63C. Then, the CLSF-I 63L generates the cell with the VPI-F having $VPI_{63C}$ which is the access address of the terminal 63C, and transmits the datagram to the terminal 63C. Here, the terminal 63C can uniquely identify the datagram to which the cell belongs from the VCI-F1 and the VCI-F2. Namely, the datagram can be re-assembled at the terminal 63C.

Next, the datagram transmission from the terminal 63A to the public network 685 will be described.

In this case, the terminal 63A transmits to the CLSF-O 63M the cell with the VPI-F having $VPI_{63M}$ which is the access address of the CLSF-O 63M, the VCI-F1 having the identification number of the public network 635 (which can be the $VPI_{630}$ which is the access address of the IWU 639), and the VCI-F2 having $VPI_{63A}$ which is the access address of the terminal 63A.

Then, when there is no other datagram transmission to the public network 635, the CLSF-O 63M transmits to the IWU 636 the cell with the VPI-F having $VPI_{636-2}$ which is the access address of the IWU 636 for the network 632, the VCI-F1 having the identification number of the public network 635 (which can be the $VPI_{639}$ which is the access address of the IWU 639) that can be directly copied from the data in the received cell, and the VCI-F2 having $VPI_{636\text{-}2}$ which is the access address of the IWU 636 for the terminal 631 which represents the identification number of the sub-network 632. Here, the VCI-F2 can be any identifier for identifying its own sub-network in this case. Also, it is possible to carry out the pipeline type transmission of the cells to the IWU 636 sequentially, without carrying out the re-assembling of the datagram at the CLSF-O 63M.

The IWU 636 analyzes the VCI of the received cell, as well as the corresponding VPI-F and the VCI-F2. For example, in a case the VCI-F1 has the $VPI_{639}$ which is the access address of the IWU 639, the VPI-F of the call to be outputted can be obtained by copying the VCI-F1 of the received cell. Then, to the VCI-F1, $VPI_{636\text{-}1}$ which is the access address of the IWU 636 for the network 631 is written. Here, the VCI-F2 can be set to be transparent. Namely, in a case the VCI-F1 of the cell to be transmitted from the CLSF-O 63M has $VPI_{639}$, the relaying of the cell can be realized by the procedure of (1) copying the VCI-F1 of the received cell to the VPI-F of the transmission cell, (2) copying the VCI-F2 of the received cell to the VCI-F2 of the transmission cell, and (3) writing $VPI_{636\text{-}1}$ to the VCI-F1 of the transmission cell.

The IWU 639 writes the VCI/VPI assigned to the ATM connection 696 defined by the public network 635 according to the VCI data of the received cell, and transmits the cell to the public network 635.

Finally, the datagram transmission from the terminal 63A to the terminal 63B will be described.

In this case, the terminal 63A transmits to the CLSF-O 63M the cell with the VPI-F having $VPI_{63M}$ which is the access address of the CLSF-O 63M, the VCI-F2 having the identification number of the network 633 (which can be the $VPI_{637\text{-}1}$ which is the access address of the IWU 637 for the network 631), and the VCI-F2 having $VPI_{63A}$ which is the access address of the terminal 63A.

Then, when there is no other datagram transmission to the sub-network 633, the CLSF-O 63M transmits to the IWU 636 the cell with the VPI-F having $VPI_{636\text{-}2}$ which is the access address of the IWU 636 for the network 632, the VCI-F1 having the identification number of the network 633 (which can be the $VPI_{637\text{-}1}$ which is the access address of the IWU 637 for the network 631) that can be directly copied from the data in the received cell, and the VCI-F2 having $VPI_{636\text{-}2}$ which is the access address of the IWU 636 for the terminal 631 which represents the identification number of the sub-network 632. Here, the VCI-F2 can be any identifier for identifying its own sub-network in this case. Also, It is possible to carry out the pipeline type transmission of the cells to the IWU 636 sequentially, without carrying out the re-assembling of the datagram at the CLSF-O 63M.

The IWU 636 analyzes the VCI of the received cell, as well as the corresponding VPI-F and the VCI-F2. For example, in a case the VCI-F1 has the $VPI_{637\text{-}1}$ which is the access address of the IWU 637 for the network 631, the VPI-F of the cell to be outputted can be obtained by copying the VCI-F1 of the received cell. Then, to the VCI-F1, $VPI_{636\text{-}1}$ which is the access address of the IWU 636 for the network 631 is written. Here, the VCI-F2 can be set to be transparent. Namely, in a case the VCI-F1 of the cell to be transmitted from the CLSF-O 63M has $VPI_{637\text{-}1}$, the relaying of the cell can be realized by the procedure of (1) copying the VCI-F1 of the received cell to the VPI-F of the transmission cell, (2) copying the VCI-F2 of the received cell to the VCI-F2 of the transmission cell, and (3) writing $VPI_{636\text{-}1}$ to the VCI-F1 of the transmission cell.

Then, the IWU 637 analyzes the VCI of the received cell, as well as the corresponding VPI-F, VCI-F1, and the VCI-F2. The VCI field of the cell to be transmitted from the IWU 637 to the CLSF-I 63J can set the VCI field data of the received cell to be transparent. Namely, it is possible to make the VCI-F1 having $VPI_{636\text{-}1}$ and the VCI-F2 having $VPI_{63J}$.

The datagram arrived at the CLSF-I 63J is cell reassembled once, and the ATM connection is terminated. The CLSF-I 63J analyzes the upper layer address data and recognizes that the destination of the datagram as the terminal 63B. Then, the CLSF-I 63J generates the cell with the VPI-F having $VPI_{63B}$ which is the access address of the terminal 63D, and transmits the datagram to the terminal 63D. Here, the terminal 63B can uniquely identify the datagram to which the cell belongs from the VCI-F1 and the VCI-F2. Namely, the datagram can be re-assembled at the terminal 63B.

DATAGRAM DELIVERY IN NETWORK WITH FLAT TOPOLOGY

Next, various schemes for the datagram delivery to the destination terminal in the network with flat topology will be described.

Figure 34:
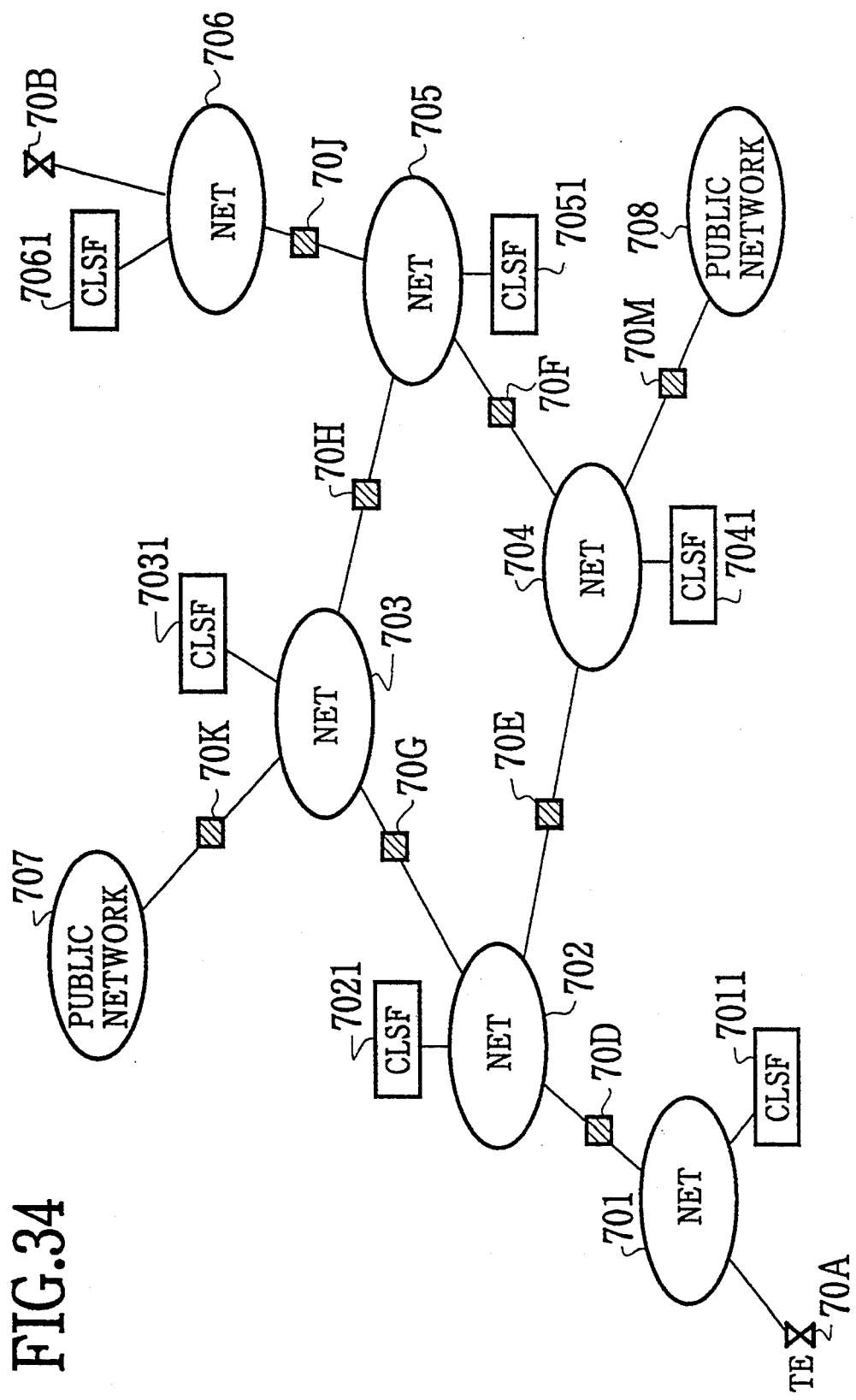
FIG. 34 is a schematic overall network diagram of the ATM communication system according to the present invention in a case of the flat network topology.

FIG. 34 shows a system configuration of the network with the falt topology, in which a plurality of sub-networks 701 to 706 with the inter-networking provided by the IWUs 70D, 70E, 70F, 70G, 70H, and 70J. In addition, the public networks 707 and 708 are connected with the networks 703 and 704 through the IWUs 70K and 70M, respectively. Here, each IWU can realize the relaying of the ATM cells without terminating the ATM connection, by having a function to convert the VCI/VPI of the received cell into VCI/VPI assigned to the corresponding ATM connection in the neighboring network.

In this configuration of FIG. 34, the connection lines among the networks 701 to 706 may be the connection lines within a campus, or the dedicated lines or switched lines of the public networks. Also, the public networks 707 and 708 are provided so that the accesses to the terminals and the networks other than those defined within this system can be made through these public networks 707 and 708. Thus, a communication with the terminal connected to the general public network can be made via these public networks 707 and 708.

Furthermore, the networks 701 to 706 are provided with the CLSFs 7011, 7021, 7031, 7041, 7051, and 7061, respectively, such that the cell handling related to the connection-less communication can be realized.

Here, in this network with the flat topology, there is no limitation concerning the distance of the network, i.e., an index indicating how many relaying points (sub-networks) must be required in Joining arbitrary points within the network at most, in contrast to the above described network with the hierarchical topology. In which the target sub-network can be reached via at most one sub-network.

Also, in this case, the manner of realizing the address resolution is basically equivalent to that in the hierarchical network described above, so that the description concerning the manner of constructing the ATM connections related to the address resolution will not be repeated here. Namely, there are two schemes including a scheme in which all the address resolution servers are equal and analyze the address data of the network independently, and a scheme in which the address data are managed and analyzed by the logical hierarchical structure among the address resolution servers. As for the ATM connections to be set up among the address resolution servers, they can have any desired structure ranging from the full meshed structure to the minimally spanning tree structure.

1. General ATM Network: Scheme I

In this case, the ATM connections are provided as follows. Namely, in order to transmit the datagram from the terminal connected to each sub-network to the terminal connected to an optional sub-network, the ATM connections are set up from each IWU to the CLSFs provided within all the sub-networks. That is, the single direction ATM connections from the IWU to the CLSFs are set up in the fully meshed manner. Here, the IWU (relaying IWU) provided on the route of the ATM connection carries out the rewriting of the ATM header data or at least the VCI/VPI conversion, and the cell relaying is executed as the work at the ATM layer. In other words, the ATM connection is not terminated in principle at the IWU. Also, it is also possible for the CLSF to be provided at a position of the IWU if desired.

Here, when the datagram is transmitted to the network defined by the public networks 707 and 708, the received cell to which the datagram belongs is transmitted to the server for terminating the datagram connection of the public network once. This server can also be provided on the IWU if desired. The server which terminated the datagram transmitted from the public network relays the datagram by the same procedure as the datagram transmission from the terminal within the defined network.

Figure 35:
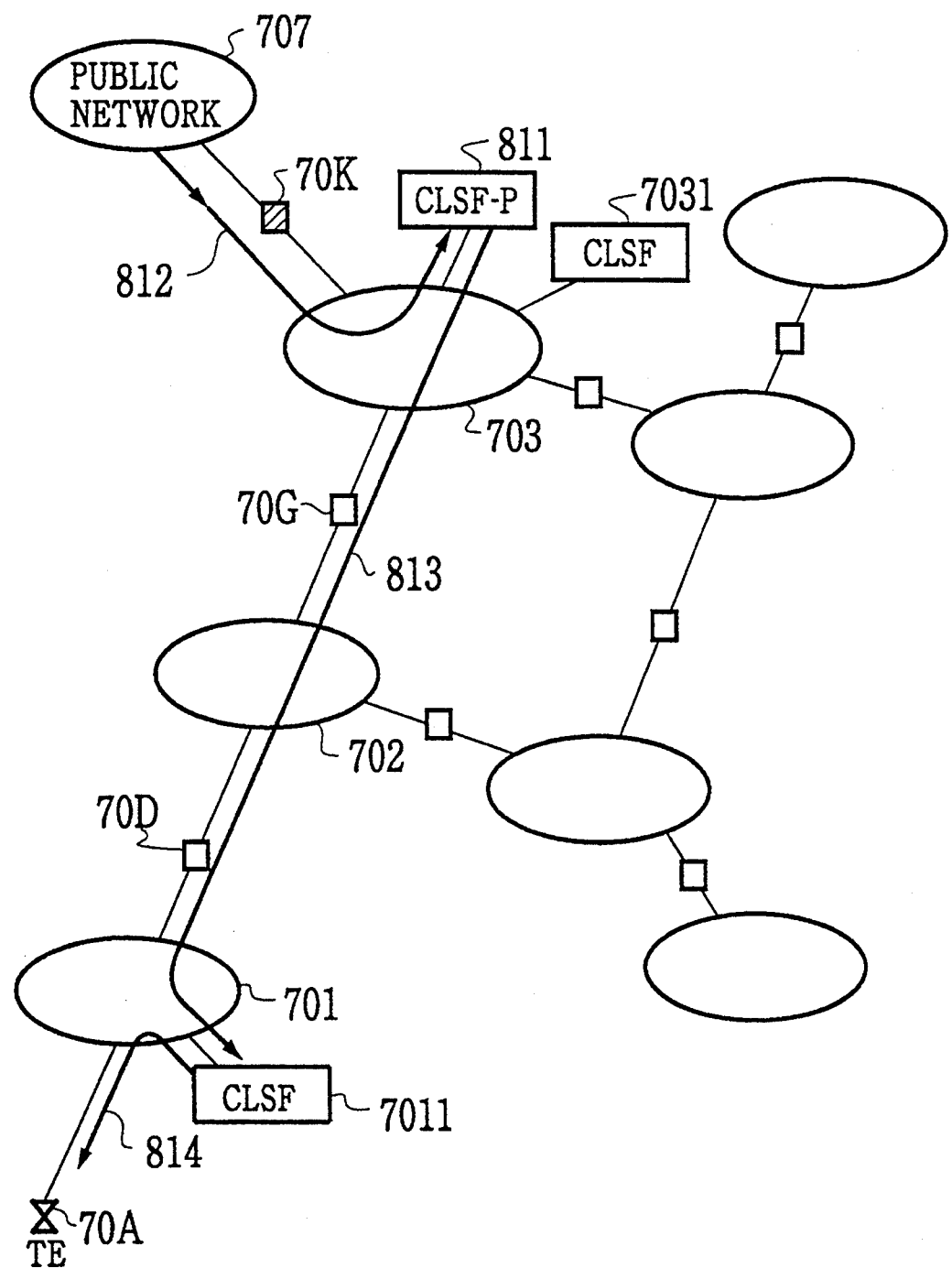
FIG. 35 is a schematic network diagram of the network of FIG. 34 for an exemplary datagram transmission in a first case of the datagram delivery to external network.

The exemplary ATM connection configuration at a time of transmitting the datagram from the public network 707 to the terminal 70A is shown in FIG. 35. In this exemplary case, the datagram transmitted from the public network 707 is terminated at the CLSF-P 811 once, and then transmitted to the terminal 70A via the CLSF 7011. Therefore, there are three ATM connections 812, 813, and 814.

In this case, the procedure for transmitting the datagram of the connection-less communication from one terminal to the destination terminal is as follows.

(1) The terminal makes the AR request. This can be done either always or only in a case the address resolution cannot be made by the terminal itself such as a case in which a suitable entry is present in the AR table.

(2) The terminal obtains the VCI/VPI data which is the identifier of the ATM connection provided from the ARS in order to make an access to the destination terminal.

(3) The terminal attaches the obtained VCI/VPI to the cell and outputs the cell to the network, so as to complete the datagram transmission.

Here, at a time of the datagram transmission, there is no need for the terminal to carry out the procedure for setting up a particular connection defined in the ATM network.

Next, the routing to the destination terminal in this case will be described. The final delivery of the datagram to each terminal is carried out by each CLSF only for Its own network. For example, the CLSF 7061 carries out the datagram delivery to only the terminals belonging to the network 706. Similarly, the CLSF 7031 carries out the datagram delivery to only the terminals within the network 703. When the network address possessed by the datagram received at each CLSF is not present in the address entries possessed by that CLSF, or when the address of the received datagram is not elements of the network address space of the network, it is judged that that datagram has been transmitted incorrectly. The treatment of the erroneously delivered datagram will not be discussed here.

Thus, it suffices for each CLSF to possess only the address data of the terminals of the network to which that CLSF itself belongs. When the address of the of the received datagram is present in its own network, the appropriate ATM connection is selected and the relaying of the datagram is carried out.

Figure 36:
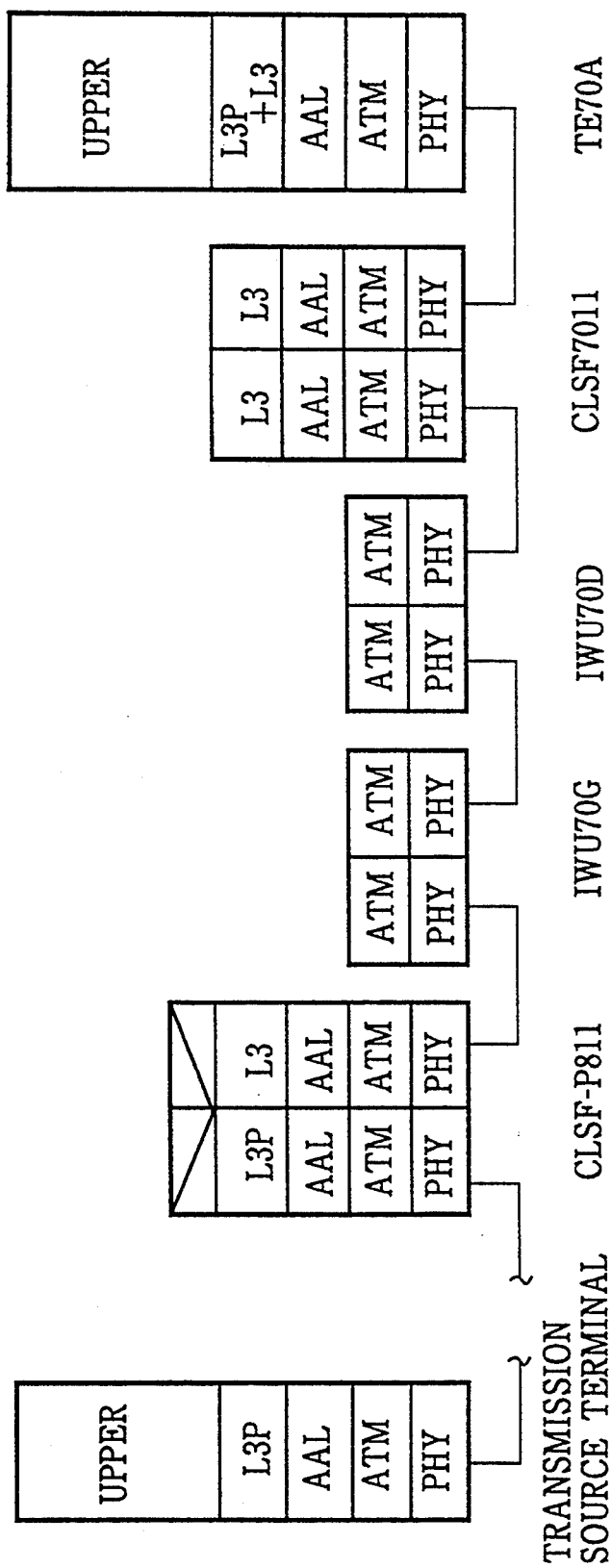
FIG. 36 is a diagram of data layer sequence for a protocol processing in the first case of the datagram delivery to external network shown in FIG.
Figure 37:
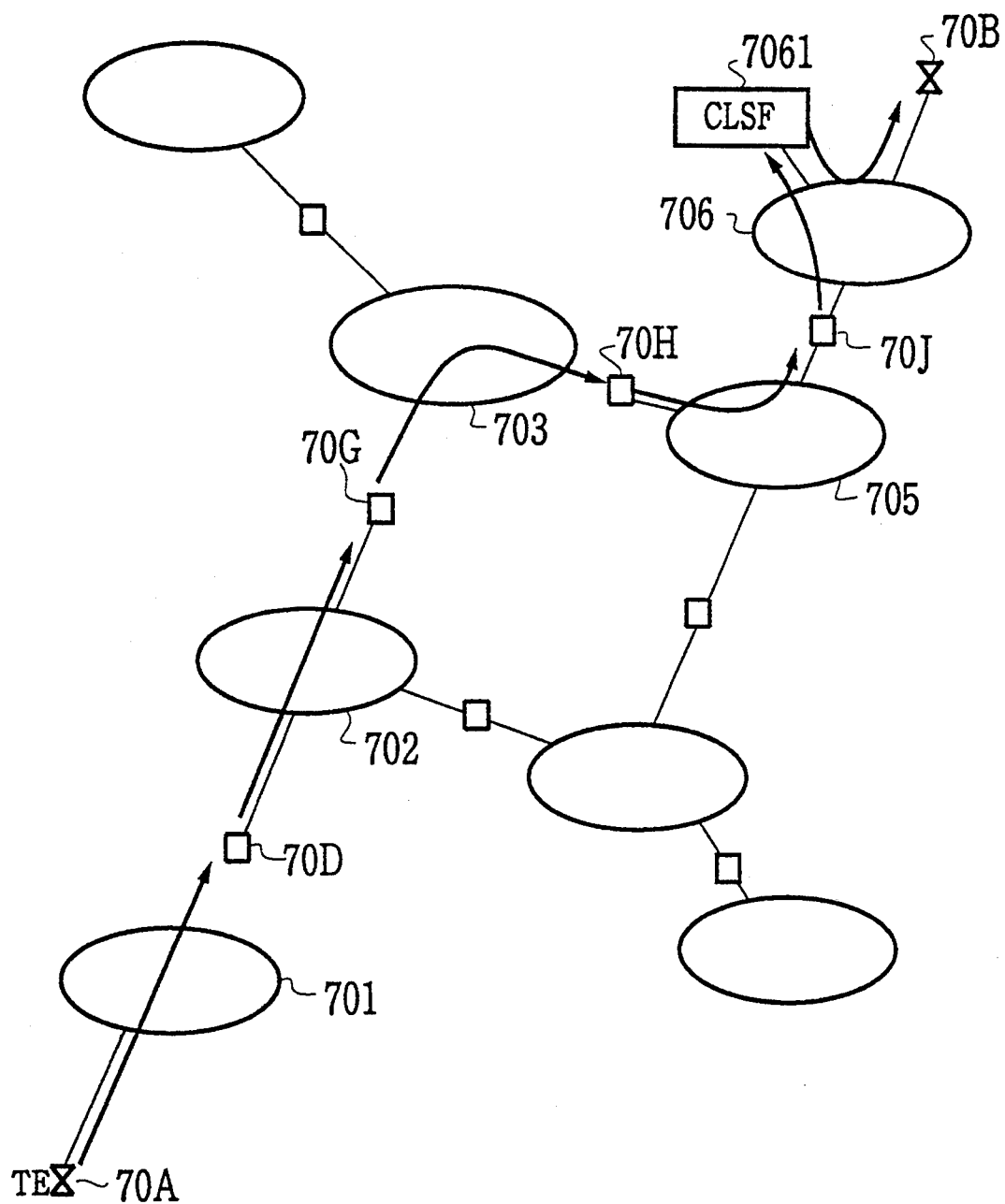
FIG. 37 is a schematic network diagram of the network of FIG. 34 for another exemplary datagram transmission in a first case of the datagram delivery to external network.
Figure 38:
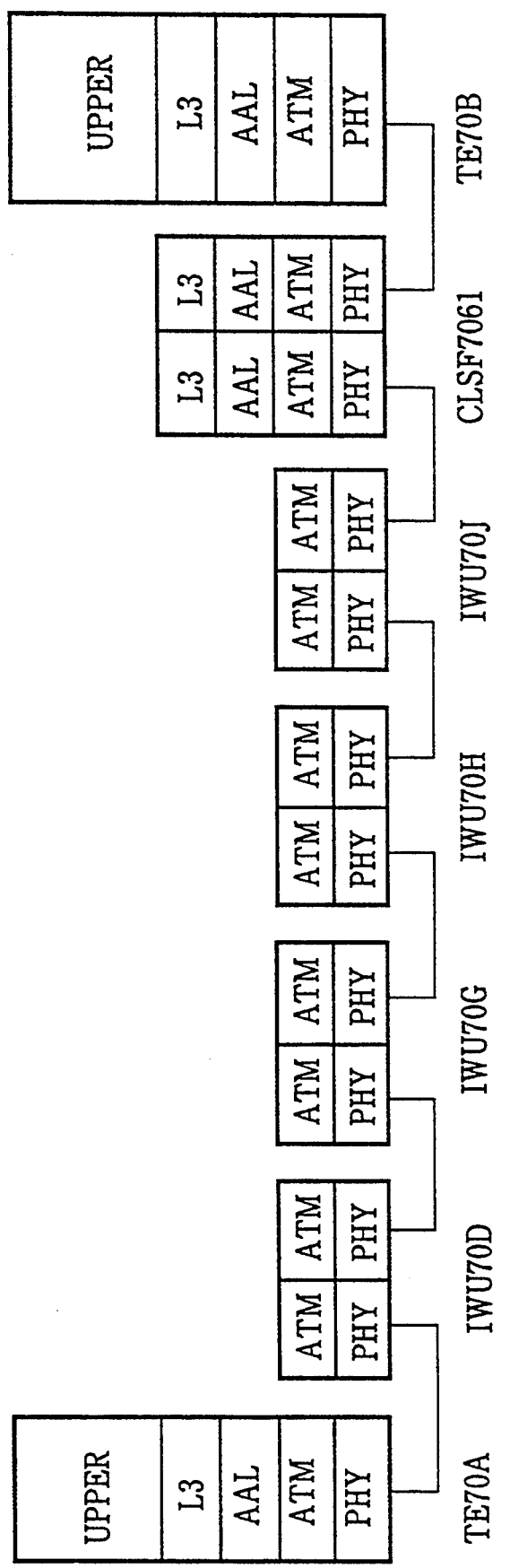
FIG. 38 is a diagram of data layer sequence for a protocol processing in the first case of the datagram delivery to external network shown in FIG. 37.
Figure 39:
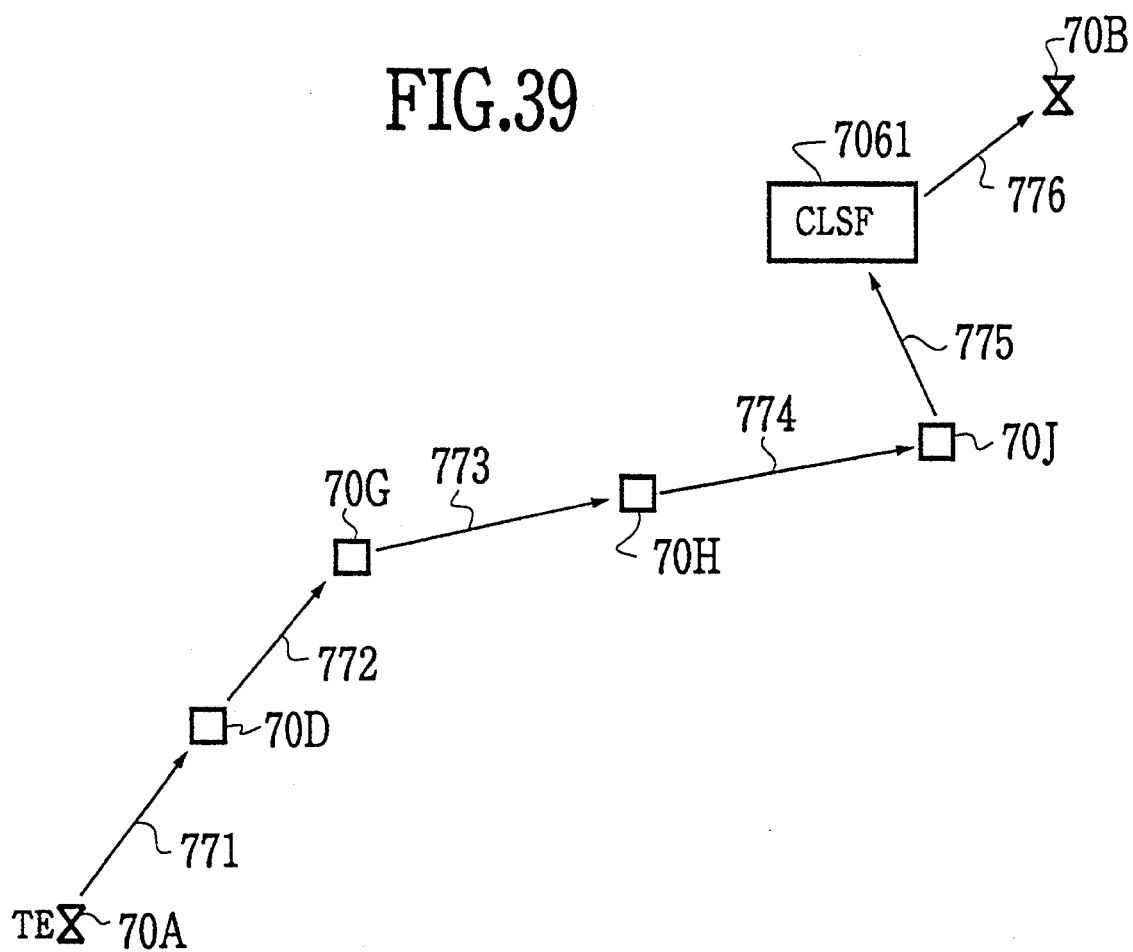
FIG. 39 is a diagram of ATM connections in the first case of the datagram delivery to external network shown in FIG. 37.

An exemplary protocol processing in a case of transmitting the datagram from the public network 707 to the terminal 70A through the ATM connections of FIG. 35 described above is shown in FIG. 36. Similarly, an exemplary protocol processing in a case of transmitting the datagram from the terminal 70A to the terminal 70B through the ATM connections of FIG. 37 is shown in FIG. 38 for the datagram relayed through paths 771 to 776 shown in FIG. 39. In this case, the ATM connection is terminated at the CLSF 7061 once, i.e., the protocol of the OSI layer 3 is terminated at the CLSF 7061. The OSI layer 3 protocol processing is carried out at the CLSF 7081, and the data unit is transmitted to the terminal 70B using the ATM connection. In this manner, at a time of the datagram transmission to the terminal other than those of its own sub-network, the end-to-end datagram delivery can be realized with only one ATM connection termination.

Figure 42:
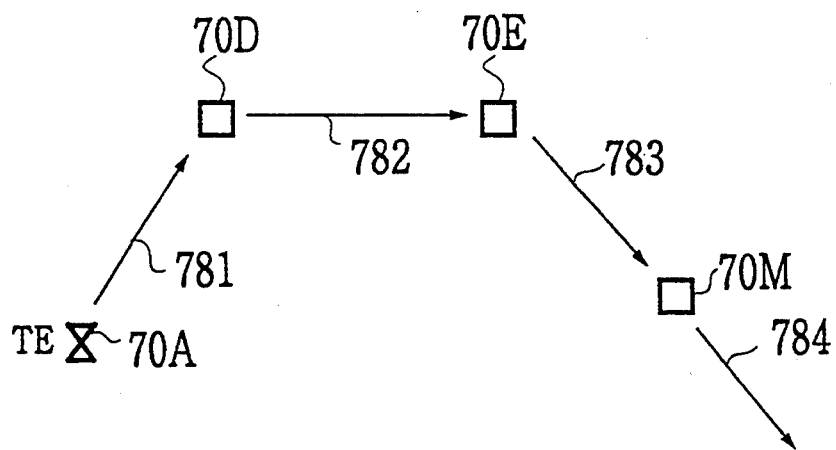
FIG. 42 is a diagram of ATM connections in the first case of the datagram delivery to external network shown in FIG. 40.
Figure 40:
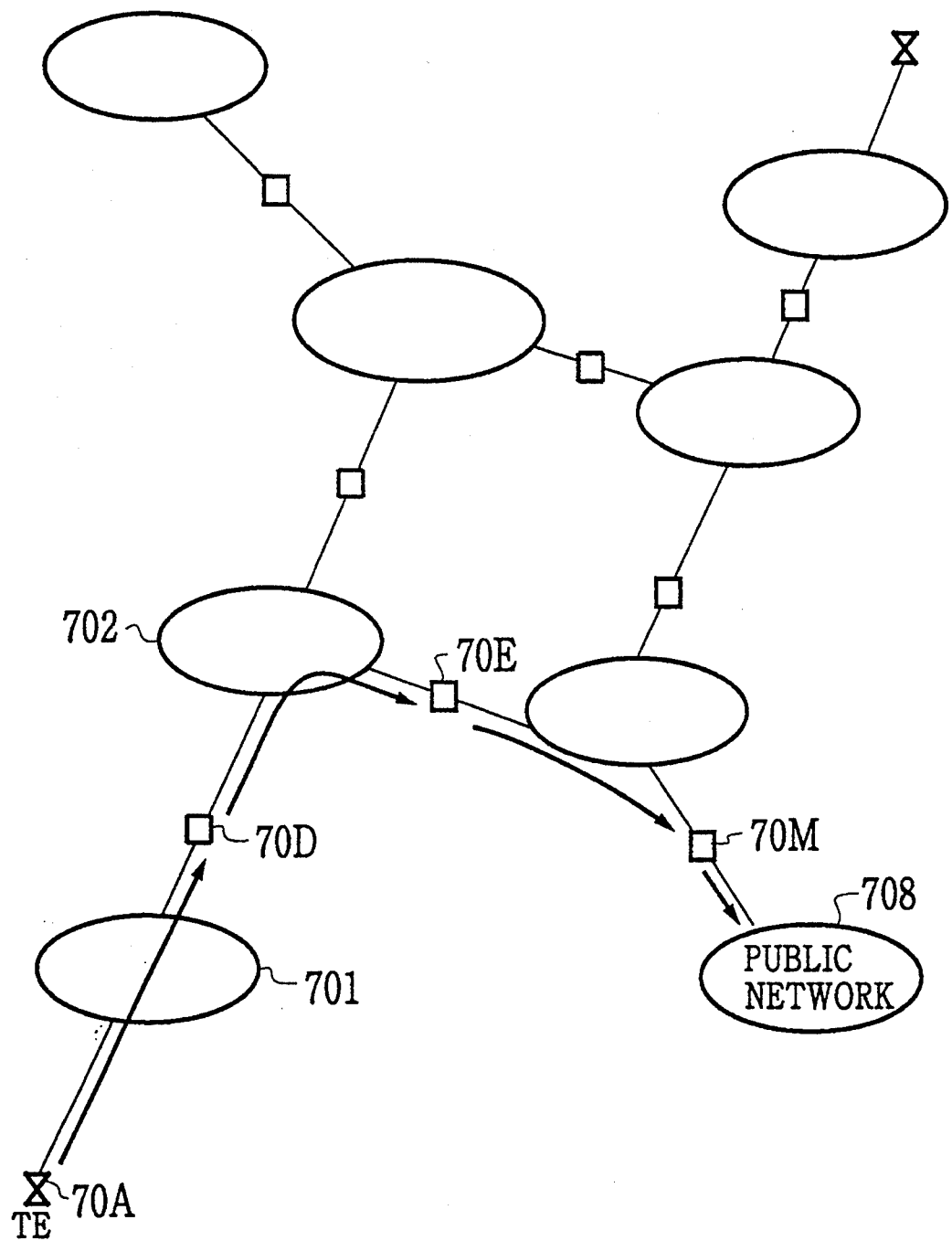
FIG. 40 is a schematic network diagram of the network of FIG. 34 for still another exemplary datagram transmission in a first case of the datagram delivery to external network.
Figure 41:
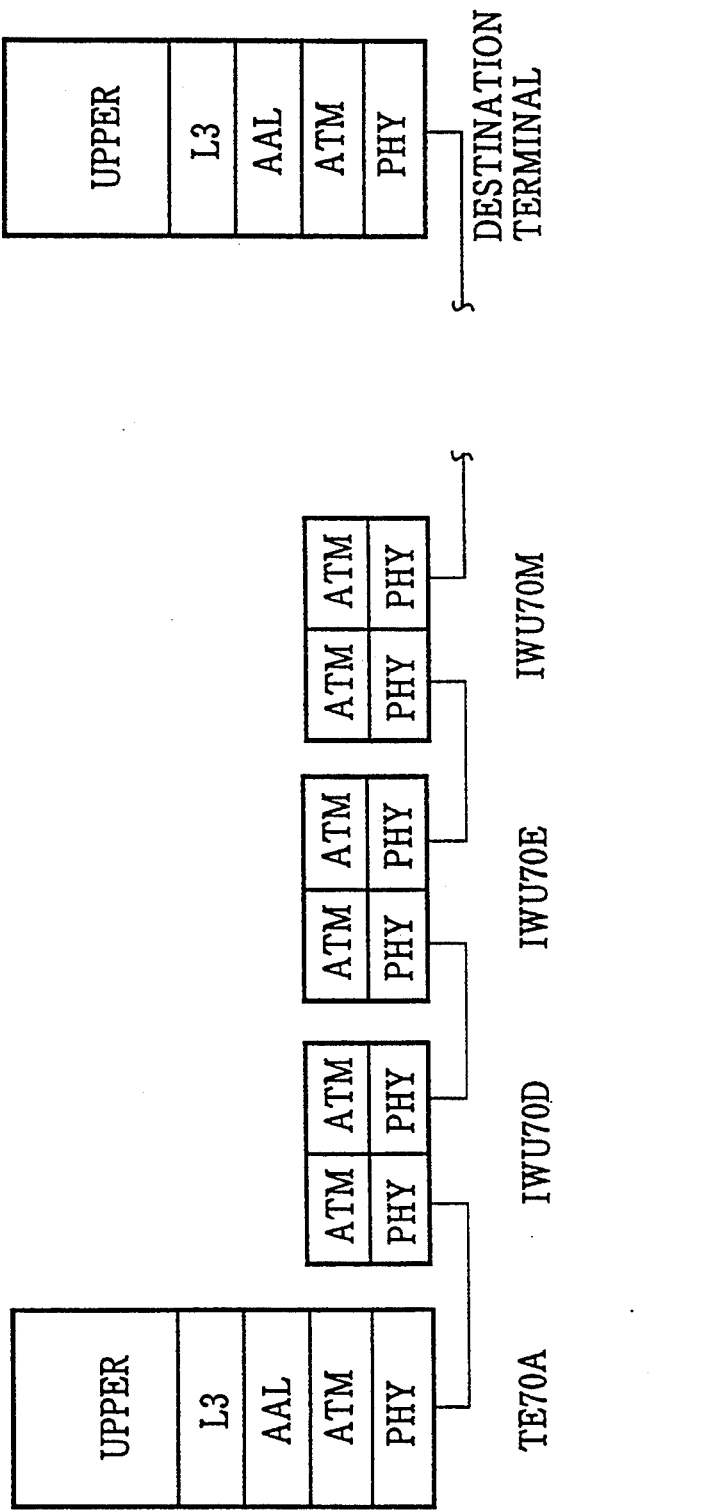
FIG. 41 is a diagram of data layer sequence for a protocol processing in the first case of the datagram delivery to external network shown in FIG. 40.

Similarly, an exemplary protocol processing in a case of transmitting the datagram from the terminal 70A to the public network 708 through the ATM connections of FIG. 40 is shown in FIG. 41 for the datagram relayed through paths 781 to 783 shown in FIG. 42.

Now, more concrete example of this case will be described in detail.

In transmitting the datagram from the terminal 70A to the terminal 70B, the required ATM connection configuration is as shown in FIG. 37. Here, at a time of the datagram transmission, the terminal 70A carries out the address resolution of the terminal 70B by analyzing the access address data of the sub-network to which the terminal 70B belongs. Namely, the terminal 70A transmits the AR request message containing the address data of the terminal 70B to the ARS. The ARS which received this AR request then carries out the address resolution and returns to the terminal 70A the AR response indicating the VCI/VPI data for transmitting the cell to the terminal 70B.

The terminal 70A which obtained the ATM layer address (VCI/VPI) data for transmitting the cell to the terminal 70B then outputs the cell attached with the VCI/VPI to the network. Then, after the VCI/VPI conversion at the IWU 70D, the cell is transmitted to the IWU 70G. Similarly, the cell is transmitted to the CLSF 7061 via the IWUs 70H and 70J. The CLSF 7061 which received this cell then analyzes the layer 3 address data of the datagram and transmits the cell to the terminal 70B. Here, the cell transmission from the CLSF 7061 to the terminal 70B may be made after all the cells belonging to the datagram are received by the CLSF 7061, or by the pipeline-like cell relaying after the analysis of the layer 3 address data of the datagram.

In transmitting the datagram from the terminal 70A to the public network 708, the required ATM connection configuration is as shown in FIG. 40. Here, at a time of the datagram transmission, the terminal 70A carries out the address resolution of the target terminal by analyzing the access address data of the sub-network to which the destination terminal belongs. Namely, the terminal 70A transmits the AR request message containing the address data of the destination terminal to the ARS. The ARS which received this AR request then carries out the address resolution and returns to the terminal 70A the AR response indicating the VCI/VPI data for transmitting the cell to the destination terminal.

The terminal 70A which obtained the ATM layer address (VCI/VPI) data for transmitting the cell to the terminal 70B then outputs the cell attached with the VCI/VPI to the network. Then, after the VCI/VPI conversion at the IWU 70D, the cell is transmitted to the IWU 70E. Similarly, the cell is transmitted to the public network 708 via the IWU 70M.

In transmitting the datagram from the public network 707 to the terminal 70A, the required ATM connection configuration is as shown in FIG. 35. Here, the transmission source terminal is present within the public network 707, and the cell related to the connection-less communication from the public network 707 is transmitted to the CLSF-P 811 via the IWU 70K. The VCI/VPI conversion table provided at the IWU 70K is set such that the cell Is transmitted to the CLSF-P 811 whenever the cell having the VCI/VPI assigned to the cell used by the connection-less communication in the public network 707 has arrived.

The CLSF-P 811 terminates the ATM connection once, and analyzes the layer 3 address data of the datagram. In a case the address data to be analyzed is not present In the table within the CLSF-P 811, the CLSF-P 811 transmits the AR request to the ARS. The CLSF-P 811 which obtained the ATM layer address (VCI/VPI) data for transmitting the cell to the terminal 70A then outputs the cell attached with the VCI/VPI to the network. After the VCI/VPI conversion at the IWU 70G, the cell is transmitted to the IWU 70D, and then to the CLSF 7011. The CLSF 7011 which received the cell then analyzes the layer 3 address data of the datagram, and transmits the cell to the terminal 70A. Here, the cell transmission from the CLSF 7011 to the terminal 70A and the cell transmission from the CLSF-P 811 to the IWU 70G may be made after all the cells belonging to the datagram are received by the CLSF 7081 or the CLSF-P 811, or by the pipeline-like cell relaying after the analysis of the layer 3 address data of the datagram.

2. General ATM Network: Scheme II

In this case, the ATM connections are provided as follows. Namely, in order to transmit the datagram from the terminal connected to each sub-network to the terminal connected to an optional sub-network, the ATM connections are set up from each CLSF to the CLSFs provided within all the sub-networks. That is, the ATM connections among the CLSFs are set up in the fully meshed manner. Here, the IWU (relaying IWU) provided on the route of the ATM connection carries out the rewriting of the ATM header data or at least the VCI/VPI conversion, and the cell relaying is executed as the work at the ATM layer. In other words, the ATM connection is not terminated in principle at the IWU. Also, it is also possible for the CLSF to be provided at a position of the IWU if desired.

Here, when the datagram is transmitted to the network defined by the public networks 707 and 708, the received cell to which the datagram belongs is transmitted to the server for terminating the datagram connection of the public network once. This server can also be provided on the IWU if desired. The server which terminated the datagram transmitted from the public network relays the datagram by the same procedure as the datagram transmission from the terminal within the defined network.

Figure 43:
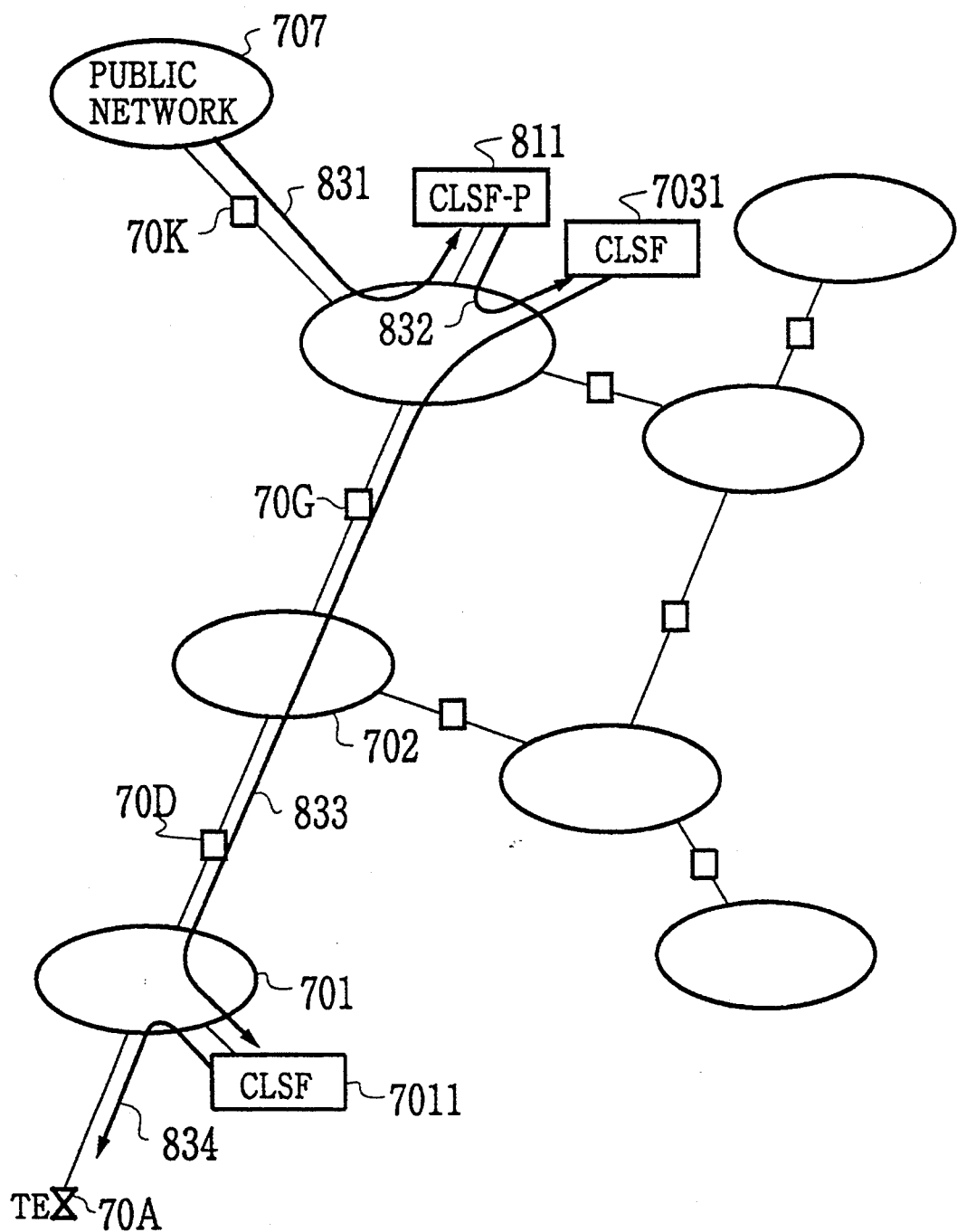
FIG. 43 is a schematic network diagram of the network of FIG. 34 for an exemplary datagram transmission in a second case of the datagram delivery to external network.

The exemplary ATM connection configuration at a time of transmitting the datagram from the public network 707 to the terminal 70A is shown in FIG. 43. In this exemplary case, the datagram transmitted from the public network 707 is terminated at the CLSF-P 811 once, and then transmitted to the terminal 70A via the CLSFs 7031 and 7011. Therefore, there are four ATM connections 831, 832, 838, and 834.

Now, in this case, the protocol at the terminal is as follows. Namely, when the terminal judges that the datagram is destined to the external sub-network, the terminal transmits the datagram to the CLSF. This CLSF is usually present in the same sub-network as the terminal, but the CLSF may be provided at the other sub-network such as that of the neighboring node if desired. Here, the ATM connection is assumed to be already set up between the terminal and the CLSF. Each terminal has the address space data (such as address masks) for the sub-network to which it belongs, so that it is possible for each terminal to judge whether the destination terminal is the terminal within its own network or the terminal of the external sub-network.

Figure 44:
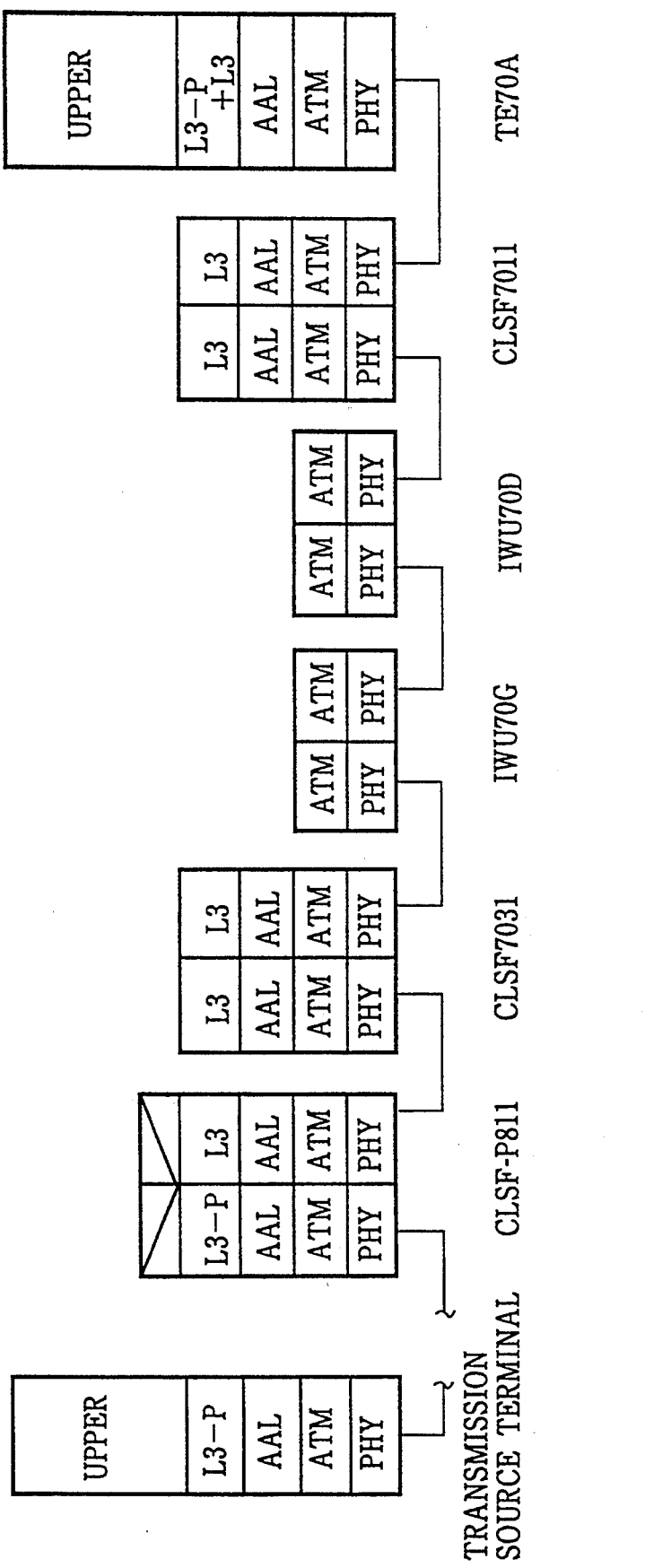
FIG. 44 is a diagram of data layer sequence for a protocol processing in the second case of the datagram delivery to external network shown in FIG. 44.

An exemplary protocol processing in a case of transmitting the datagram from the public network 707 to the terminal 70A through the ATM connections of FIG. 43 described above is shown in FIG. 44.

In the network architecture shown in FIG. 34, the datagram delivery can be realized by any of the following two schemes.

(1) In this scheme, the star-shaped ATM connections are set up from between the CLSF and the terminals. The terminal transmits the cell to the CLSF whenever the datagram transmission is to be carried out. The datagram delivery is entirely carried out by the CLSF. Namely, even the communication between the terminals within the same sub-network is realized via the CLSF.

(2) The communication between the terminals within the same sub-network is realized without the CLSF, while the communication with the terminal of the external network is realized via the CLSF.

Next, the routing to the destination terminal in this case will be described. The final delivery of the datagram to each terminal is carried out by each CLSF only for its own network. For example, the CLSF 7061 carries out the datagram delivery to only the terminals belonging to the network 706. Similarly, the CLSF 7031 carries out the datagram delivery to only the terminals within the network 703. When the network address possessed by the datagram received at each CLSF is not present in the address entries possessed by that CLSF, or when the address of the received datagram is not elements of the network address space of the network, it is judged that that datagram has been transmitted incorrectly. The treatment of the erroneously delivered datagram will not be discussed here.

Thus, it suffices for each CLSF to possess only the address data of the terminals of the network to which that CLSF itself belongs. When the address of the of the received datagram is present in its own network, the appropriate ATM connection is selected and the relaying of the datagram is carried out.

Figure 45:
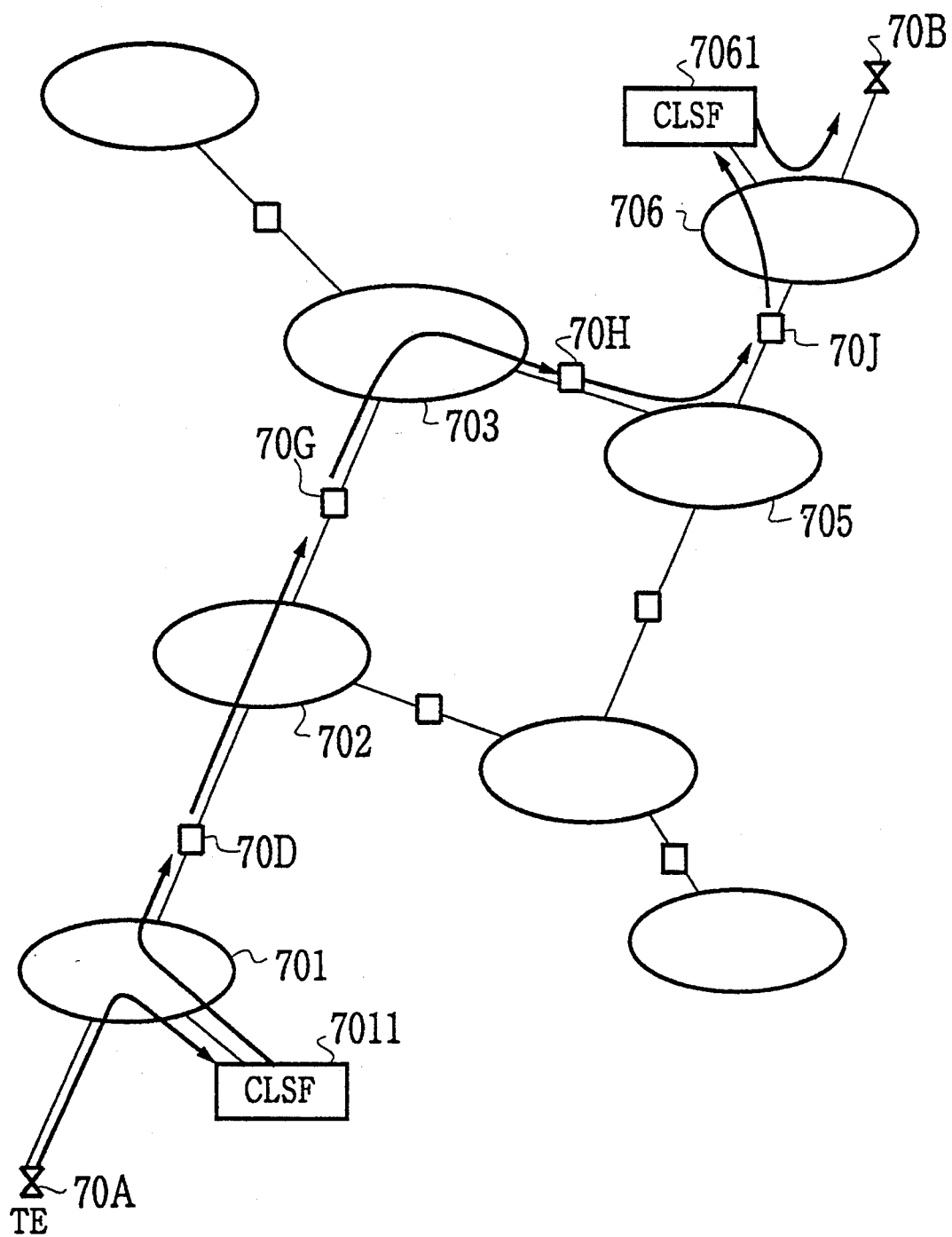
FIG. 45 is a schematic network diagram of the network of FIG. 34 for another exemplary datagram transmission in a second case of the datagram delivery to external network.
Figure 46:
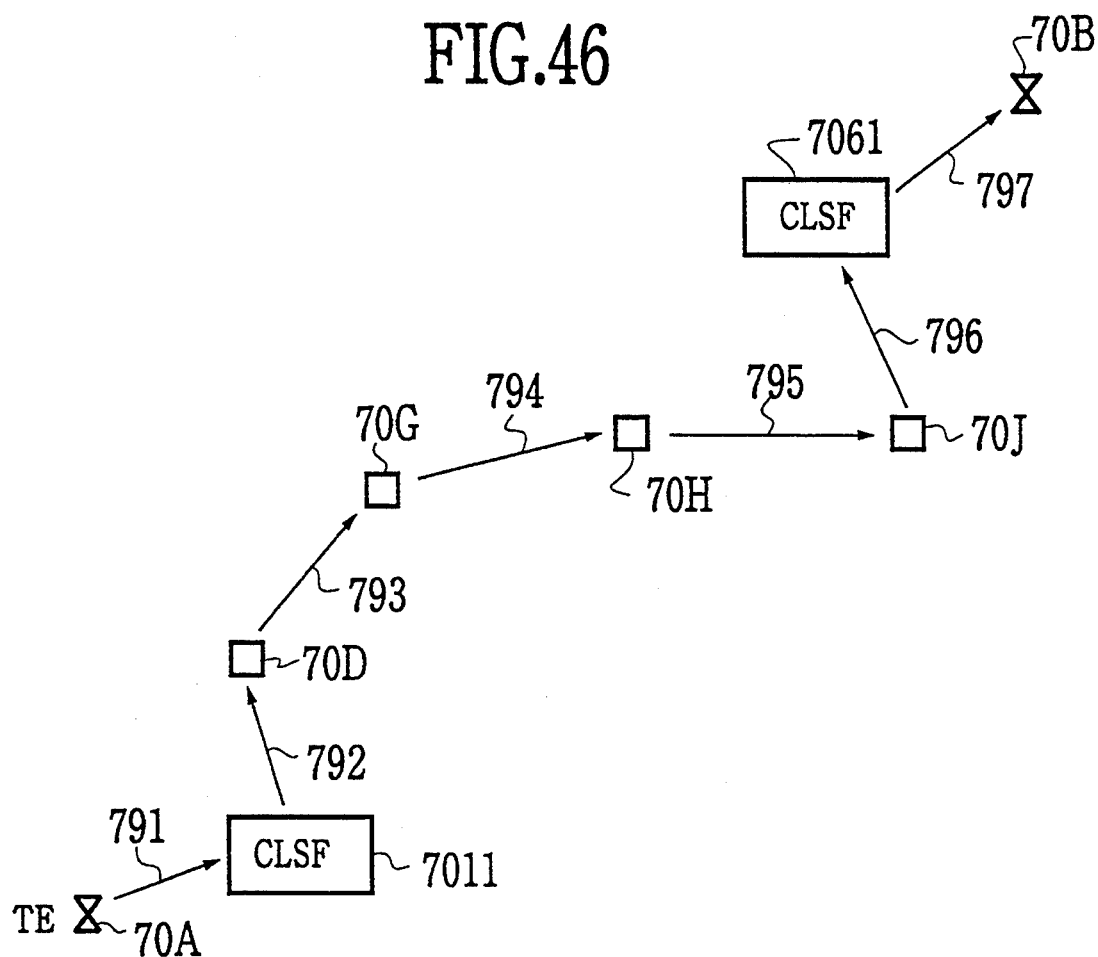
FIG. 46 is a diagram of ATM connections in the second ease of the datagram delivery to external network shown in FIG. 45.

An exemplary ATM connection configuration in a case of transmitting the datagram from the terminal 70A to the terminal 70B is shown in FIG. 45 for the datagram relayed through the paths 791 to 797 shown in FIG. 46. Namely, the ATM connection is terminated at the CLSFs 7061 and 7011. The OSI layer 3 protocol processing is carried out at the CLSF 7011, and the data unit is transmitted to the IWU 70D using the ATM connection. Also, the OSI layer 3 protocol processing is carried out at the CLSF 7061, and the data unit is transmitted to the terminal 70B using the ATM connection. In this manner, at a time of the datagram transmission to the terminal other than those of its own sub-network, the end-to-end datagram delivery can be realized with only two ATM connection terminations.

Figure 48:
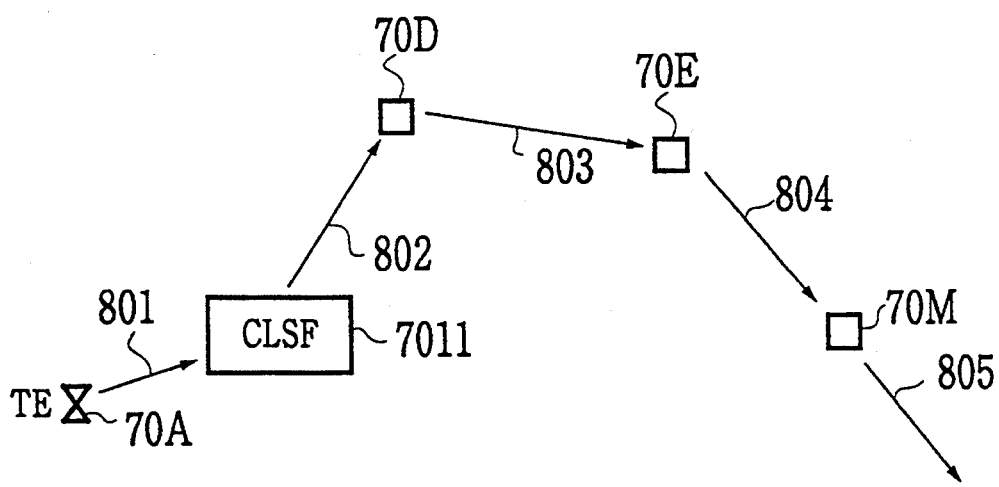
FIG. 48 is a diagram of ATM connections in the second case of the datagram delivery to external network shown in FIG. 47.
Figure 47:
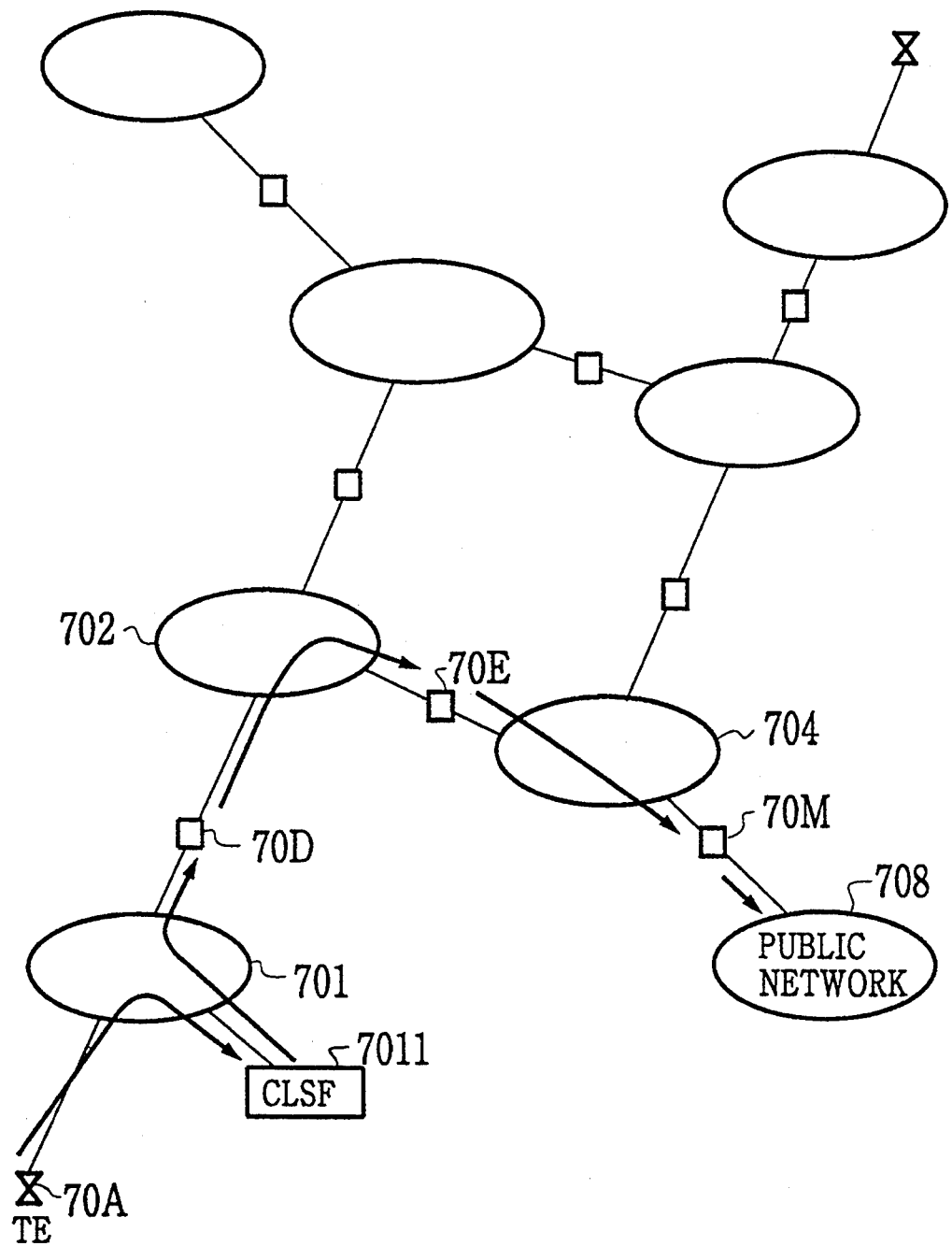
FIG. 47 is a schematic network diagram of the network of FIG. 34 for still another exemplary datagram transmission in a second case of the datagram delivery to external network.

Similarly, an exemplary ATM connection configuration in a case of transmitting the datagram from the terminal 70A to the public network 708 is shown in FIG. 47 for the datagram relayed through the paths 801 to 804 shown in FIG. 48.

Now, more concrete example of this case will be described in detail.

In transmitting the datagram from the terminal 70A to the terminal 70B, the required ATM connection configuration is as shown in FIG. 45. Here, at a time of the datagram transmission, the terminal 70A transmits the datagram to the CLSF 7011 when it is analyzed that the terminal 70B is the terminal belonging to the external sub-network. The CLSF 7011 then analyzes the address data of the received datagram, and transmits the AR request cell having the address data of the terminal 70B to the ARS when it does not possess the ATM layer address data for transmitting the datagram to the terminal 70B (CLSF 7061). The ARS which received this AR request then carries out the address resolution and returns to the CLSF 7011 the AR response indicating the VCI/VPI data for transmitting the cell to the CLSF 7061 (terminal 70B).

The CLSF 7011 which obtained the ATM layer address (VCI/VPI) data for transmitting the cell to the terminal 70B then outputs the cell attached with the VCI/VPI to the network. Then, after the VCI/VPI conversion at the IWU 70D, the cell is transmitted to the IWU 706. Similarly, the cell is transmitted to the CLSF 7061 via the IWUs 70H and 70J. The CLSF 7061 which received this cell then analyzes the layer 3 address data of the datagram and transmits the cell to the terminal 70B. Here, the cell transmission from the CLSF 7061 to the terminal 70B may be made after all the cells belonging to the datagram are received by the CLSF 7061, or by the pipeline-like cell relaying after the analysis of the layer 3 address data of the datagram.

In transmitting the datagram from the terminal 70A to the public network 708, the required ATM connection configuration is as shown in FIG. 47. Here, at a time of the datagram transmission, the terminal 70A carries out the address resolution of the target terminal by analyzing the access address data of the sub-network to which the destination terminal belongs. Namely, the terminal 70A transmits the AR request message containing the address data of the destination terminal to the ARS when the terminal 70A cannot carry out the resolution of the address data of the destination terminal. The ARS which received this AR request then carries out the address resolution and returns to the terminal 70A the access address data of the CLSF 7011 with the AR response indicating the VCI/VPI data for transmitting the cell to the destination terminal. Then, when it is analyzed that the destination terminal is the terminal belonging to the external sub-network, the terminal 70A attaches the VCI/VPI data either received or obtained from the analysis, and transmits the cell to the CLSF 7011.

The CLSF 7011 then analyzes the address data of the received datagram, and transmits the AR request cell having the address data of the destination terminal to the ARS when it does not possess the ATM layer address data for transmitting the datagram to the destination terminal. The ARS which received this AR request then carries out the address resolution and returns to the CLSF 7011 the AR response indicating the VCI/VPI data for transmitting the cell to the IWU 70M.

The CLSF 7011 which obtained the ATM layer address (VCI/VPI) data for transmitting the cell to the terminal 70B then outputs the cell attached with the VCI/VPI to the network. Then, after the VCI/VPI conversion at the IWU the cell is transmitted to the IWU 70E. Similarly, the cell is transmitted to the public network 708 via the IWU 70M.

In transmitting the datagram from the public network 707 to the terminal 70A, the required ATM connection configuration is as shown in FIG. 48. Here, the transmission source terminal is present within the public network 707, and the cell related to the connection-less communication from the public network 707 is transmitted to the CLSF-P 811 via the IWU 70K. The VCI/VPI conversion table provided at the IWU 70K is set such that the cell is transmitted to the CLSF-P 811 whenever the cell having the VCI/VPI assigned to the cell used by the connection-less communication in the public network 707 has arrived.

The CLSF-P 811 terminates the ATM connection once, and analyzes the layer 3 address data of the datagram. In a case the address data to be analyzed is not present in the table within the CLSF-P 811, the CLSF-P 811 transmits the AR request to the ARS. The CLSF-P 811 which obtained the ATM layer address (VCI/VPI) data for transmitting the cell to the CLSF 7031 then outputs the cell attached with the VCI/VPI to the network. The CLSF 7013 then analyzes the address data of the receive datagram The CLSF 7031 then analyzes the address data of the received datagram, and transmits the AR request cell having the address data of the terminal 70A to the ARS when it does not possess the ATM layer address data for transmitting the datagram to the terminal 70A (CLSF 7011). The ARS which received this AR request then carries out the address resolution and returns to the CLSF 7081 the AR response indicating the VCI/VPI data for transmitting the cell to the CLSF 7011 (terminal 70A).

The CLSF 7031 which obtained the ATM layer address (VCI/VPI) data for transmitting the cell to the terminal 70A then outputs the cell attached with the VCI/VPI to the network.

Then, after the VCI/VPI conversion at the IWU 70G, the cell is transmitted to the IWU 70D. Similarly, the cell is transmitted to the CLSF 7011 via the IWU 70D. The CLSF 7011 which received the cell then analyzes the layer 3 address data of the datagram and transmits the cell to the terminal 70A.

Here, the cell transmission from the CLSF 7011 to the terminal 70A, the cell transmission from the CLSF-P 811 to the CLSF 7031, and the cell transmission from the CLSF 7031 to the IWU 70G may be made after all the cells belonging to the datagram are received by the CLSF 7011, the CLSF-P 811, or the CLSF 7031, or by the pipeline-like cell relaying after the analysis of the layer 3 address data of the datagram.

3. Case Using VPI Routing

In this case, each sub-network has 8 bits sub-network identification number. Within the defined network, the sub-network can be uniquely identified by this identification number. This identification number of the sub-network will be denoted as $Net_l$ below. For example, the sub-network 702 has the identification number $Net_{782}$. Also, each IWU has obtained the access address (VPI) for the connection-less communication on its both sides. Moreover, each CLSF on the receiving side has also obtained the access address (VPI) for the connection-less communication, where this CLSF is for handling the cells arriving from the IWU which can be formed separately from the CLSF for handling the cells for the connection-less communication coming from the terminals within its own network.

Here, the VCI/VPI field is coded according to the following manner.

(1) Cell from transmission source terminal to CLSF of its own network:
- (1-1) VPI-F; access address of CLSF
- (1-2) VCI-F1; address $Net_l$ of destination network or arbitrary
- (1-3) VCI-F2; access address of itself (2) Cell between CLSFs
- (2-1) VPI-F; access address of next access element (IWU or destination CLSF)
- (2-2) VCI-F1; address $Net_{destination}$ of destination network
- (2-3) VCI-F2; address $Net_{source}$ of network to which transmission source terminal belongs (3) Cell from CLSF of network of destination terminal to destination terminal
- (3-1) VPI-F; access address of destination terminal
- (3-2) VCI-F1; arbitrary setting possible
- (3-3) VCI-F2; arbitrary setting possible Here, "arbitrary setting possible" means it is possible to be set to an arbitrary value as long as it is set such that the cell received at the destination terminal can be distinguished from a cell arriving from the other arbitrary access point for certain.

The above coding of the VCI/VPI can be applied in practice as follows.

(1) Sub-network Containing Transmission Source Terminal

First, the coding of the VCI/VPI field of the cell from the transmission source terminal to the CLSF can be done as follows. Namely, in this case, the VPI-F is an access address of the CLSF, while the VCI-F2 is defined as the access address of the transmission source terminal. As for the VCI-F1, there are two cases of carrying out the address resolution of the sub-network to which the destination terminal belongs either at the transmission source terminal or at the CLSF.

(a) In a case of carrying out the address resolution at the transmission source terminal, the identification number $Net_{destination}$ of the destination sub-network obtained by the transmission source terminal is written into the VCI-F1.

(b) In a case of carrying out the address resolution at the CLSF, the VCI-F1 can be set as an arbitrary value.

Next, the coding of the VCI/VPI field of the cell from the CLSF to the IWU can be done as follows. Namely, in this case, the VPI-F is an access address of the IWU, and the VCI-F1 is set to be the identification number $Net_{destination}$ of the destination network, while the VCI-F2 is set to be the identification number $Net_{source}$ of the network of the transmission source terminal. Here, again, for the setting of the VCI-F1, there are two cases of carrying out the address resolution of the sub-network to which the destination terminal belongs either at the transmission source terminal or at the CLSF.

(a) In a case of carrying out the address resolution at the transmission source terminal, the identification number $Net_{destination}$ of the destination sub-network obtained by the transmission source terminal is copied into the VCI-F1.

(b) In a case of carrying out the address resolution at the CLSF, a value obtained by the address resolution is written into the VCI-F1.

Here, in transmitting the cell from the CLSF to the IWU, the interleaving between the cells belonging to the different datagrams but for the same destination network is not allowed, although it is allowed as long as the destination network is different. Namely, a series of cells belonging to one datagram are going to be transmitted continuously. In other words, it is possible to transmit the cell toward the CLSF from each transmission source terminal at arbitrary timings, but the cells toward the IWU are transmitted from the CLSF datagram by datagram. At the IWU, the value of the VPI-F is determined according to the $Net_{destination}$ written in the VCI-F1 of the received cell. Namely, the IWU has a table registering the VPI-F value in correspondence to the $Net_{destination}$.

Also, the VCI-F1 and VCI-F2 are transmitted transparently, and the routing protocol for determining the VPI-F. i.e., the relaying target sub-network, from the $Net_{destination}$ is executed separately, and a table for each IWU is provided.

(2) Between IWUs

The cells are relayed according to the table of the IWU. Namely, the according to the $Net_{destination}$ of the VCI-F1 of the received cell, the VPI-F for relaying the cell to the next IWU is written.

(3) Sub-network Containing Destination Terminal

The IWU to which the destination terminal belongs looks up the VCI-F1 of the received cell, and recognizes that the received cell is destined to its own sub-network. The table provided In the IWU for setting the VPI-F has the VPI value for transmitting the cell to the CLSF. The IWU sets this VPI to the VPI-F, and transmits the cell to the CLSF. At this point, the VCI-F1 and VCI-F2 are transmitted transparently.

The CLSF which received the cell then carries out the re-assembling of the datagram according to the VCI data. Here, it is possible for the cells belonging to different datagrams to be interleaved, but the datagrams can be reconstructed correctly even when the cells for the datagrams are interleaved. The CLSF then analyzes the destination address (layer 3 address) of the received datagram, and transmits the datagram to the appropriate terminal.

The VPI-F of the cell transmitted from the CLSF to the terminal is the access address of the terminal. Next, the VCI field uses the VCI defined (possibly in plurality) for the cell of the connection-less communication by the cell received by the terminal. This VCI is usually set up in advance between the CLSF and the terminal. In a case of having a plurality of VCIs for connection-less communication, it is possible for the cell transmission from the CLSF to the terminal to be made in pipeline-like manner within a range of no conflict for the identification numbers. i.e. the cells belonging to the different datagrams can be interleaved.

For example, when the VCI field format is defined by the communication from the terminal to the CLSF, that when the VCI field format of the communications within the sub-network is uniform as such, the VCI-F2 of the cell received by the CLSF is directly set to the VCI-F2 of the cell to be transmitted to the terminal from the CLSF, and the VCI-F1 is set to be a value by which it is possible to identify this cell as the cell related to the connection-less communication, such that the datagram can be processed completely in the pipeline-like manner.

Now, more concrete example of this case will be described in detail.

First, with references to FIGS. 45 and 46, the datagram transmission from the terminal 70A to the terminal 70B will be described. In this case, three ATM connections are required, one formed by the connection 791 from the terminal 70A to the CLSF 7011, another formed by the connections 792 to 796 from the CLSF 7011 to the CLSF 7961, and still another formed by the connection 797 from the CLSF 7061 to the terminal 70B.

The terminal 70A transmits the cell with the VPI-F having $VPI_{7011}$, while the VCI-F2 has $VPI_{784}$ which is the access address of the terminal 70A itself. Also, when the terminal 70A carries out the address resolution of the address data ($Net_{786}$) of the sub-network to which the destination terminal belongs by itself, this value $Net_{786}$ as is written into the VCI-F1. On the other hand, when the CLSF 7011 carries out the address resolution, the VCI-F1 can be set to an arbitrary value.

The CLSF 7011 transmits the cell with the VPI-F having $VPI_{70D-1}$ which is the access address of the IWU 70D, the VCI-F1 having $Net_{786}$ which is the identification address of the network 706, and the VCI-F2 having $Net_{781}$ which is the identification address of the network 701. Here, for the VCI-F1, there are two cases of copying the value of the received cell directly (as the terminal analyzes $Net_{786}$) and analyzing and setting $Net_{706}$ by the CLSF 7011.

The IWU 70D analyzes the VCI-F1 of the received cell, as well as the corresponding VPI-F. Namely, the VPI for which the cell can be transmitted toward the IWU for transmitting to the network 706 is analyzed according to the setting in the table. The VCI-F1 and VCI-F2 are copied directly from these fields in the received cell. Namely, the VCI-F1 has $Net_{706}$ which is the network identification number of the sub-network 706 to which the destination terminal 70B belongs. Thereafter, similarly, the IWU 70D selects the appropriate VPI according to the data of $Net_{706}$ which is the data written in the VCI-F1 in the received cell, and transmits the cell to the IWU 70J.

The IWU 70J recognizes that the cell has reached the target network according to the VCI-F1 data, and transmits the cell to the CLSF 7061. The datagram arrived to the CLSF 7061 is cell re-assembled once, and the ATM connection is terminated. The CLSF 7061 analyzes the address data of the upper layer and recognizes that the destination of the datagram as the terminal 70B. Then, the CLSF 7061 generates the cell and transmits the datagram to the terminal 70B. Here, the cell transmission to the terminal 70B can be done in the pipeline-like manner since the cell reception at the CLSF 7061 when there are sufficient amount of the connection-less communication channels to the terminal 70B Next, with reference to FIG. 47, the datagram transmission from the terminal 70A to the public network 708 is described. The terminal 70A transmits the cell with VPI-F having $VPI_{7011}$, while the VCI-F2 has $VPI_{704}$ which is the access address of the terminal 70A itself. Also, when the terminal 70A carries out the address resolution of the address data ($Net_{708}$) of the sub-network to which the destination terminal belongs by itself, this value $Net_{708}$ is written into the VCI-F1. On the other hand, when the CLSF 7011 carries out the address resolution, the VCI-F1 can be set to an arbitrary value.

The CLSF 7011 transmits to the IWU 70D the cell with the VPI-F having $VPI_{70D-1}$ which is the access address of the IWU 70D, the VCI-F1 having Netwhich is the identification address of the network 708, and the VCI-F2 having $Net_{701}$ which is the identification address of the network 701. Here, for the VCI-F1, there are two cases of copying the value of the received cell directly (as the terminal analyzes $Net_{708}$) and analyzing and setting $Net_{708}$ by the CLSF 7011.

The IWU 70D analyzes the VCI-F1 of the received cell, as well as the corresponding VPI-F. Namely, the VPI for which the cell can be transmitted toward the IWU for transmitting to the network 708 can be analyzed according to the setting in the table. The VCI-F1 and VCI-F2 are copied directly from these fields in the received cell. Namely, the VCI-F1 has $Net_{708}$ as which is the network identification number of the sub-network 708 to which the destination terminal belongs. Thereafter, similarly, the IWU 70D selects the appropriate VPI according to the data of $Net_{708}$ which is the data written in the VCI-F1 in the received cell, and transmits the cell to the IWU 70k.

The IWU 70M writes the VCI/VPI assigned to the ATM connection defined by the public network 708 from the VCI data of the received cell, and transmits the cell to the public network.

DATAGRAM DELIVERY IN LARGE SCALE NETWORK ARCHITECTURE

In a case a number of defined sub-network is very large, the above described network architecture can be expanded by inter-networking a plurality of networks. Namely, in this scheme, neighboring networks (where each network is defined as a set of sub-networks as in the above) are regarded as a single sub-network of a large scale network architecture.

Figure 50:
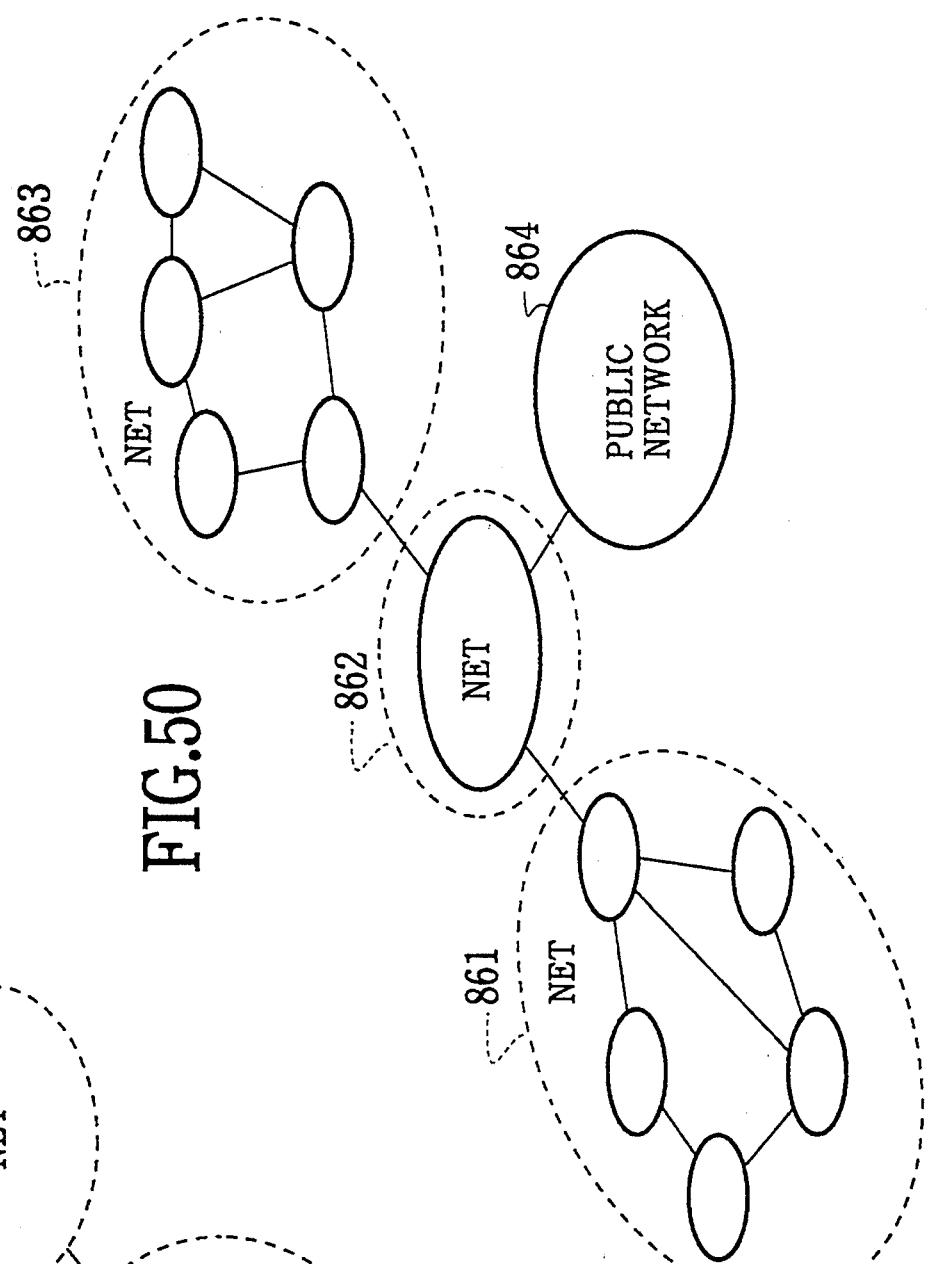
FIG. 50 is a schematic overall network diagram of the network of FIG. 49 showing the sub-networks involved.
Figure 49:
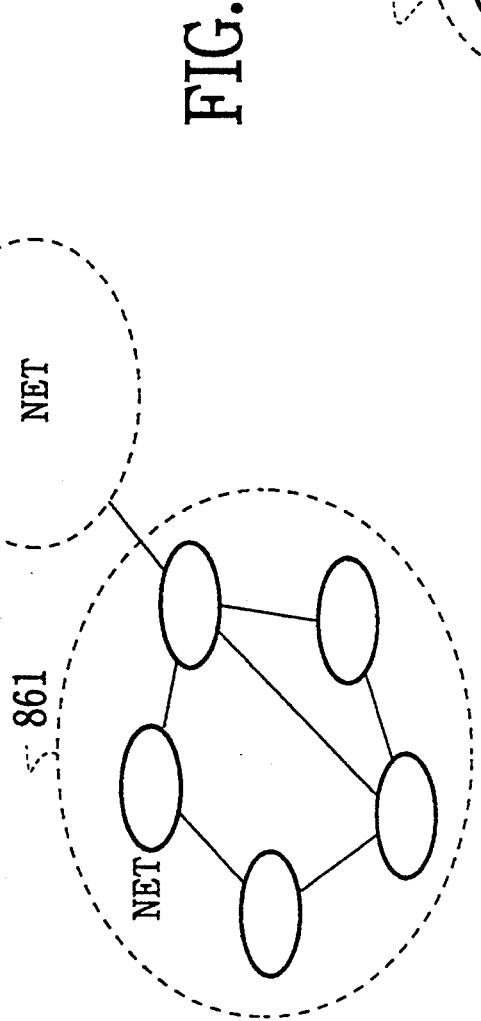
FIG. 49 is a schematic overall network diagram of the ATM communication system according to the present invention in a case of a large scale network architecture.

FIG. 49 shows a configuration of such a large scale network architecture viewed from a network 861, in which there is another network 851 which is inter-networking with the network 861. In reality, this network architecture has a configuration as shown in FIG. 50, where the network 851 actually comprises networks 862 and 863 and the public network 864 to be regarded together as a single sub-network from the view of the network 861. Thus, from the viewpoint of the network 861, the address space of the network 851 appears to contain those of the networks 862 to 864 together.

Figure 51:
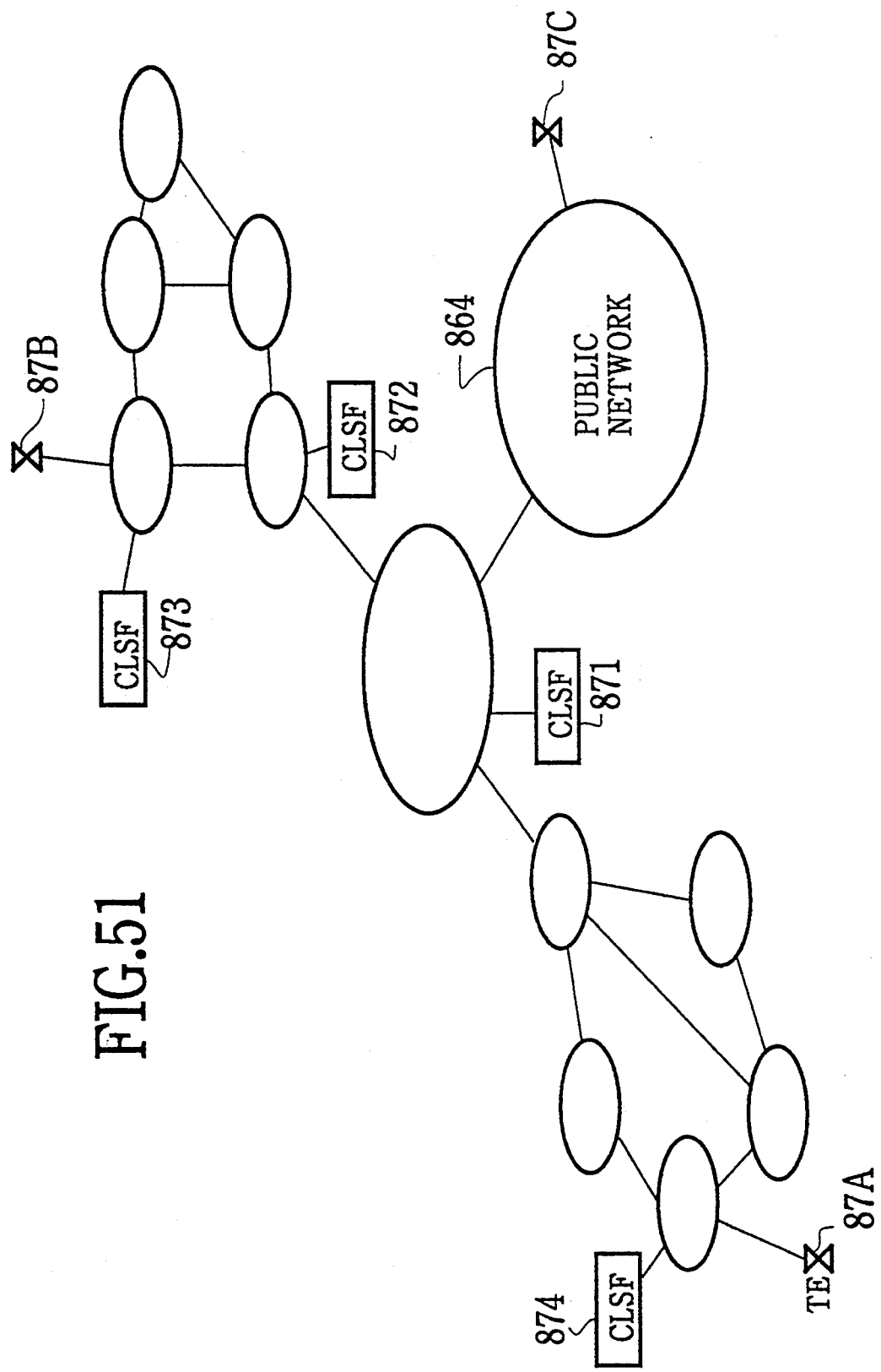
FIG. 51 is a schematic network diagram of the network of FIG. 50 for a datagram transmission in a case of the datagram delivery to external network.

FIG. 51 is a schematic diagram for this network system which shows only those elements relevant to the exemplary datagram transmissions from a terminal 87A in the network 961 to a terminal 87B in the network 863, and from the terminal 87A to a terminal 87C in the public network 864 which will now be described in detail.

1. Scheme I

This is a scheme in which each terminal can transmit the cell to the external network directly. Namely, this is a scheme in which the CLSF within its own network is not utilized in the datagram transmission to the terminal of the external network.

First, the datagram transmission from the terminal 87A to the terminal 87B is carried out as follows.

In this case, four ATM connections 861 to 864 as shown in FIG. 52 are required, including an ATM connection 861 from the terminal 87A of the network 861 to a CLSF 871 of the network 862, an ATM connection 862 from the CLSF 871 to a CLSF 872 of a sub-network in the network 863 connected with the network 862, an ATM connection 863 from the CLSF 872 to a CLSF 873 of a sub-network in the network 863 connected with the terminal 87B, and an ATM connection 864 from the CLSF 873 to the terminal 87B.

The terminal 87A carries out the address resolution of the network layer address of the terminal 87B to recognize that the terminal 87B belongs to the network 851, while also obtains the VCI/VPI data for transmitting the cell to the CLSF 871 in the manner similar to that described above. Then, the datagram is transmitted from this terminal 87A to the CLSF 871 through the ATM connection 861.

The datagram and the ATM connection are terminated once by the CLSF 871 at which the layer 3 protocol processing for analyzing the network layer address of the datagram is carried out. As a result, it is recognized that the terminal 87B is present in the network 863, while also obtains the VCI/VPI data for transmitting the cell to the CLSF 872. Then, the datagram is transmitted from this CLSF 871 to the CLSF 872 through the ATM connection 862.

The datagram and the ATM connection are terminated again by the CLSF 872 at which the layer 3 protocol processing for analyzing the network layer address of the datagram is carried out, while the VCI/VPI data for transmitting the cell to the CLSF 873 is also obtained. Then, the datagram is transmitted from this CLSF 872 to the CLSF 873 through the ATM connection 863.

The CLSF 873 which received the datagram then analyzes the network layer address of the datagram to analyze the access address of the terminal 87B. Then, the cell with the appropriate VCI/VPI attached is transmitted to the terminal 87B through the ATM connection 864.

In this manner, the termination of the ATM connection and the network layer protocol processing are carried out three times to transmit the datagram from the terminal 87A to the terminal 87B.

Next, the datagram transmission from the terminal 87A to the terminal 87C is carried out as follows.

In this case, two ATM connections 891 and 892 as shown in FIG. 53 are required, including an ATM connection 891 from the terminal 87A of the network 861 to the CLSF 871 of the network 862, and an ATM connection from the CLSF 871 to the terminal 87C in the public network 864.

The terminal 87A carries out the address resolution of the network layer address of the terminal 87C to recognize that the terminal 87C belongs to the network 851, while also obtains the VCI/VPI data for transmitting the cell to the CLSF 871 in the manner similar to that described above. Then, the datagram is transmitted from this terminal 87A to the CLSF 871 through the ATM connection 891.

The datagram and the ATM connection are terminated once by the CLSF 871 at which the layer 3 protocol processing for analyzing the network layer address of the datagram is carried out. As a result, it is recognized that the terminal 87C is present in the network 864, while also obtains the VCI/VPI data for transmitting the cell to the network VCI/VPI. Then, the datagram is transmitted from this CLSF 871 to the IWU provided between the networks 862 and 864 through the ATM connection 892.

In this manner, the termination of the ATM connection and the network layer protocol processing are carried out once to transmit the datagram from the terminal 87A to the network 864 containing the terminal 87C. Here, the datagram transmission target from the CLSF 871 may be the CLSF provided within the public network 864 if desired. In such a case, the termination of the ATM connection and the network layer protocol processing are carried out more than once.

2. Scheme II

This is a scheme in which each terminal cannot transmit the cell to the external network directly. Namely, this is a scheme in which the CLSF within its own network is utilized in the datagram transmission to the terminal of the external network.

First, the datagram transmission from the terminal 87A to the terminal 87B is carried out as follows.

In this case, five ATM connections 901 to 905 as shown in FIG. 54 are required, including an ATM connection 901 from the terminal 87A to a CLSF 874 within the network 861, an ATM connection 902 from the CLSF 874 to a CLSF 871 of the network 862, an ATM connection 903 from the CLSF 871 to a CLSF 872 of a sub-network in the network 863 connected with the network 862, an ATM connection 904 from the CLSF 872 to a CLSF 873 of a sub-network in the network 863 connected with the terminal 87B, and an ATM connection 905 from the CLSF 873 to the terminal 87B.

The terminal 87A carries out the address resolution of the network layer address of the terminal 87B to recognize that the terminal 87B belongs to the network 851 (or that the cell is to be transmitted to the CLSF 874), while also obtains the VCI/VPI data for transmitting the cell to the CLSF 874 in the manner similar to that described above. Then, the cell is transmitted from this terminal 87A to the CLSF 874 through the ATM connection 901.

The CLSF 874 which received this cell recognizes that there is a need to transmits the cell to the network 862 (or CLSF 871) according to the analysis of the network layer address of the datagram obtained either by the CLSF 874 itself or by the terminal 87A, while also obtains the VCI/VPI data for transmitting the cell to the CLSF 871. Then, the datagram is transmitted from this CLSF 874 to the CLSF 871 through the ATM connection 902.

The datagram and the ATM connection are terminated once by the CLSF 871 at which the layer 3 protocol processing for analyzing the network layer address of the datagram is carried out. As a result, it is recognized that the terminal 87B is present in the network 863, while also obtains the VCI/VPI data for transmitting the cell to the CLSF 872. Then, the datagram is transmitted from this CLSF 871 to the CLSF 872 through the ATM connection 903.

The datagram and the ATM connection are terminated again by the CLSF 872 at which the layer 3 protocol processing for analyzing the network layer address of the datagram is carried out, while the VCI/VPI data for transmitting the cell to the CLSF 873 is also obtained. Then, the datagram is transmitted from this CLSF 872 to the CLSF 873 through the ATM connection 904.

The CLSF 873 which received the datagram then analyzes the network layer address of the datagram to analyze the access address of the terminal 87B. Then, the cell with the appropriate VCI/VPI attached is transmitted to the terminal 87B through the ATM connection 905.

In this manner, the termination of the ATM connection and the network layer protocol processing are carried out four (or three) times to transmit the datagram from the terminal 87A to the terminal 87B.

Next, the datagram transmission from the terminal 87A to the terminal 87C is carried out as follows.

Figure 58:
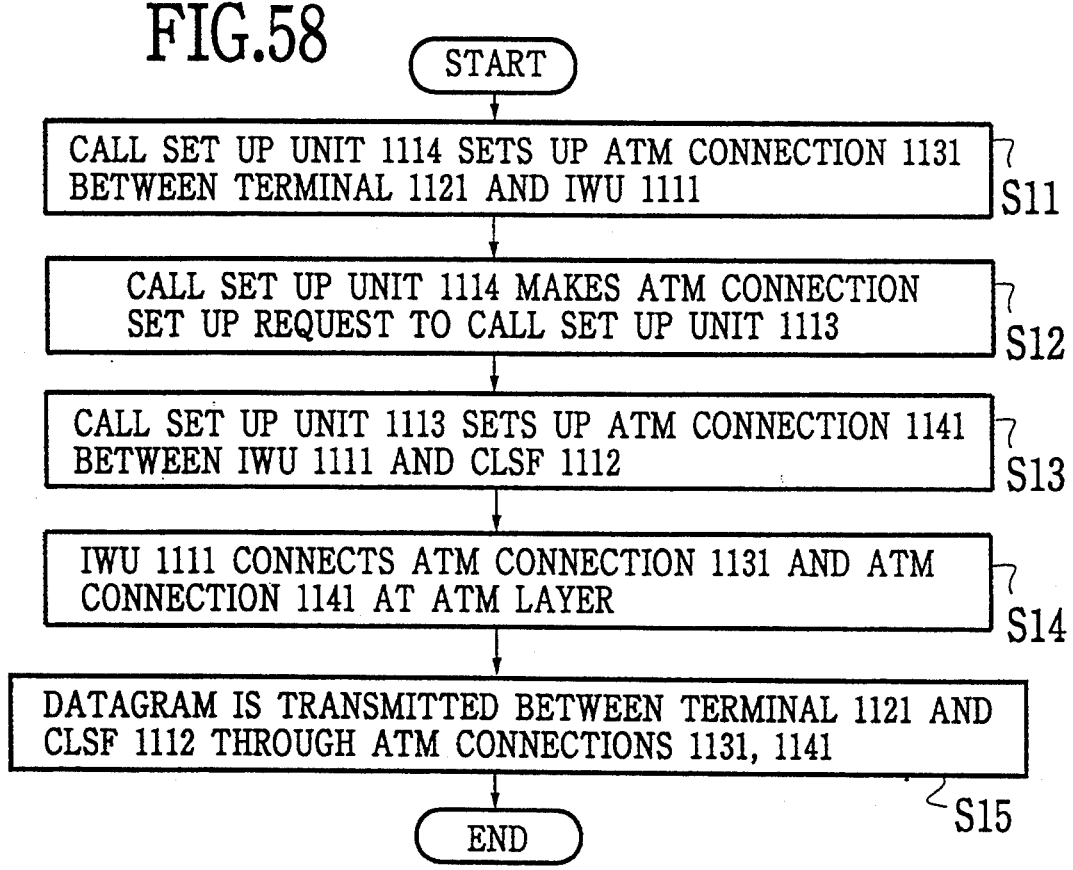
FIG. 58 is a schematic network diagram of the ATM communication system according to the present invention for one embodiment in a case of a modified network layer topology.

In this case, three ATM connections 911 to 913 as shown in FIG. 58 are required, including an ATM connection 911 from the terminal 87A to a CLSF 874 within the network 861, an ATM connection 912 from the CLSF 874 to a CLSF 871 of the network 862, and an ATM connection 913 from the CLSF 871 to the terminal 87C in the public network 864.

The terminal 87A carries out the address resolution of the network layer address of the terminal 87C to recognize that the terminal 87C belongs to the network 851 (or that the cell is to be transmitted to the CLSF 874), while also obtains the VCI/VPI data for transmitting the cell to the CLSF 874 in the manner similar to that described above. Then, the datagram is transmitted from this terminal 87A to the CLSF 874 through the ATM connection 911.

The CLSF 874 which received this cell recognizes that there is a need to transmits the cell to the network 862 (or CLSF 871) according to the analysis of the network layer address of the datagram obtained either by the CLSF 874 itself or by the terminal 87A, while also obtains the VCI/VPI data for transmitting the cell to the CLSF 871. Then, the datagram is transmitted from this CLSF 874 to the CLSF 871 through the ATM connection 912.

The datagram and the ATM connection are terminated once by the CLSF 871 at which the layer 3 protocol processing for analyzing the network layer address of the datagram is carried out. As a result, it is recognized that the terminal 87C is present in the network 864, while also obtains the VCI/VPI data for transmitting the cell to the network VCI/VPI. Then, the datagram is transmitted from this CLSF 871 to the IWU provided between the networks 862 and 864 through the ATM connection 913.

In this manner, the termination of the ATM connection and the network layer protocol processing are carried out twice (or once) to transmit the datagram from the terminal 87A to the network 864 containing the terminal 87C. Here, the datagram transmission target from the CLSF 871 may be the CLSF provided within the public network 864 if desired. In such a case, the termination of the ATM connection and the network layer protocol processing are carried out more than twice.

APPLICATION TO MODIFIED NETWORK LAYER TOPOLOGY

Now, the embodiment in which the above described ATM communication system according to the present invention is applied for a case of realizing a modified network layer topology independent from the topology of the physical network will be described in detail.

Figure 56:
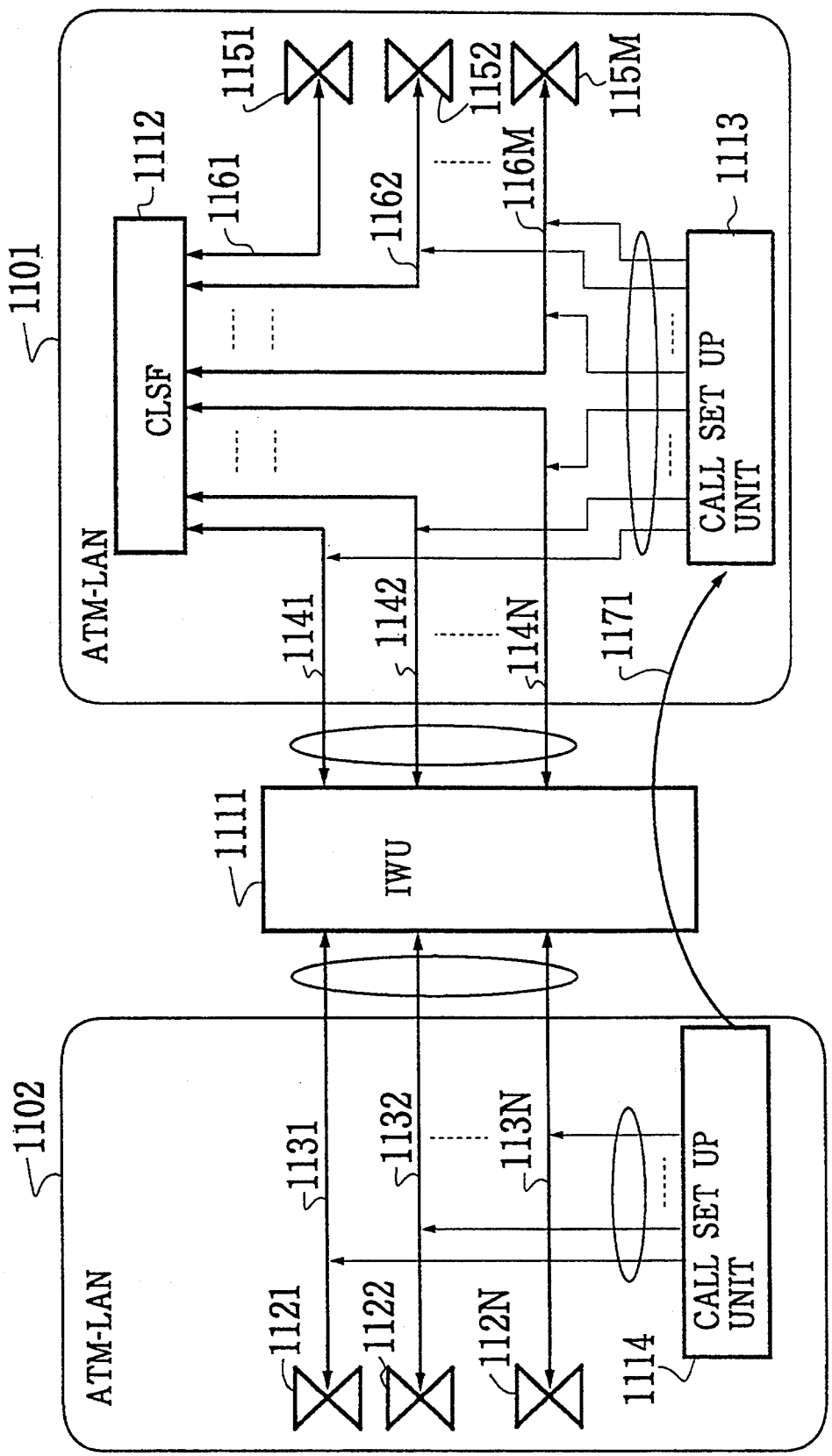

FIG. 56 shows a configuration of the ATM communication system in this embodiment, which comprises: a first ATM-LAN 1101 containing M terminals 151 to 15M and a second ATM-LAN 1102 containing N terminals 121 to 12N which are inter-networking through an IWU 1111. Here, the first ATM-LAN 1101 has a CLSF 1112 for carrying out the processing for realizing the connection-less communication, whereas the second ATM-LAN 1102 has no CLSF.

The CLSF 1112 of the first ATM-LAN 1101 not only supports the datagram transmission among the terminals 151 to 15M of the first ATM-LAN 1101, but also the datagram transmission among the terminals among the terminals 121 to 12N of the second ATM-LAN 1102 as well, and to this end, at the network layer, the CLSF 1112 is given in advance the first address data indicating that it belongs to the first ATM-LAN 1101 in which it is physically located, as well as the second address data indicating that it also belongs to the second ATM-LAN 1102. These first and second address data will be referred hereafter as the network IDs.

Figure 57:
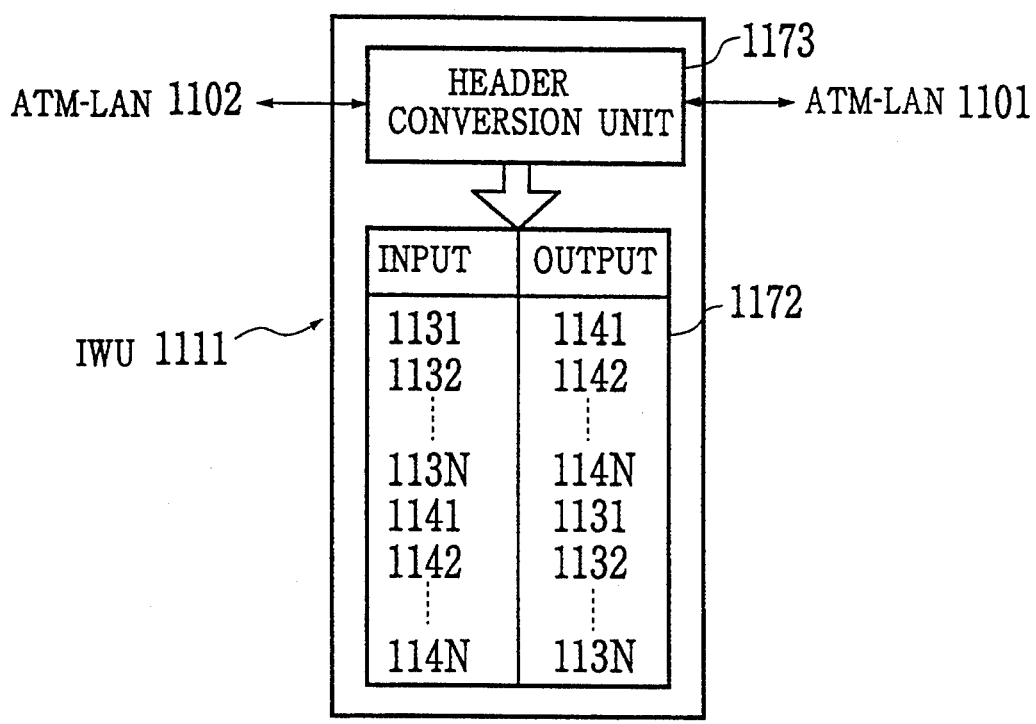
FIG. 57 is a schematic block diagram of an inter-networking unit in the network of FIG. 56.

The IWU 1111 inter-networking the first and second ATM-LANs 1101 and 1102 has a schematic configuration shown in FIG. 57 which includes a header conversion table 1172 and a header conversion unit 1173, where the header conversion table 1172 registers the relationship between the header (or the connection identifier, i.e., VCI/VPI) of the input cell from the ATM connection, and the header of the output cell to the ATM connection, while the header conversion unit 1173 converts the header of the input cell by looking up the header conversion table 172 and attaches the converted header to the output cell.

In addition, the first and second ATM-LANs 1101 and 1102 have call set up units 1113 and 1114, respectively. The call set up unit 1113 of the first ATM-LAN 1101 sets up the ATM connections 141 to 14N between the IWU 1111 and the CLSF 1112, as well as the ATM connections 161 to 16M between the CLSF 1112 and the terminals 151 to 15M belonging to the first ATM-LAN 1101, while the call set up unit 1114 of the second ATM-LAN 1102 sets up the ATM connections 131 to 13N between the IWU 1111 and the terminals 121 to 12N belonging to the second ATM-LAN 1102.

It is to be noted that the configuration shown in FIG. 56 represents a minimum unit of the communication system according to this embodiment, and a larger scale configuration can be constructed by Inter-networking a number of such minimum units through IWUs.

Now, the operation of this embodiment will be described for an exemplary case of realizing the connection-less communication from the terminal 1121 in the second ATM-LAN 1102 by using the CLSF 1112 in the first ATM-LAN 1101. In this case, the second ATM-LAN 1102 containing this terminal 1121 has no CLSF for realizing the connection-less communication itself, so that the CLSF 1112 of the first ATM-LAN 1101 is made to be also available for the terminal 1121 of the second ATM-LAN 1102 as described below.

Namely, in this case, the operation proceeds as outlined in the flow chart of FIG. 58 as follows.

First, at the step S11, in order to set up the ATM connection between the terminal 1121 and the CLSF 1112, the call set up unit 1114 sets up the first ATM connection 1131 between the terminal 1121 and the IWU 1111. Then, at the step S12, the call set up unit 1114 makes the set up request for the ATM connection between the IWU 1111 and the CLSF 1112 to the call set up unit 1113 of the first ATM-LAN 1101, as the first and second ATM-LANs 1101 and 1102 are independent networks. Then, in response to this set up request, at the step S13, the call set up 1113 sets up the ATM connection 1141 between the IWU 1111 and the CLSF 1112.

Here, the method of making the ATM connection set up request from the call set up unit 1114 to the call set up unit 1113 can be either one of: (1) providing an ATM connection 1171 between the call set up unit 1113 and the call set up unit 1114 in advance, and the set up request is made directly through this ATM connection 1171, or (2) terminating the set up request from the call set up unit 1114 once at the IWU 1111 and then relaying it to the call set up unit 1113 from the IWU 1111.

When the ATM connections 1131 and 1141 are set up in this manner, next at the step S14, the IWU 1111 connects these ATM connections 1131 and 1141 at the ATM layer. In this case, the header conversion table 1172 has registered entries such that: (a) the header of the cell arriving from the ATM connection 1131 is changed to the connection identifier (VCI/VPI) indicating the ATM connection 1141, and (b) the header of the cell arriving from the ATM connection 1141 is changed to the connection identifier (VCI/VPI) indicating the ATM connection 1131. The header conversion unit 1173 converts the header of the arriving cell by looking up this header conversion table 1172, and transmits the cell arriving from the ATM connection 1131 to the ATM connection 1141, and the cell arriving from the ATM connection 1141 to the ATM connection 1131. In this manner, the ATM connections 1131 and 1141 are connected at the ATM layer by the IWU 1111.

Next, at the step S15, the datagram transmission between the terminal 1121 and the CLSF 1112 is carried out through the ATM connections 1131 and 1141 connected at the ATM layer. In this case, using the connection between the ATM connections 1131 and 1141, the datagram transmission can be realized by simply carrying out the header conversion processing at the ATM layer in the IWU 1111, for both of the datagram to be delivered from the terminal 1121 to the CLSF 1112 as well as the ATM cell assembled datagram to be delivered from the CLSF 1112 to the terminal 1121.

Here, the flow of the cell assembled datagram between the terminal 1121 and the CLSF 1112 is as follows.

First, in a case (1) of the datagram transmission from the terminal 1121 to the CLSF 1112, (1-1): the cell assembled datagram is transmitted to the IWU 1111 from the terminal 1121 through the ATM connection 1131, (1-2): the IWU 1111 relays the cell arrived from the ATM connection 1131 to the ATM connection 1141 by looking up the header conversion table 1172, and (1-3): the CLSF 1112 receives the cell assembled datagram arriving from the ATM connection 1141.

On the contrary, in a case (2) of the datagram transmission from the CLSF 1112 to the terminal 1121, (21): the cell assembled datagram is transmitted to the IWU 1111 from the CLSF 1112 through the ATM connection 1141, (2-2): the IWU 1111 relays the cell arrived from the ATM connection 1141 to the ATM connection 1131 by looking up the header conversion table 1172, and (2-3): the terminal 1121 receives the cell assembled datagram arriving from the ATM connection 1131.

In this manner, it is possible in this embodiment to transmit the cell directly at the network layer between the terminal 1121 and the CLSF 1112. The cell transmission between the CLSF 1112 and any of the other terminals 1122 to 112N through the ATM connections 1132 to 113N and 1142 to 114N can also be realized similarly.

Next, an exemplary processing at the network layer in this embodiment will be described with reference to FIG. 59 which indicates the physical regions of the ATM communication system of FIG. 58 along with the logical regions at the network level and the logical connection states among these logical regions.

Figure 68:
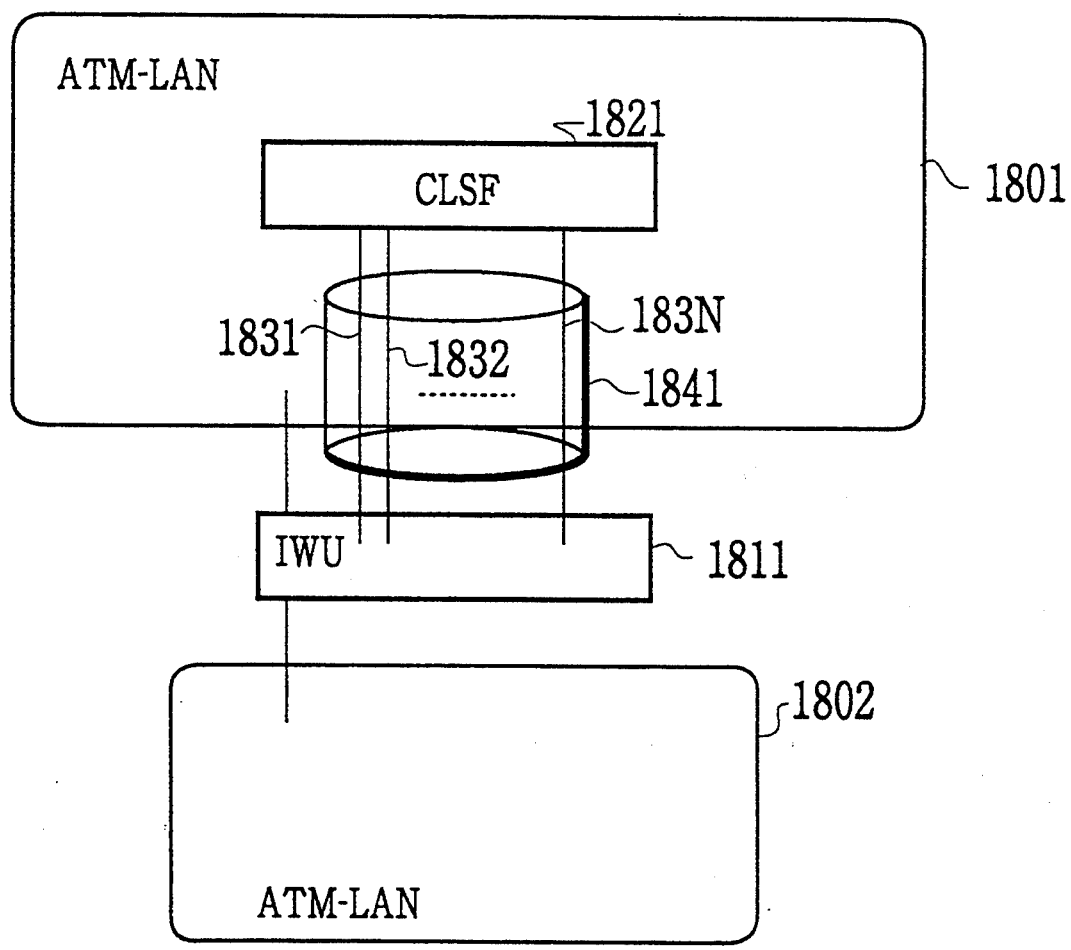
FIG. 68 is a schematic diagram of one ATM connection setting in the ATM communication system according to the present invention for another embodiment in a case of a modified network layer topology.

Here, between the terminals 1121 to 112N of the second ATM-LAN 1102 and the CLSF 1112 of the first ATM-LAN 1101, the ATM connections 1131 to 118N and 1141 to 114N are provided as in FIG. 68, such that the datagram transmission can be realized in forms of the ATM cells between the CLSF 1112 and the terminals 1121 to 112N. In addition, the ATM connections 1181 to 116M are also provided between the CLSF 1112 and the terminals 1161 to 115M of the first ATM-LAN 1101.

The CLSF 1112 has a datagram processing unit 1201 and an ATM layer processing unit 1211, and the terminals 1121 to 112N have a data processing unit 1202 and an ATM layer processing unit 1212. The datagram processing unit 1201 operates according to the network ID indicating that the CLSF 1112 belongs to the second ATM-LAN 1102 with respect to the input and output through the ATM connections 1141 to 114N, or according to the network ID indicating that the CLSF 1112 belongs to the first ATM-LAN 1101 with respect to the input and output through the ATM connections 1161 to 116M.

In this case, the datagram outputted from the datagram processing unit 1202 within the terminals 1121 to 112N is cell assembled at the ATM layer processing unit 1212 within the terminals 1121 to 112N, and reaches to the CLSF 1112 without being re-constructed into the datagram form before being cell disassembled at the ATM layer processing unit 1211 within the CLSF 1112. Similarly, the datagram outputted from the datagram processing unit 1201 within the CLSF 1112 is cell assembled at the ATM layer processing unit 1211 within the terminals 1121 to 112N, and reaches to the terminals 1121 to 112N without being re-constructed into the datagram form before being cell disassembled at the ATM layer processing unit 1212 within the terminals 121 to 112N.

In this manner, the direct delivery (i.e., the delivery without looking up the network layer data in a middle) of the datagram at the network layer between the terminals 1121 to 112N and the CLSF 1112 is supported, so that there is no need for the datagram processing unit 1202 within the terminals 1121 to 112N to recognize the fact that the CLSF 1112 is actually located in the physically separated first ATM-LAN 1101. Similarly, there is no need for the datagram processing unit 1201 within the CLSF 1112 to recognize the fact that the terminals 1121 to 112N are actually located in the physically separated second ATM-LAN 1102.

In addition, at the network layer level, the CLSF 1112 and the terminals 1121 to 112N share identical address data, while the CLSF 1112 and the terminals 151 to 15M also share identical address data.

Figure 60:
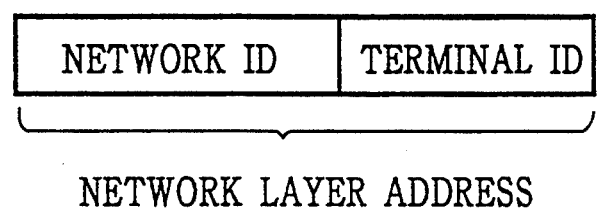
FIG. 60 is a network layer address form in the network of FIG.

Here, the network layer address is given in a form shown in FIG. 60 in which the network ID described above is multiplexed with the terminal ID indicating the specific address of each terminal. The CLSF 1112 has two sets of network IDs in correspondence to the first and second ATM-LANs 1101 and 1102, which are shared with the terminals within the respective ATM-LANs 1101 and 1102. It is noted that the order of the network ID and the terminal ID in the network layer address may be reversed from that shown in FIG. 60 if desired.

It is also noted that the scheme for providing two sets of network IDs to be CLSF 1112 with respect to the first and second ATM-LANs 1101 and 1102 is adopted in this embodiment because of the easiness of its implementation, but it is also possible to adopt the scheme in which the CLSF 1112 (i.e., the network address belonging to the first ATM-LAN 1101 which has the CLSF 1112) can be made to appear as if it is virtually belonging to the second ATM-LAN 1102 by operating the CLSF 1112 and the terminals 1121 to 112N accordingly at a time of mapping the ATM layer and executing the network layer protocol.

By setting up the network layer address in this manner, it becomes possible at the network layer to handle the CLSF 1112 within the first ATM-LAN 1101 as if it is belonging to the second ATM-LAN 1102 as well such that the terminals 1121 to 112N and the CLSF 1112 can be treated as if they are belonging to the same network. Namely, the logical region of the second ATM-LAN 1102 at the network layer includes the physical region 1221 of the second ATM-LAN 1102 as well as the ATM connections 1141 to 114N and the CLSF 1112, as indicated by the hatched area in FIG. In this case, the logical region of the first ATM-LAN 1101 at the network layer is going to be the physical region of the first ATM-LAN 1101 from which the ATM connections 1141 to 114N are excluded, so that the CLSF 1112 logically belongs to both of the first and second ATM-LANs 1101 and 1102. Here, however, it is to be noted that these logical regions are valid only for the network layer of the connection-less communication (datagram communication), and the logical regions for the ATM layer and the logical regions for the network layer of the connection oriented communication are generally different from the logical regions in the connection-less communication.

Figure 59:
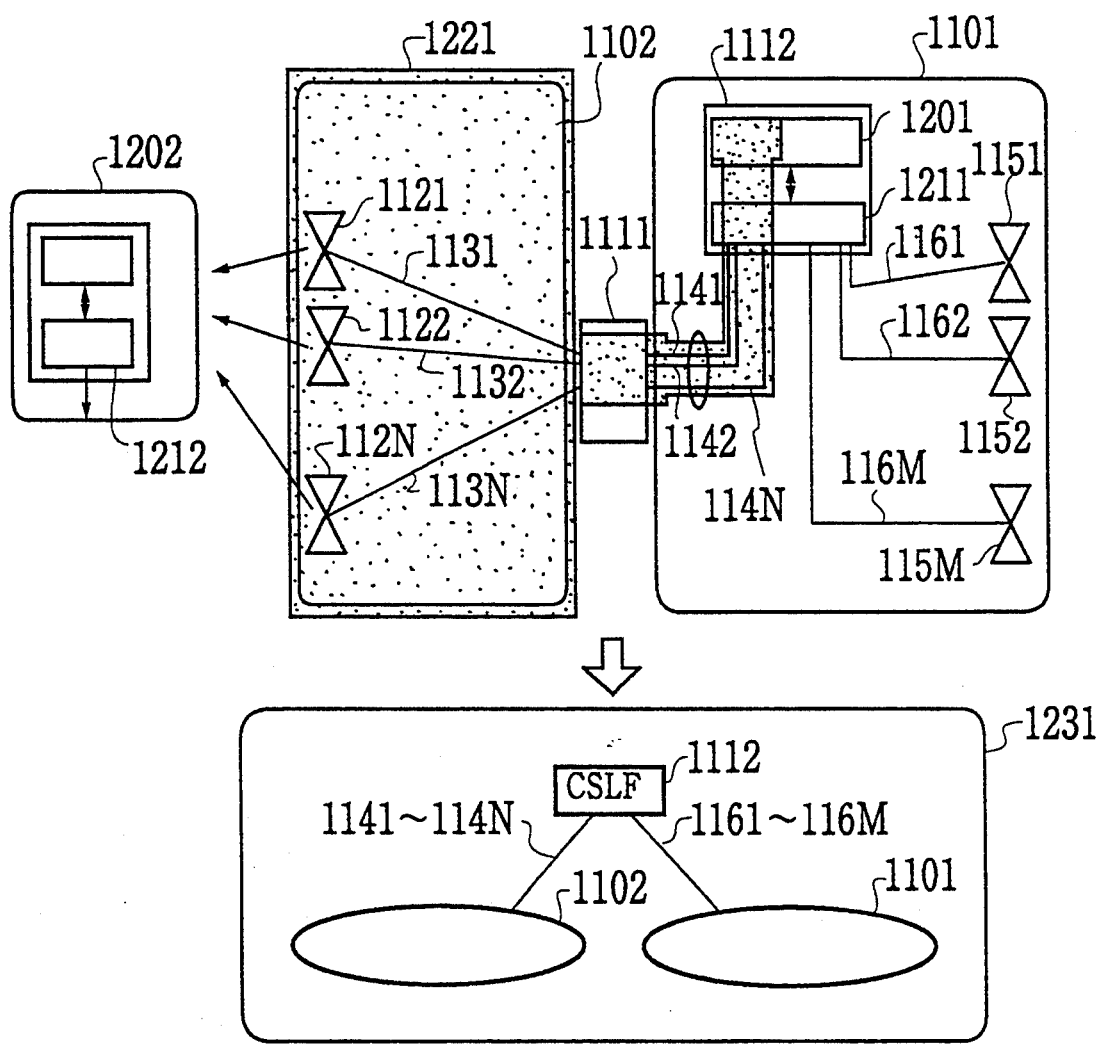
FIG. 59 is a partial schematic diagram of the network of FIG. 56 showing the logically connected region.

In this manner, for the connection-less communication, the logical regions at the network layer which is different from the physical regions of the ATM-LANs to realize the network layer topology 1231 shown in FIG. 59 in which the CLSF 1112 can be treated as a router (or a gate-way).

Therefore, when the routing protocol is executed among the CLSFs, the CLSF 1112 logically appears at the network layer as if it is located in the ATM-LAN which physically contains no CLSF. Consequently, even when the already existing routing protocol is executed as it is, the route selected by the routing protocol and the route passing through the CLSF 1112 coincides, so that the consistent connection-less communication can be realized. In this case, it suffices for the IWU 1111 to pass the routing data for the connection-less communication, so that the IWU 1111 can be totally free from the routing in the connection-less communication.

Figure 61:
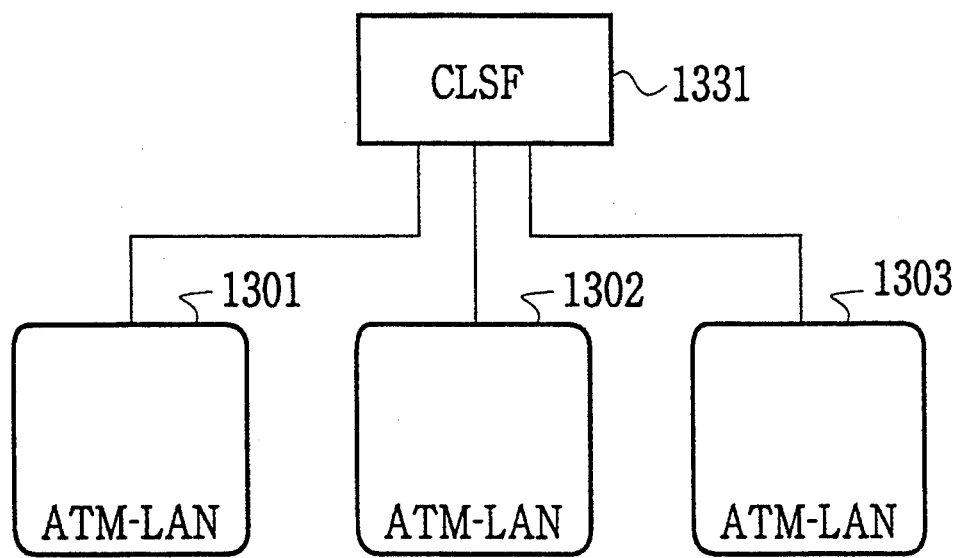
FIG. 61 is a schematic network diagram of another network configuration in the ATM communication system according to the present invention in a case of a modified network layer topology.

FIG. 61 shows another network topology which can be handled in the manner similar to that described above. In this FIG. 61, three ATM-LANs 1301 to 1303 are inter-networking through IWUs (not shown) with the CLSF 1331, where the CLSF 1331 physically belongs to the ATM-LAN 1301. In this case, by setting up the network layer address in the manner similar to that described above, it becomes possible to make the CLSF 1331 to appear as if it is also logically belonging to the ATM-LANs 1302 and 1303. Consequently, it becomes possible to realize the logical network layer topology in which the ATM-LANs 1301 to 1303 are inter-networking with the CLSF 1331 as a router (or a gate-way).

Figure 62:
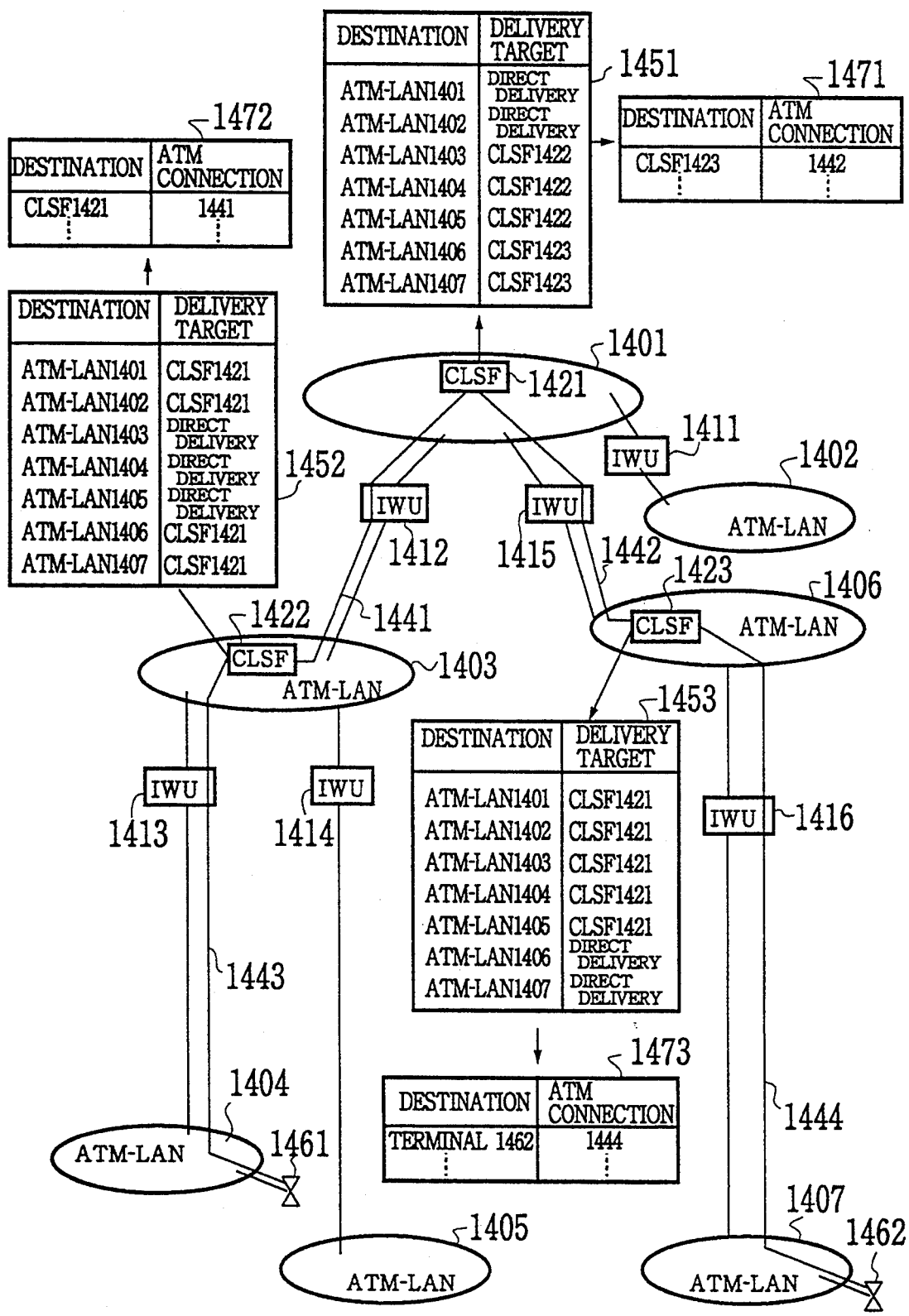
FIG. 62 is a schematic network diagram of the ATM communication system according to the present invention for an execution of a routing protocol in a case of a modified network layer topology.
Figure 63:
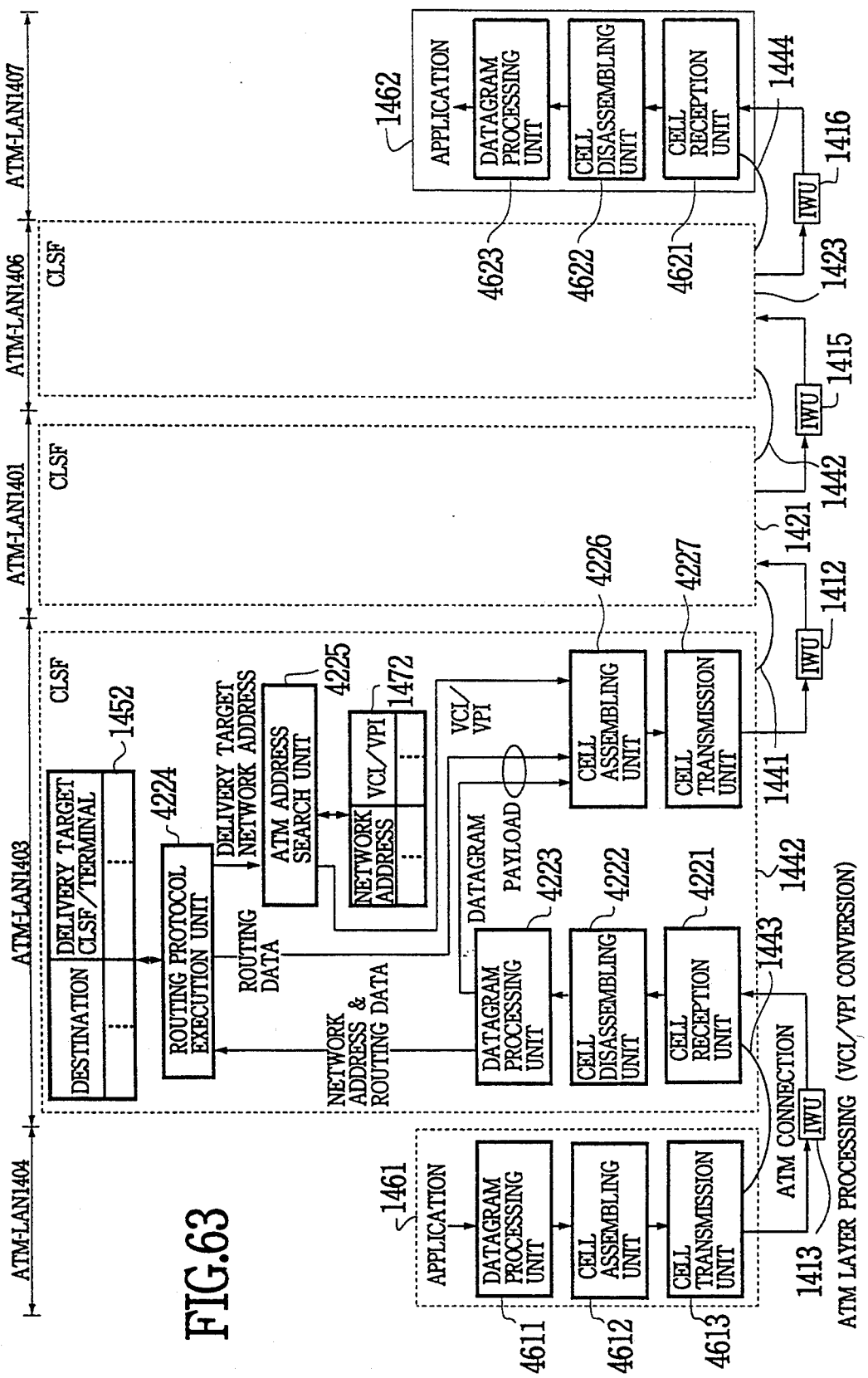
FIG. 63 is a flow diagram for the execution of the routing protocol shown in FIG. 62.

Now, the manner of executing the routing protocol among the CLSFs in more general case of this embodiment will be described with references to FIGS. 62 and 63. Here, the network configuration of FIG. 55 is expanded such that seven ATM-LANs 1401 to 1407 are inter-networking through six IWUs 1411 to 1416 as shown in FIG. 62, where only the ATM-LANs 1401, 1403, and 1406 contain the CLSFs 1421 to 1423, respectively, while the other ATM-LANs 1402, 1404, 1405, and 1407 have no CLSF physically. Here, however, by setting the network layer addresses as in the above, at the network layer level, the CLSF 1421 logically belongs to the ATM-LAN 1402, the CLSF 1422 logically belongs to the ATM-LAN 1404 and 1405, and the CLSF 1423 logically belongs to the ATM-LAN 1407.

In this case, the ATM connection 1441 is set up between the CLSFs 1421 and 1422, while the IWU 1412 which is inter-networking the ATM-LANs 1401 and 1403 has a function for passing the data as it is with respect to the data transmission including that of the routing data between the CLSFs 1421 and 1422.

Similarly, the ATM connection 1442 is set up between the CLSFs 1421 and 1423, while the IWU 1415 which is inter-networking the ATM-LANs 1401 and 1406 has a function for passing the data as it is with respect to the data transmission including that of the routing data between the CLSFs 1421 and 1423.

Here, a scheme for setting up the ATM connections 1441 and 1442 can be either one of a scheme for setting up one ATM connection for the transmission of the datagram as well as the control data such as the routing data between the CLSFs, or a scheme for setting up different ATM connections for the datagram transmission and the transmission of the control data such as the routing data between the CLSFs.

As a concrete example, a case of executing the routing protocol called RIP (Routing Information Protocol) which has been conventionally used in the internet, in the configuration of FIG. 63 will be described. This RIP is a routing protocol of a vector distance type in which the routing is controlled to minimize the number of routes to be used according to a hop number for the routers to be passed in the middle. In this embodiment, the CLSF can be logically treated as a router as described above, so that this RIP can be executed to carry out the active operation (i.e., the operation to notify the routing data to the other routers) by each CLSF.

Namely, the CLSF 1422 notifies the CLSF 1421 that "ATM-LANs 1403, 1404, and 1405 can be reached by one hop" as the ATM-LANs 1403, 1404, and 1405 are the networks to which the CLSF 1422 can deliver the datagram directly. The CLSF 1423 similarly notifies the CLSF 1421 that "ATM-LANs 1406 and 1407 can be reached by one hop" as the ATM-LANs 1406 and 1407 are the networks to which the CLSF 1423 can deliver the datagram directly. Also, the CLSF 1421 notifies the CLSFs 1422 and 1423 that "ATM-LANs 1401 and 1402 can be reached by one hop" as the ATM-LANs 1401 and 1402 are the networks to which the CLSF 1421 can deliver the datagram directly.

In addition, when the routine data from the CLSFs 1422 and 1423 have reached to the CLSF 1421 at this point, the CLSF 1421 notifies the CLSFs 1422 and 1423 that "ATM-LANs 1403 to 1407 can be reached by two hops" by adding one hop to the routing data reached from the CLSFs 1422 and 1423.

Here, the CLSFs 1421 to 1423 have associated routing tables 1451 to 1453 which Indicate the correspondence relationship between the datagram destination and the delivering target ATM-LAN (transmission target) in a case of operating the RIP at the CLSFs 1421 to 1423. Thus, each of the CLSFs 1421 to 1423 calculates the route from the received routing data and selects the shortest route in order to determine the delivering target for the datagram. In the routing tables 1451 to 1451 to 1453, the entry with "direct delivery" registered as the delivery target indicates the network which can be reached by 0 hop.

For example, in a case of the CLSF 1421, the routing table 1451 is constructed according to the routing data indicating that: (1) the ATM-LANs 1401 and 1402 can be delivered directly by itself, (2) the ATM-LANs 1403, 1404, and 1405 can be reached by one hop from the CLSF 1422, and (3) the ATM-LANs 1406 and 1407 can be reached by one hop from the CLSF 1423.

For example, in a case of the CLSF 1422, the routing table 1452 is constructed according to the routing data indicating that: (1) the ATM-LANs 1403, 1404, and 1405 can be delivered directly by itself, (2) the ATM-LANs 1401 and 1402 can be reached by one hop from the CLSF 1421, and (3) the ATM-LANs 1403, 1404, 1405, 1406, and 1407 can be reached by two hops from the CLSF 1421. Here, for the ATM-LANs 1403, 1404, and 1405, the directly delivering route is going to be the shortest route, so that the directly delivering route is registered in the routing table 1452.

For example, in a case of the CLSF 1423, the routing table 1453 is constructed according to the routing data indicating that: (1) the ATM-LANs 1406 and 1407 can be delivered directly by itself, (2) the ATM-LANs 1401 and 1402 can be reached by one hop from the CLSF 1421, and (3) the ATM-LANs 1403, 1404, 1405, 1406, and 1407 can be reached by two hops from the CLSF 1421. Here, for the ATM-LANs 1406 and 1407, the directly delivering route is going to be the shortest route, so that the directly delivering route is registered in the routing table 1453.

The procedure for carrying out the connection-less communication over the ATM-LANs using these routing tables 1451 to 1453 will be described with reference to FIG. 63, for an exemplary case of the datagram transmission from the terminal 1461 belonging to the ATM-LAN 1404 to the terminal 1462 belonging to the ATM-LAN 1407. In this case, by the call set up units provided in the networks, the ATM connection 1443 between the terminal 1461 and the CLSF 1422 and the ATM connection 1444 between the terminal 1462 and the CLSF 1423 are set up in advance in the manner described above.

At the terminal 1461, the data from the application is processed to obtain the datagram to be transmitted to the terminal 1462 at the datagram processing unit 4611, and the cell is assembled from the datagram at the cell assembling unit 4612, and the assembled cell is outputted from the cell transmission unit 4613. The cell outputted from the terminal 1461 then reaches to the CLSF 1422 through the ATM connection 1443.

At the CLSF 1422, the arrived cell is received at the cell reception unit 4221, and the cell is disassembled at the cell disassembling unit 4222, and the datagram is reproduced at the datagram processing unit 4228, and then the network ID of the transmission target liven in a form shown in FIG. 60 is transmitted to the routing protocol execution unit 4224. At the routing protocol execution unit 4224, according to this network ID, it can be recognized that the terminal 1462 belongs to the ATM-LAN 1407, so that the routing table 1452 is looked up to determine the delivery target as the CLSF 1421. Then, the ATM address search unit 4225 looks up the ATM address table 1472 according to the network ID of the CLSF 1421 to obtain the VCI/VPI value appropriate for the datagram transmission to the CLSF 1421, and transmits the obtained VCI/VPI value to the cell assembling unit 4226. The cell assembling unit 4226 then assembles the cell from the payload including the datagram transmitted from the datagram processing unit 4223 according to the routing data supplied from the routing protocol execution unit 4224 and the VCI/VPI value supplied from the ATM address search unit 4225, and the assembled cell is outputted from the cell transmission unit 4227.

The cell outputted from the CLSF 1422 is then transmitted to the CLSF 1421 through the ATM connection 1441 and the IWU 1412 provided between the CLSFs 1421 and 1422. The IWU 1412 only applies the ATM layer processing (which is the processing requiring no cell re-assembling) to the cell from the CLSF 1422 and pass it to the CLSF 1421.

At the CLSF 1421, the processing similar to that carried out at the CLSF 1422 is carried out, and the routing table 1451 is looked up to determine the delivery target as the CLSF 1423. Then, the cell is assembled by obtaining the appropriate VCI/VPI value from the ATM address table 1471, and the assembled cell is outputted to the CLSF 1423. The cell outputted from the CLSF 1421 is then transmitted to the CLSF 1423 through the ATM connection 1442 and the IWU 1415 provided between the CLSFs 1421 and 1423.

At the CLSF 1423, the processing similar to that carried out at the CLSF 1421 is carried out, and the routing table 1453 is looked up to recognize that the delivery target can be delivered directly (as the CLSF 1423 itself is registered as the delivery target by the RIP), i.e., the destination is the terminal 1462 which is directly connected by the ATM connection from the CLSF 1423. Then, by looking up the ATM address table 1473, the ATM connection 1444 is registered in correspondence to the terminal 1462, so that the CLSF 1423 outputs the cell assembled from the datagram to the terminal 1462 through the ATM connection 1444. The cell outputted from the CLSF 1423 is then transmitted to the terminal 1462 through the ATM connection 1444 and the IWU 1416 provided between the CLSF 1423 and the terminal 1482.

At the terminal 1462, the cell arriving through the ATM connection 1444 is received at the cell reception unit 4621, the cell is disassembled at the cell disassembling unit 4622, and the datagram is reconstructed at the datagram processing unit 4623, and the re-constructed datagram is transmitted to the application.

In this manner, the datagram transmission over the ATM-LANs using the routing protocol can be realized. Here, as for the routing protocol which is operated among the CLSFs, the the routing data is cell assembled by the routing protocol execution unit within the CLSF, while also supplied to the other CLSFs connected though the ATM connections, and the CLSF which received the routing data re-constructs the datagram at the datagram processing unit within the CLSF, and transmits the routing data to the routing protocol execution unit.

It is to be noted that the datagram transmission in the single direction of the terminal 1461 → CLSF 1422 → CLSF 1421 → CLSF 1423 → terminal 1462 has been described above as an example, but this embodiment is equally valid for the datagram transmission in the opposite direction as well in the substantially similar manner.

Figure 64:
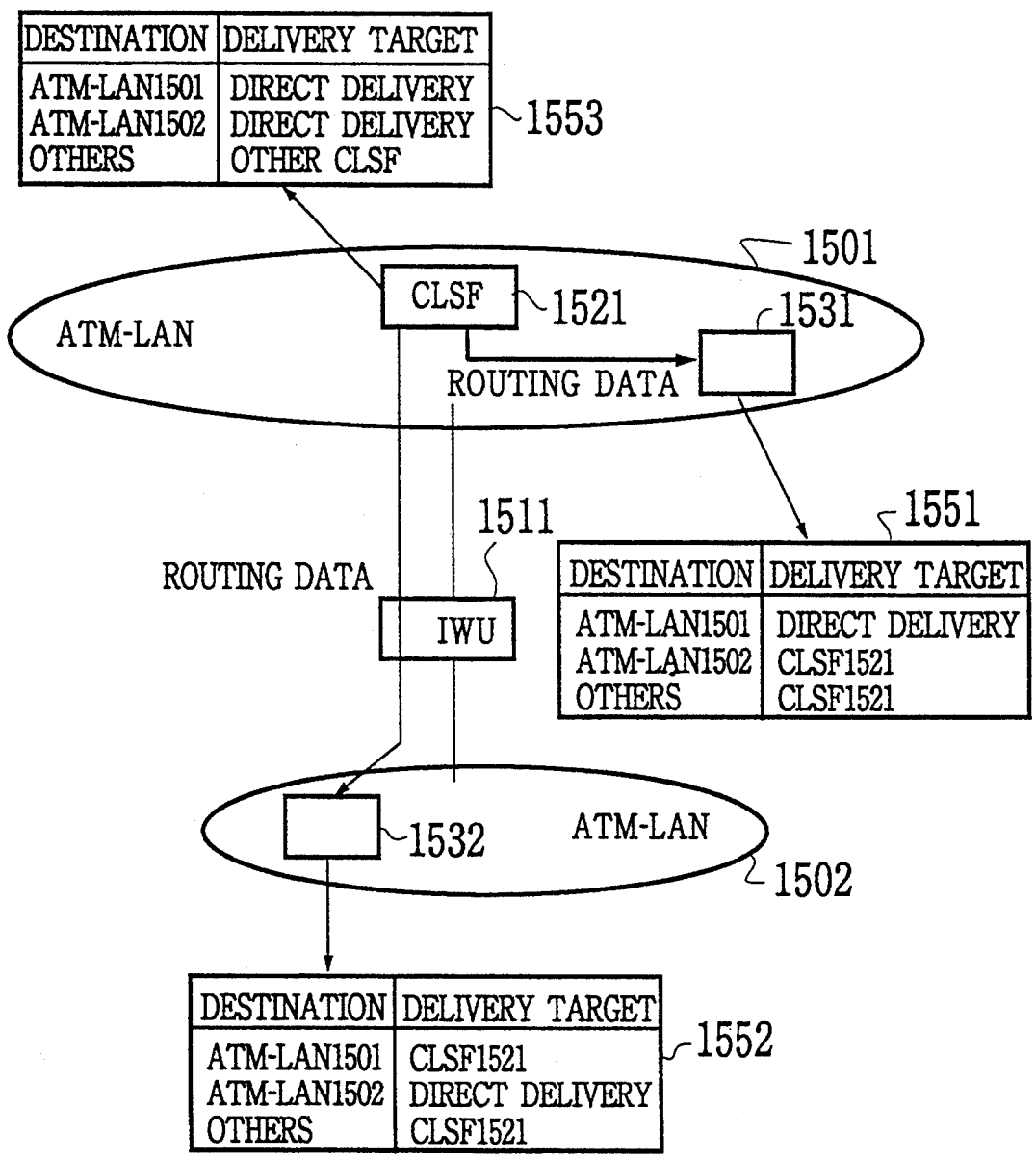
FIG. 64 is a schematic network diagram of the ATM communication system according to the present invention for a transmission of a routing data in a case of a modified network layer topology.

Next, a scheme for transmitting the routing data from the CLSF to the ATM-LAN in which the CLSF is absent will be described with reference to FIG. 64, the ATM-LANs 1501 and 1502 are inter-networking through the IWU 1511, where the ATM-LAN 1501 has the CLSF 1521 while the ATM-LAN 1502 has no CLSF. Here, the CLSF 1521 is logically connected with the ATM-LAN 1502 as in the above such that the CLSF 1521 can appear to be logically present in the ATM-LAN 1502 as well. Although not shown in FIG. 64, the ATM-LANs 1501 and 1502 are also connected with the other ATM-LANs through the IWUs, and the CLSF 1521 is executing the routing protocol.

The CLSF 1521 transmits the routing data to the device 1531 which requires the routing data within the ATM-LAN 1501 in which the CLSF 1521 is contained as well as to the device 1532 which requires the routing data within the ATM-LAN 1502 which logically belongs to the same network as the ATM-LAN 1501. Here, the devices 1531 and 1532 which require the routing data can be any of the datagram terminals, the address resolution server (ARS) for setting a correspondence between the network ID and the VCI/VPI, and the IWU.

In this case, the routing data to the device 531 can be delivered from the CLSF 1521 as it is within the ATM-LAN 1501 as this device 1531 is located within the ATM-LAN 1501 in which the CLSF 1521 is also located.

On the other hand, in order to deliver the routing data from the CLSF 1521 to the ATM-LAN 1502, it suffices for the IWU 1511 provided between the CLSF 1521 and the ATM-LAN 1502 to pass the routing data transmitted from the CLSF 1521 to the device 532 as it is, because there is no need to process the routing data as the CLSF 1521 also belongs to the ATM-LAN 1502 at the network layer. To this end, there is a need for the CLSF 1521 and the device 1532 to be connected at the ATM layer even when the IWU 151 is located therebetween. This can be achieved by using the ATM connection for the logical connection as in the above, or by setting up the separate ATM connection for the routing data transmission.

As an example, a case of using the RIP described above will be described. In this case, as shown in FIG. 64, the CLSF 1521 has the routing table 1541, and the devices 1531 and 1532 which require the routing data are executing the RIP to make the passive operation (i.e., the operation in which the routing data As received and processed, but not transmitted to the others). In this case, according to the routing data received from the CLSF 1521, the device 1631 within the ATM-LAN 1501 can construct the rouging table 1551, while the device 1532 within the ATM-LAN 1502 can construct the routing table 1552.

When these routing tables 1551 and 1552 are constructed, they can function as means for selecting the direct datagram transmission without passing through CLSF when the destination terminal is located within the same ATM-LAN.

Here, the datagram cell processing time at the IWU 1511 at a time of executing the RIP is sufficiently short compared with the time required for the datagram re-construction and the cell assembling at the CLSF 1521, so that it is possible to disregard the passing through the IWU 1411 from the hop count.

Figure 65:
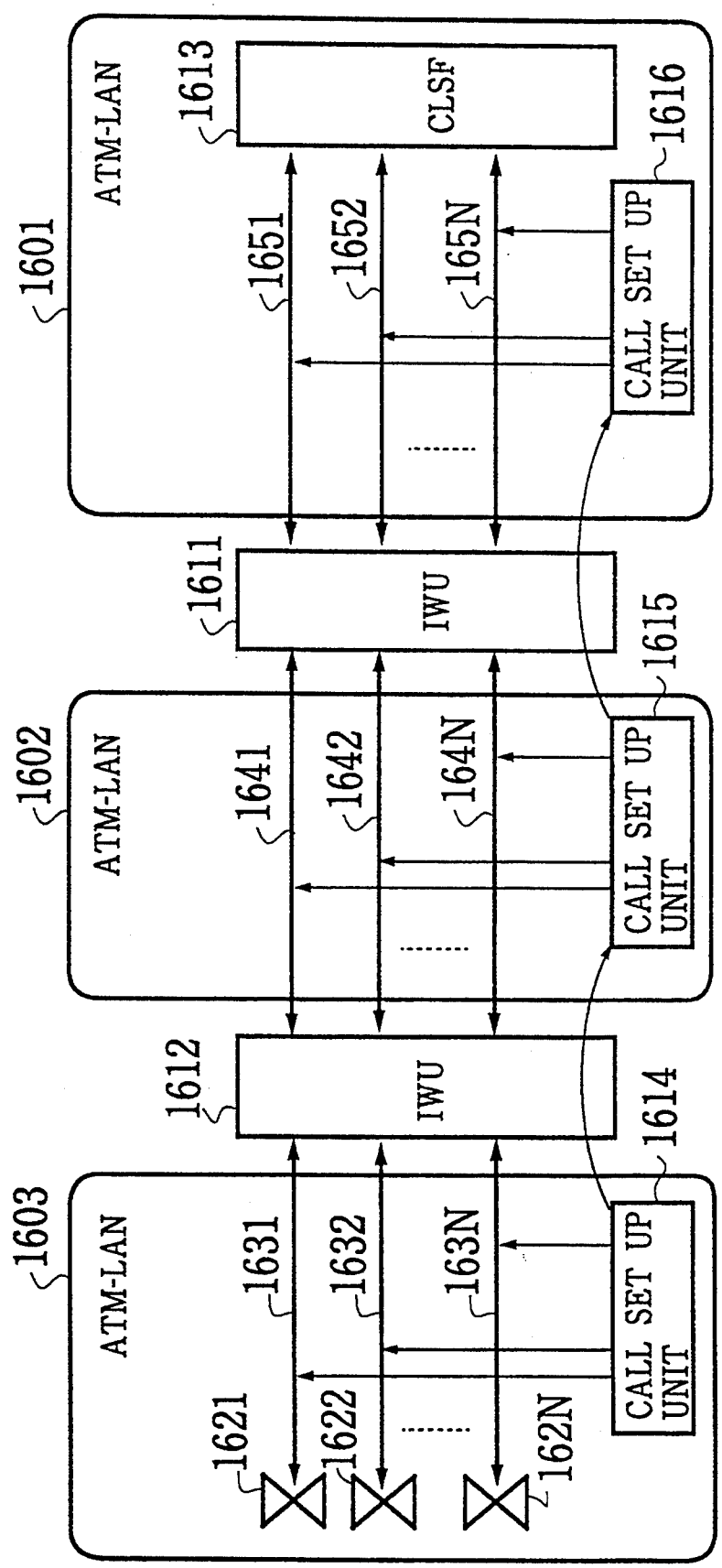
FIG. 65 is a schematic network diagram of another configuration of the ATM communication system according to the present invention for one embodiment in a case of a modified network layer topology.
Figure 66:
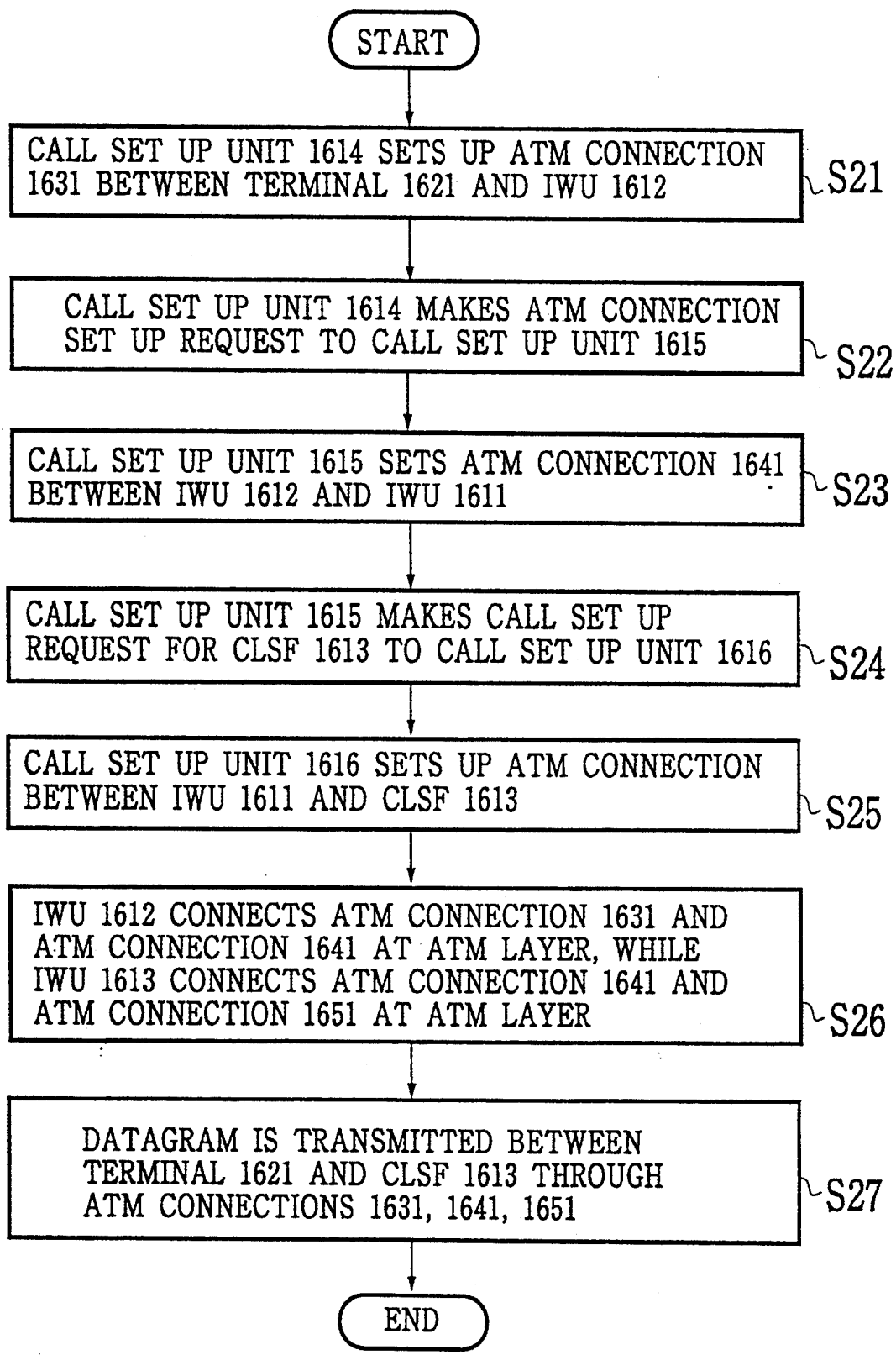
FIG. 66 is a flow chart for an operation in the network of FIG. 65.

Now, FIG. 65 shows another configuration of the ATM communication system in this embodiment, which comprises: a first ATM-LAN 1601 containing N terminals 1631 to 163N, a second ATM-LAN 1602 containing N terminals 1641 to 164N, and a third ATM-LAN 1603 containing N terminals 1651 165N, where the first and second ATM-LANs 1601 and 1602 are Inter-networking through an IWU 1611, and the second and this ATM-LANs 1602 and 1603 are Inter-networking through an IWU 1612. Here, the first ATM-LAN 1601 has a CLSF 1613 for carrying out the processing for realizing the connection-less communication, whereas the second and third ATM-LANs 1602 and 1603 have no CLSF.

In addition, the ATM-LANs 1601, 1602, and 1603 have call set up units 1616, 1615, and 1614. respectively. The call set up unit 1113 of the first ATM-LAN 1101 sets up the ATM connections 141 to 14N between the IWU 1111 and the CLSF 1112, as well as the ATM connections 161 to 16M between the CLSF 1112 and the terminals 151 to belonging to the first ATM-LAN 1101, while the call set up unit 1114 of the second ATM-LAN 1102 sets up the ATM connections 131 to 13N between the IWU 1111 and the terminals 121 to 12N belonging to the second ATM-LAN 1102.

The CLSF 1613 of the first ATM-LAN 1601 not only supports the datagram transmission among the terminals (not shown) of the first ATM-LAN 1601, but also the datagram transmission among the terminals among the terminals (not shown) of the second ATM-LAN 1602 and the datagram transmission among the terminals among the terminals 1621 to 162N as well, and to this end, at the network layer, the CLSF 1112 is given not only the first network ID indicating that it belongs to the first ATM-LAN 1601 in which it is physically located, as well as the second and third network IDs indicating that it also belongs to the second and third ATM-LANs 1602 and 1603. In this manner, the CLSF 1613 can be made to appear as if it is in the second ATM-LAN 1602 or the third ATM-LAN 1603.

In this case, the connection-less communication (datagram transmission) between the CLSF 1613 and the terminals 1621 to 162N in the ATM-LAN 1603 requires the passing through two IWUs 1611 and 1612. This operation will now be described.

Here, as described above, the ATM-LAN 1603 has no CLSF, so that it is necessary to make the CLSF 1613 in the ATM-LAN 1601 to be available to the terminals in the ATM-LAN 1603. In the following, an exemplary case of the datagram transmission from the terminal 1621 in the ATM-LAN 1603 will be described.

In this case, the operation proceeds according to the flow chart of FIG. 68 as follows.

First, at the step S21, in order to set up the ATM connection between the terminal 1621 and the CLSF 1613, the call set up unit 1614 sets up the ATM connection 1631 between the terminal 621 and the IWU 1612. Then, at the step S22, the call set up unit 1614 makes the ATM connection set up request to the call set up unit 1615 in the ATM-LAN 1602 which is the independent network from the ATM-LAN 1603 to which the call set up unit 1614 belongs.

Here, however, the ATM-LAN 1602 also has no CLSF, so that the call set up request unit 1615 which received the ATM connection set up request from the call set up unit 1614 sets up the ATM connection 1641 between the IWU 1612 and the IWU 1611 at the step S23, and makes the call set up request for the CLSF 1613 to the call set up unit 1616 in the neighboring ATM-LAN 1601 at the step S24. Then, the call set up unit 1616 sets up the ATM connection 1651 between the IWU 1611 and the CLSF 1613 in response to the received call set up request at the step S25.

When the ATM connections 1631, 1641, and 1651 are set up in this manner, next at the step S26, the IWU 1612 connects the ATM connections 1631 and 1641 at the ATM layer, while the IWU 1611 connects the ATM connections 1641 and the 1651 at the ATM layer in the same manner as in the above.

Then, at the step S27, the datagram transmission between the terminal 1621 and the CLSF 1613 is carried out through the ATM connections 1631, 1641, and 1651 connected at the ATM layer in terms of the ATM cells.

The similar procedure can also be followed for the other terminals 1622 to 162N, to set up the ATM connections 1632 to 163N 1642 to 164N, and 1652 to 165N, connect the ATM connections 1632 to 163N and the ATM connections 1642 to 164N at the IWU 1612, connect the ATM connections 1642 to 164N and the ATM connections 1652 to 165N at the IWU 1611, and carry out the datagram transmissions in terms of the ATM cells between the terminals 1622 to 162N to the CLSF 1613.

By setting up the ATM connections in this manner, it becomes possible to carry out the direct datagram delivery at the network layer between the terminals 1621 to 162N and the CLSF 1613.

Thus, by setting the ATM connections between the terminals 1621 to 162N and the CLSF 1613, and assigning the network ID for the ATM-LAN 1603 to the CLSF 1613 as well, it becomes possible to realize the connection-less communication between the ATM-LANs which are logically connected over more than one IWUs.

Next, another embodiment in which the above described ATM communication system according to the present invention is applied for a case of realizing a modified network layer topology Independent from the topology of the physical network will be described in detail.

Figure 67:
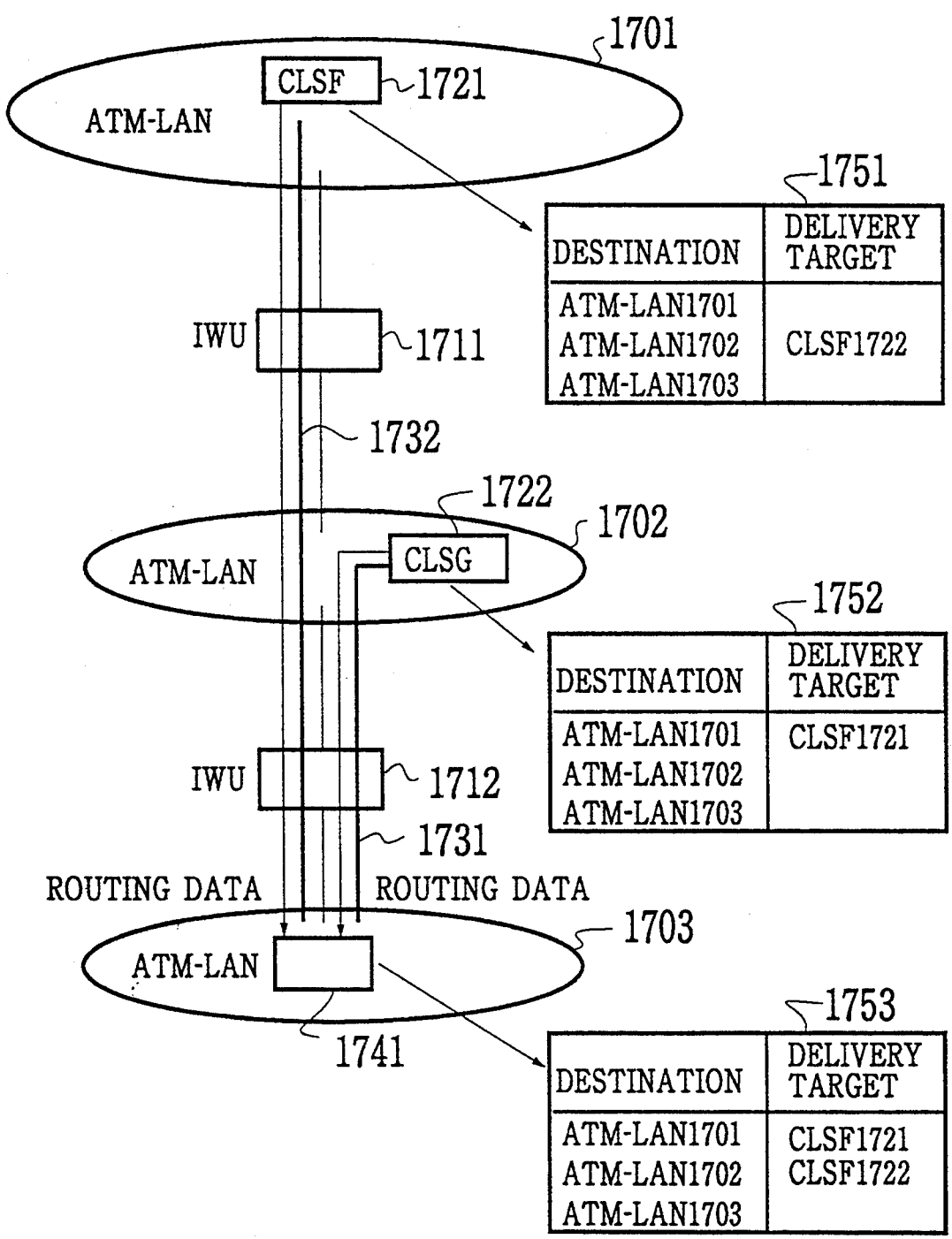
FIG. 67 is a schematic network diagram of the ATM communication system according to the present invention for another embodiment in a case of a modified network layer topology.

FIG. 67 shows a configuration of the ATM communication system in this embodiment, which comprises: first, second, and third ATM-LANs 1701, 1702, and 1703, where the first and second ATM-LANs 1701 and 1702 are inter-networking through an IWU 1711 while the second and third ATM-LANs 1702 and 1703 are Inter-networking through an IWU 1712. Here, the first and second ATM-LANs 1701 and 1702 have CLSFs 1721 and 1722, respectively, whereas the third ATM-LAN 1703 has no CLSF.

The third ATM-LAN 1703 is logically connected with the CLSF 1722 in the second ATM-LAN 1702 as indicated by a logical connection 1731 in the same manner as in the above. Moreover, the third ATM-LAN 1703 is also logically connected with the CLSF 1721 in the first ATM-LAN 1701 which is separated by more than one hops in terms of the number of the IWUs as Indicated by a logical connection 1732 tunnelling through the IWUs 1711 and 1712, as in the case of FIG. 65 described above. Thus, the third ATM-LAN 703 logically has two CLSFs.

In this state, a case of executing the RIP described above between the CLSFs 1721 and 1722 will now be described.

The CLSF 1721 has the ATM-LANs 1701 and 1703 as the networks to which it can make the direct delivery, so that it notifies the CLSF 1722 that "ATM-LANs 1701 and 1703 can be reached by one hop". The CLSF 1722 has the ATM-LANs 1702 and 1703 as the networks to which it can make the direct delivery, so that it notifies the CLSF 1721 that "ATM-LANs 1702 and 1703 can be reached by one hop".

By this data exchange, the routing table 1751 is constructed at the CLSF 1721 and the routing table 1752 is constructed at the CLSF 1722. In addition, the ATM-LAN 1703 eventually receives the routing data indicating that "ATM-LAN 1701 can be reached by one hop" and "ATM-LAN 1702 can be reached by two hops from the CLSF 1721, as well as the routing data indicating that "ATM-LAN 1701 can be reached by two hops and ATM-LAN 1702 can be reached by one hop" from the CLSF 1722. Then, the device 1741 in the ATM-LAN 1703 which is making the passive operation can construct the routing table 1753 indicating that "the datagram destined to the ATM-LAN 1701 should be transmitted to the CLSF 1721" and "the datagram destined to the ATM-LAN 1702 should be transmitted to the CLSF 1722" according to these routing data received by the ATM-LAN 1703.

As for the other ATM-LANs 1701 and 1702, each of them has only one CLSF connected, so that there is no choice of the CLSFs available. However, each of them can be modified to provide the choice of the CLSFs similarly to the ATM-LAN 1703 by providing the logical connection between the ATM-LAN 1702 and the CLSF 1721 or the logical connection between the ATM-LAN 1701 and the CLSF 1722, if desired.

Now, a scheme for setting up the ATM connection between the IWU and the CLSF in this embodiment will be described with reference to FIG. 68. In this case, the ATM-LANs 1801 and 1802 are inter-networking through the IWU 1811, and the ATM-LAN 1801 contains the CLSF 1821, while the ATM-LAN 1802 is logically connected with the CLSF 1821 in the ATM-LAN 1801 as in the above.

Between the CLSF-1821 and the IWU 1811, as many ATM connections (which define VCs) 1631 to 183N as a number N of terminals belonging to the ATM-LAN 1802 are set up. By bundling these VCs 1631 to 183N together as one VP 1841, it becomes possible for the ATM-LAN 1801 to realize the cell transmission between the CLSF 1821 and the IWU 1811 by only looking up the 8 bits VPI indicating the VP 1841, without looking up the 16 bits VCI.

In addition, by directly connecting each connection of the VCs 1631 to 183N in the VP 1841 with the already established ATM connection (not shown) between the IWU 1811 and the terminal in the ATM-LAN 1802 at the ATM layer by the IWU 1811, the cell transmission from the terminal in the ATM-LAN 1802 to the CLSF 1821 can be realized as the IWU 1811 carries out the relaying of the cell from the ATM connection 1851 to the ATM connection given by one of the VCs 1631 to 183N in the VP 1841. In addition, for the cells transmitted from the CLSF 1821 to the terminal in the ATM-LAN 1802, the IWU 1811 also carries out the relaying of the cell for the ATM connection between the IWU 1811 and the terminal in the ATM-LAN 1802 by looking up the VCI field, to realize the cell transmission between the CLSF 1821 and the terminal in the ATM-LAN 1802 in a case of using the bundling of the VCs 1631 to 183N into the VP 841.

Figure 69:
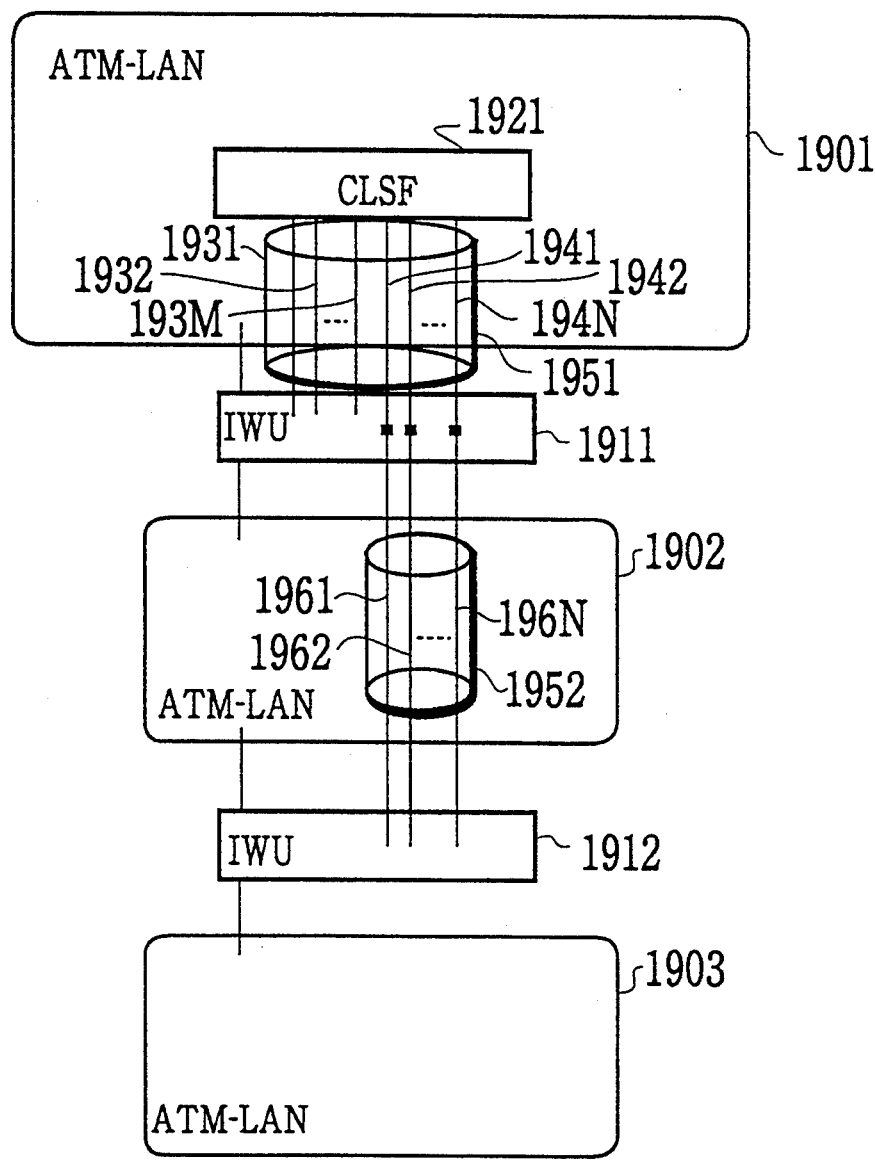
FIG. 69 is a schematic diagram of another ATM connection setting in the ATM communication system according to the present invention for another embodiment in a case of a modified network layer topology.

Next, a scheme for setting up the ATM connection between the IWU and the CLSF in this embodiment in a case of involving the connection between the ATM-LANs which are separated by more than one hops in terms of the number of IWUs will be described with reference to FIG. 69. In this case, the ATM-LANs 1901, 1902, and 1903 are provided, where the ATM-LANs 1901 and 1902 are inter-networking through the IWU 1911 while the ATM-LANs 1902 and 1903 are inter-networking through the IWU 1912, and the ATM-LAN 1901 contains the CLSF 1921, while the ATM-LANs 1902 and 1903 are logically connected with the CLSF 1921 in the ATM-LAN 1901 as in the above.

Between the CLSF 1921 and the IWU 1911, as many ATM connections which define VCs 1931 to 193M as a number M of terminals belonging to the ATM-LAN 1902 are set up, alone with as many ATM connections which define VCs 1941 to 194N as a number N of terminals belonging to the ATM-LAN 1903.

By bundling these VCs 1931 to 193M and 1941 to 194N together as one VP 1941, it becomes possible for the ATM-LAN 1901 to exchange the datagrams destined to the ATM-LANs 1902 and 1908 which are outputted from the CLSF 1921 to the IWU 1911 and the datagrams from the terminals in the ATM-LANs 1902 and 1903 by the 8 bits VPI indicating the VP 1951.

In addition, the terminals in the ATM-LAN 1902 and the VCs 1931 to 193M bundled into the VP 1951 set up between the the IWU 1911 and the CLSF 1921, as well as the VCs 1961 and 196N set up between the IWUs 1911 and 1912 and the VCs 1941 to 194N bundled into the VP 1951 are directly connected at the ATM layer by the IWU 1911. For this reason, for the VP 1951, the IWU 1911 sets whether it is the tunnelling to the IWU 1912 or the delivery to the ATM-LAN 1902, according to the VCI values of those which have arrived from the CLSF 1921. Also, for those which have arrived from the terminals in the ATM-LAN 1902, the IWU 1911 is set to carry out the relaying of the cells to the connection (not shown) between the terminals in the ATM-LAN 1902 and the IWU 1911 and the ATM connections indicated by the VP 1951 and the VCs 1931 to 193M, and for those which have arrived from the IWU 1912, the IWU 1911 is set to carry out the relaying of the cells to the VP 1951 and the VCs 1941 to 194N.

By these settings, in a case of involving the connection of the ATM-LANs which are separated by more than one hops in terms of the number of IWUs, the ATM connections between the CLSF 1921 and the IWU 1911 can be bundled together.

Similarly, in the ATM-LAN 1902, for those which are to be tunnelled to the IWU 1912 among the above described VCs, by bundling the VCs 1981 to 198N in the ATM-LAN 1902 into one VP 1952, they can be exchanged with the IWU 1912 by only looking up the 8 bits VPI indicating the VP 1952.

Next, a method for judging whether it is the tunnelling to the IWU 1912 or the delivery to the terminals in the ATM-LAN 1902 will be described.

Figure 70:
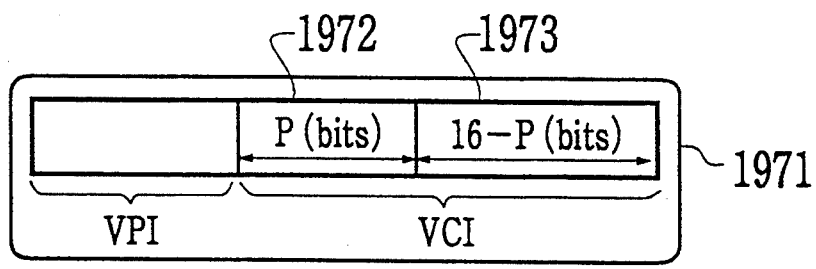
FIG. 70 is a cell header form in the network of FIG. 69.

Namely, in an exemplary case of the cell header 1971 shown in FIG. 70, the VPI indicates the route IWU 1911 → CLSF 1921 or the route CLSF 1921 → IWU 1911. Here, these routes may be indicates by the same VPI value or by the different VPI values.

The upper P bits 1972 of the VCI indicating the VCs 1931 to 193M and the VCs 1941 to 194N between the IWU 1911 and the CLSF 1921 are used as the network identification, and set up such that it is possible to judge whether it is the delivery to the terminals in the ATM-LAN 1902 or the tunnelling to the IWU 1912 according to the value of these VCI upper P bits 1972 at the IWU 1911. In a case of the delivery to the ATM-LAN 1902, they are converted into the VCI/VPI between the IWU 1911 and the terminals in the ATM-LAN 1902 by the VCI lower (16-P) bits 1973 and the cell is outputted to the terminals. Namely, the transmission target terminal is identified according to the VCI lower (16-P) bits 1973. In a case of the tunnelling to the IWU 1912, the cell is outputted to the VP for the tunnelling to the IWU 1912. Here, for the VCI value, any of (1) changing only the upper P bits of the VCI, (2) changing all of the VCI, and (3) not changing the VCI, can be selected appropriately.

For the cell arriving from the terminals in the ATM-LAN 1902, the relaying of the cells to the ATM connections indicated by the VCs 1931 to 193M in the VP 1951 is carried out at the IWU 1911. In this case, the ATM connections set up between the IWU 1911 and the terminals in the ATM-LAN 1902 and the VCs 1931 to 193M are directly connected in the IWU 1911. At this point, the header value to be assigned to the VCs 1931 to 193N may be the same value or the different value as the value of the ATM connection from the CLSF 1921 to the IWU 1911.

As for the cell transmitted from the IWU 1912 to the IWU 1911, the relaying of the cells to the ATM connections indicated by the VCs 1941 to 194N in the VP 1951 is carried out at the IWU 1911. At this point, the value of the VCs 1941 to 194N may be the same value or the different value as the value of the ATM connection from the CLSF 1921 to the IWU 1911.

As for the cells which are tunnelled, by using the format of the cell header 1971 in the ATM-LAN 1902, and carrying out the same processing as the IWU 1911 at the IWU 1912, the IWU can pass the cell by the same processing for the networks which are separated by more than two hops In terms of the number of IWUs.

Here, the VCI upper P bits 1972 can have an optional number of bits P, and the number of ATM-LANs that can be contained and the number of terminals in the ATM-LAN without the CLSF are varied according to the value of P. In a case the connections between the IWU and the CLSF are bundled into one VP, the number of terminals to which the CLSF can make the direct delivery is going to be $2^{16}$ regardless of the value of P.

Next, a method of carrying out the broadcast between the CLSF and the ATM-LANs which are logically connected with CLSF as in the above will be described with reference to FIG. 71.

Figure 71:
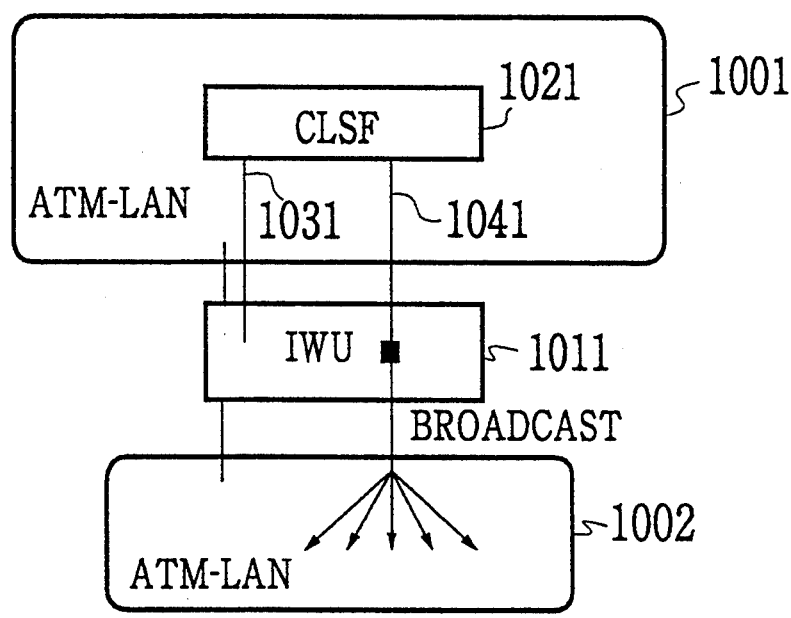
FIG. 71 is a schematic diagram of one configuration of the ATM communication system according to the present invention for carrying out the broadcast in a case of a modified network layer topology.

In FIG. 71, the ATM-LANs 1001 and 1002 are inter-networking through the IWU 1011, and the ATM-LAN 1001 contains the CLSF 1021, while the ATM-LAN 1002 is logically connected with the CLSF 1021 as in the above, and as many ATM connections 1031 as the number of terminals belonging to the ATM-LAN 1002 are provided as the ATM connections between the CLSF 1021 and the IWU 1011. In addition, the ATM connection 1041 for broadcast is also provided, and this ATM connection 1041 is directly connected at the ATM layer to the broadcast channel at the ATM-LAN 1002.

In a case the CLSF 1021 makes the broadcast with respect to the ATM-LAN 1002, first the CLSF 1021 transmits the broadcast cell to the ATM connection 1041 for broadcast. This ATM connection 1041 is not for the broadcast in the ATM-LAN 1001, so that the broadcast is not carried out in the ATM-LAN 1001. At the IWU 1011, the cells transmitted from the ATM connection 1041 for broadcast are outputted to the broadcast channel of the ATM-LAN 1002. By this, the the cells in the ATM-LAN 1002 is broadcasted through the broadcast channel in the ATM-LAN 1002.

On the other hand, as for the broadcast cells generated from the terminals In The ATM-LAN 1002, the broadcast cells may be made to arrive at the CLSF 1021 as well by outputting them to the ATM connection 1041 for broadcast at the IWU 1011.

By this method, the transmission and reception of the broadcast cells between the CLSF 1021 and the ATM-LAN 1002 can be realized without loading the ATM-LAN 1001 which contains the CLSF 1021.

Next, a method of carrying out the broadcast between the CLSF and the ATM-LANs which are logically connected with CLSF and separated by more than one hops in terms of the number of IWUs will be described with reference to FIG. 72.

Figure 72:
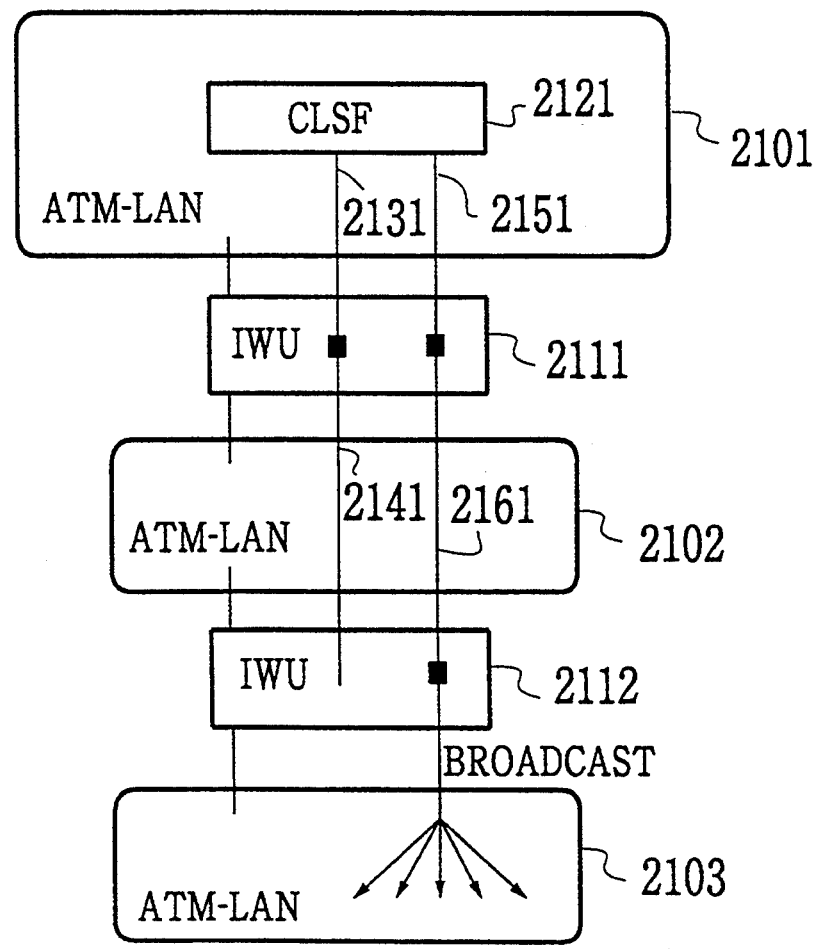
FIG. 72 is a schematic diagram of another configuration of the ATM communication system according to the present invention for carrying out broadcast in a case of a modified network layer topoloy.

In FIG. 72, the ATM-LANs 2101 and 2102 are inter-networking through the IWU 2111, and the ATM-LANs 2102 and 2103 are inter-networking though the IWU 2112. The ATM-LAN 2101 contains the CLSF 2121, while the ATM-LANs 2102 and 2103 are logically connected with the CLSF 2121 as in the above.

Between the CLSF 2121 and the IWU 2111, as many ATM connections (not shown) as the number of terminals belonging to the ATM-LAN 2102 are set up, and between the CLSF 2121 and the IWU 2111 and between the IWU 2111 and the IWU 2112, as many ATM connections 2131 and 2141, respectively, as the number of the terminals belonging to the ATM-LAN 2103 are set up, where the ATM connections 2131 and 2141 are directly connected at the ATM layer by the IWU 2111.

In addition, the ATM connection 2161 for broadcast provided between the IWUs 2111 and 2112, and the ATM connection 2151 for broadcast is provided between the IWU 2111 and the CLSF 2121, where these ATM connections 2161 and 2151 are directly connected at the ATM layer by the 2111. Also, the ATM connection 2161 for the broadcast in the ATM-LAN 2103 is directly connected with the broadcast channel in the ATM-LAN 2103 at the ATM layer by-the IWU 2112.

In a case the CLSF 2121 makes the broadcast with respect to the ATM-LAN 2103, the CLSF 2121 transmits the broadcast cell to the IWU 2111 through the ATM connection 2151 for broadcast in the ATM-LAN 2103. Here, the broadcast is not made in the ATM-LAN 2101 as there is no broadcast channel in the ATM-LAN 2101.

At the IWU 2111, the relaying of the cells to the IWU 2112 is carried out by using the ATM connection 2161 for broadcast in the ATM-LAN 2103. At the IWU 2112, the cells transmitted from the ATM connection 2161 for broadcast are outputted to the broadcast channel of the ATM-LAN 2103, so as to realize the broadcast through the broadcast channel in the ATM-LAN 2103.

On the other hand, as for the cells broadcasted at the terminals in the ATM-LAN 2103, the cells are transmitted to the IWU 2111 by using the ATM connection 2161 for broadcast which is set up between the IWUs 2112 and 2111 by the 2112. In addition, the cells may be transmitted to the CLSF 2121 by using the ATM connection 2151 for broadcast which i set up between the IWU 2111 and the CLSF 2121 by the IWU 2111.

By this method, the transmission and reception of the broadcast cells can be realized without loading the CLSF 2121, the ATM-LAN 2101 in which the CLSF 2121 is contained, and the ATM-LAN 2102 to be tunnelled.

It is noted that, in the above description, the state of being directly connected at the ATM layer can be equivalently expressed as a state of being able to transmit the cell without carrying out the AAL (ATM Adaptation Layer) processing. In addition, in the above description, the address data at the network layer can be replaced by the address data at the CL (Connection-Less) layer, i.e., the upper layer of the AAL if desired.

It is to be noted here that the embodiments for realizing the modified network layer topology described above can be combined with the embodiments for the datagram delivery in the hierarchical or flat topology described earlier, by using the logically connected CLSF as the CLSF associated with the terminals belonging to the network in which no CLSF is provided physically, In place of the CLSF provided in each network in the datagram delivery schemes described above.

It is also to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An ATM communication system, comprising:
  a plurality of ATM networks inter-networking with each other, containing a plurality of terminals and the ATM networks including a first ATM network having connection-less service function means for managing a connection-less datagram transmission in the ATM networks, and a second ATM network having no connection-less service function means;
  inter-networking means for inter-networking the first and second ATM networks; and
  connection set up means for setting up a first ATM connection between the connection-less service function means of the first ATM network and the inter-networking means, and a second ATM connection between the inter-networking means and a terminal belonging to the second ATM network;

wherein the inter-networking means directly connects the first and second ATM connections set up by the connection set up means at an ATM layer, and the connection-less service function means of the first ATM network is assigned with an address data indicating that said connection-less service function means logically belongs to the second ATM network at a network layer, such that the connection-less datagram transmission from said terminal belonging to the second ATM network is performed by using said address data through the first and second ATM connections connected at the ATM layer.

2. The system of claim 1, wherein the connection-less service function means operates according to a routing protocol for controlling a routing of the datagram to be transmitted between the connection-less service function means and the terminals of the ATM networks.

3. The system of claim 2, wherein the inter-networking means passes routing data used for the routing of the datagram between the first and second ATM networks without terminating a transmission of the routing data.

4. The system of claim 1, wherein the ATM networks further including at least one additional ATM network connected between the first and second ATM networks by the inter-networking means, and the inter-networking means directly connects the first and second ATM connections set up by the connection set up means at an ATM layer through the additional ATM network.

5. The system of claim 4, wherein said at least one additional ATM network has another connection-less service function means, the connection set up means also sets up an additional ATM connection between said another connection-less service function means of the additional ATM network and the inter-networking means, the inter-networking means directly connects the additional and second ATM connections set up by the connection set up means at an ATM layer, and the additional connection-less service function means of the additional ATM network is also assigned with the address data indicating that said connection-less service function means logically belongs to the second ATM network and a network layer, such that the connection-less datagram transmission from said terminal belonging to the second ATM network is performed by using said address data through a selected one of the first and second ATM connections connected at the ATM layer and the additional and second ATM connections connected at the ATM layer.

6. The system of claim 1, wherein the connection set up means sets up the first ATM connection between the connection-less service function means of the first ATM network and the inter-networking means for each one of said plurality of terminals belonging to the first ATM network, and a plurality of first ATM connections for said plurality of terminals belonging to the first ATM network are bundled together into one VP.

7. The system of claim 1, wherein the second ATM connection set up by the connection set up means is connected with a broadcast channel in the second ATM network.

8. An ATM communication system, comprising:
a plurality of ATM networks inter-networking with each other, each ATM network containing a plurality of terminals and the ATM networks including a first ATM network having connection-less service function means for managing a connection-less datagram transmission in the ATM networks, and second and third ATM networks having no connection-less service function means;
first inter-networking means for inter-networking the first and second ATM networks;
second inter-networking means for inter-networking the second and third ATM networks; and
connection set up means for setting up a first ATM connection between the connection-less service function means of the first ATM network and the first inter-networking means, a second ATM connection between the first inter-networking means and the second inter-networking means, and a third ATM connection between the second inter-networking means and a terminal belonging to the third ATM network;
wherein the first and second inter-networking means directly connects the first, second, and third ATM connections set up by the connection set up means at an ATM layer, and the connection-less service function means of the first ATM network is assigned with an address data indicating that said connection-less service function means logically belongs to the third ATM network at a network layer, such that the connection-less datagram transmission from said terminal belonging to the third ATM network is performed by using said address data through the first, second, and third ATM connections connected at the ATM layer.

9. The system of claim 8, wherein the connection-less service function means operates according to a routing protocol for controlling a routing of the datagram to be transmitted between the connection-less service function means and the terminals of the ATM networks.

10. The system of claim 9, wherein the first and second inter-netWorking means pass routing data used for the routing of the datagram among the first, second, and third ATM networks without terminating a transmission of the routing data.

11. A method of ATM communication in an ATM communication system formed by a plurality of ATM networks inter-networking with each other, each ATM network containing a plurality of terminals and the ATM networks including a first ATM network having connection-less service function means for managing a connection-less datagram transmission in the ATM networks, and a second ATM network having no connection-less service function means, the method comprising the steps of:
inter-networking the first and second ATM networks by first inter-networking means;
setting up a first ATM connection between the connection-less service function means of the first ATM network and the inter-networking means, and a second ATM connection between the inter-networking means and a terminal belonging to the second ATM network:
directly connecting the first and second ATM connections at an ATM layer by the inter-networking means; and
assigning the connection-less service function means of the first ATM network with an address data indicating that said connection-less service function means logically belongs to the second ATM network at a network layer, such that the connection-less datagram transmission from said terminal belonging to the second ATM network is performed by using said address data through the first and second ATM connections connected at the ATM layer.

12. A method of ATM communication in an ATM communication system formed by a plurality of ATM networks inter-networking with each other, each ATM network containing a plurality of terminals and the ATM networks including a first ATM network having connection-less service function means for managing a connection-less datagram transmission in the ATM networks, and second and third ATM networks having no connection-less service function means, the method comprising the steps of:

inter-networking the first and second ATM networks by first inter-networking means, and the second and third ATM networks by second inter-networking means;

setting up a first ATM connection between the connection-less service function means of the first ATM network and the first inter-networking means, a second ATM connection between the first inter-networking means and the second inter-networking means, and a third ATM connection between the second inter-networking means and a terminal belonging to the third ATM network;

directly connecting the first, second, and third ATM connections at an ATM layer by the first and second inter-networking means; and assigning the connection-less service function means of the first ATM network with an address data indicating that said connection-less service function means logically belongs to the third ATM network at a network layer, such that the connection-less datagram transmission from said terminal belonging to the third ATM network is performed by using said address data through the first, second, and third ATM connections connected at the ATM layer.

* * * * *